(12) United States Patent
Duan et al.

(10) Patent No.: US 12,519,507 B2
(45) Date of Patent: Jan. 6, 2026

(54) RECONFIGURABLE INTELLIGENT SURFACE, RIS, AIDED AND NON-RIS-AIDED SIGNAL TIMING

(71) Applicant: QUALCOMM INCORPORATED, San Diego, CA (US)

(72) Inventors: Weimin Duan, San Diego, CA (US); Hung Dinh Ly, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/260,411

(22) PCT Filed: Jan. 11, 2022

(86) PCT No.: PCT/US2022/012048
§ 371 (c)(1),
(2) Date: Jul. 5, 2023

(87) PCT Pub. No.: WO2022/186903
PCT Pub. Date: Sep. 9, 2022

(65) Prior Publication Data
US 2024/0056129 A1    Feb. 15, 2024

(30) Foreign Application Priority Data

Mar. 5, 2021 (GR) .............................. 20210100136

(51) Int. Cl.
*H04L 5/00* (2006.01)
*H04B 7/04* (2017.01)

(52) U.S. Cl.
CPC ....... *H04B 7/04013* (2023.05); *H04L 5/0051* (2013.01)

(58) Field of Classification Search
CPC ..... G01S 5/00; G01S 5/02; G01S 5/10; G01S 5/0236; G01S 13/76; H04B 7/04;
(Continued)

(56) References Cited

U.S. PATENT DOCUMENTS

| | | |
|---|---|---|
| 2020/0374806 A1 | 11/2020 | Manolakos et al. |
| 2020/0382978 A1 | 12/2020 | Manolakos et al. |

(Continued)

FOREIGN PATENT DOCUMENTS

| | | |
|---|---|---|
| CN | 111093267 A | 5/2020 |
| GB | 2582788 A | 10/2020 |

(Continued)

OTHER PUBLICATIONS

Intel Corporation: "Potential RAT Dependent Techniques for NR Positioning", 3GPP TSG RAN WG1 Meeting #95, R1-1812519, Intel—NR_POS_Techniques, 3rd Generation Partnership Project, Mobile Competence Centre, 650, Route Des Lucioles, F-06921, Sophia-Antipolis Cedex, France, vol. RAN WG1, No. Spokane, USA, Nov. 12, 2018-Nov. 16, 2018, 16 Pages, Nov. 11, 2018, XP051554463, Sec. 3.2, Sec. 4.2, the whole document.

(Continued)

*Primary Examiner* — Shawkat M Ali
(74) *Attorney, Agent, or Firm* — Thien T. Nguyen

(57) ABSTRACT

A method includes: transmitting, from a UE, a first on-demand request for first PRS resources of a first signal type based on reception by the UE of a first DL-RS of the first signal type with at least a first threshold quality and lack of reception of a second DL-RS of a second signal type with at least a second threshold quality, one of the first and second signal types being for non-RIS-reflected signal transfer and the other signal type being for RIS-reflected signal transfer, or transmitting, from the UE, a second on-demand request for second PRS resources for RIS-reflected signal transfer, (Continued)

the second on-demand request specifying a first RIS of a plurality of RISes associated with a common base station; or transmitting, from the UE, a capability message indicating that the UE supports different PRS symbol durations for RIS-reflected PRS and non-RIS-reflected PRS; or any combination thereof.

24 Claims, 22 Drawing Sheets

(58) Field of Classification Search
CPC .............. H04B 7/04013; H04B 17/318; H04B 17/336; H04L 5/00; H04L 5/0051; H04L 27/26; H04L 24/10; H04L 56/00; H04L 64/00; H04W 24/08
USPC ................ 375/219, 260, 262, 267, 295, 316
See application file for complete search history.

(56) References Cited

U.S. PATENT DOCUMENTS

| | | | |
|---|---|---|---|
| 2021/0051622 A1 | 2/2021 | Manolakos et al. | |
| 2021/0302561 A1 | 9/2021 | Bayesteh et al. | |
| 2022/0150865 A1* | 5/2022 | Cha .......................... | G01S 5/011 |
| 2023/0176174 A1 | 6/2023 | Penna et al. | |
| 2023/0254811 A1 | 8/2023 | Wang et al. | |
| 2024/0019524 A1 | 1/2024 | Duan et al. | |
| 2024/0094325 A1 | 3/2024 | Duan et al. | |
| 2024/0298288 A1 | 9/2024 | Duan et al. | |
| 2024/0397395 A1 | 11/2024 | Cui et al. | |
| 2024/0430840 A1 | 12/2024 | Duan et al. | |

FOREIGN PATENT DOCUMENTS

| | | |
|---|---|---|
| JP | 2020031451 A | 2/2020 |
| JP | 2023519613 A | 5/2023 |
| WO | 2020026211 A1 | 2/2020 |

OTHER PUBLICATIONS

Interdigital Inc: "Discussion on On-demand Reference Signals for Positioning", 3GPP RAN WG2 Meeting #113-e, R2-2100375, 3GPP, Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 15, 2021, XP051973561, 4 Pages.
International Search Report and Written Opinion—PCT/US2022/012048—ISA/EPO—Jul. 29, 2022.
Qualcomm Incorporated: "On PRS-RSTD Measurements in NR Positioning", 3GPP Draft, R4-2003567, 3GPP TSG-RAN WG4 Meeting #94-e-Bis, 3rd Generation Partnership Project (3GPP), Mobile Competence Centre, 650, Route Des Lucioles, F-06921 Sophia-Antipolis Cedex, France, vol. RAN WG4, No. Online Meeting, Apr. 20, 2020-Apr. 30, 2020, Apr. 10, 2020 (Apr. 10, 2020), XP051874998, pp. 1-14.
Sony: "Considerations on Potential Positioning Enhancements", 3GPP Draft, 3GPP TSG RAN WG1 #103-e, R1-2008365, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020 (Oct. 17, 2020), XP051940107, 7 Pages.
Zhang J., et al., "Positioning with Dual Reconfigurable Intelligent Surfaces in Millimeter-Wave MIMO Systems", 2020 IEEE/CIC International Conference on Communications in China (ICCC), IEEE, Aug. 9, 2020, XP033853278, pp. 800-805, DOI: 10.1109/ICCC49849.2020.9238887, the whole document, pp. 1-3, 6, abstract, p. 800, paragraph I—p. 801, paragraph II, p. 802, paragraph III.
Wymeersch H., et al., "Radio Localization and Mapping With Reconfigurable Intelligent Surfaces: Challenges, Opportunities, and Research Directions", IEEE Vehicular Technology Magazine, IEEE, US, vol. 15, No. 4, Oct. 7, 2020, Dec. 2020, pp. 52-61, XP011821427.
Oppo: "Discussions on NR Positioning Enhancements", 3GPP TSG RAN WG1 #103-e, R1-2008226, e-Meeting, Oct. 26-Nov. 13, 2020, 10 Pages, Nov. 11, 2020.

* cited by examiner

RECONFIGURABLE INTELLIGENT SURFACE, RIS, AIDED AND NON-RIS-AIDED SIGNAL TIMING

CROSS-REFERENCE TO RELATED APPLICATIONS

This application is the National Stage of International Application No. PCT/US2022/012048, filed Jan. 11, 2022, entitled "RECONFIGURABLE INTELLIGENT SURFACE, RIS, AIDED AND NON-RIS-AIDED SIGNAL TIMING," which claims the benefit of Greek Patent Application No. 20210100136, filed Mar. 5, 2021, entitled "RECONFIGURABLE INTELLIGENT SURFACE, RIS, AIDED AND NON-RIS-AIDED SIGNAL TIMING," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example UE (user equipment) includes: a transceiver configured to transmit and receive wireless signals; a memory; and a processor communicatively coupled to the transceiver and the memory and configured to: transmit, via the transceiver, a capability report indicating that the UE is configured to measure a first type of DL-PRS (downlink positioning reference signals) and a second type of DL-PRS; measure the first type of DL-PRS received directly from a TRP (transmission/reception point); and measure the second type of DL-PRS received from the TRP via a RIS (reconfigurable intelligent surface).

Implementations of such a UE may include one or more of the following features. The processor is configured to disable measurement of the second type of DL-PRS in response to a measurement of the first type of DL-PRS by the UE having at least a threshold quality. The processor is configured to transmit, via the transceiver to a network entity, an indication that a measurement report from the UE will lack a measurement of the second type of DL-PRS. The processor is configured to measure the second type of DL-PRS in response to an inability of the processor to obtain a measurement of the first type of DL-PRS with at least a threshold quality. The processor is configured to: obtain a first measurement of the first type of DL-PRS and a second measurement of the second type of DL-PRS; determine, as a higher-quality measurement, which of the first measurement or the second measurement has a higher measurement quality; determine, as a lower-quality measurement, which of the first measurement or the second measurement has a lower measurement quality; and transmit, via the transceiver to a network entity, the higher-quality measurement before, if at all, transmitting the lower-quality measurement to the network entity. The processor is configured to descramble the second type of DL-PRS based on an identity of the TRP and an identity of the RIS.

An example positioning reference signal measuring method includes: transmitting, from a UE, a capability report indicating that the UE is configured to measure a first type of DL-PRS and a second type of DL-PRS; and measuring the first type of DL-PRS received directly from a TRP or the second type of DL-PRS received from the TRP via a RIS, or a combination thereof.

Implementations of such a method may include one or more of the following features. The method includes disabling measurement of the second type of DL-PRS in response to a measurement of the first type of DL-PRS by the UE having at least a threshold quality. The method includes transmitting, from the UE to a network entity, an indication that a measurement report from the UE will lack a measurement of the second type of DL-PRS. Measuring the second type of DL-PRS is performed in response to an inability of the UE to obtain a measurement of the first type of DL-PRS with at least a threshold quality. Measuring the first type of DL-PRS and the second type of DL-PRS includes obtaining a first measurement of the first type of DL-PRS and a second measurement of the second type of DL-PRS, and the method includes: determining, as a higher-quality measurement, which of the first measurement or the second measurement has a higher measurement quality; determining, as a lower-quality measurement, which of the first measurement or the second measurement has a lower measurement quality; and transmitting, from the UE to a network entity, the higher-quality measurement before, if at all, transmitting the lower-quality measurement to the network entity. The method includes descrambling the second type of DL-PRS based on an identity of the TRP and an identity of the RIS.

Another example UE includes: means for transmitting a capability report indicating that the UE is configured to measure a first type of DL-PRS and a second type of DL-PRS; and means for measuring the first type of DL-PRS received directly from a TRP or the second type of DL-PRS received from the TRP via a RIS, or a combination thereof.

Implementations of such a UE may include one or more of the following features. The UE includes means for disabling measurement of the second type of DL-PRS in response to a measurement of the first type of DL-PRS by the UE having at least a threshold quality. The UE includes means for transmitting, from the UE to a network entity, an indication that a measurement report from the UE will lack a measurement of the second type of DL-PRS. The means for measuring the second type of DL-PRS include means for measuring the second type of DL-PRS in response to an inability of the UE to obtain a measurement of the first type of DL-PRS with at least a threshold quality. The means for measuring the first type of DL-PRS and the means for measuring the second type of DL-PRS include means for obtaining a first measurement of the first type of DL-PRS and a second measurement of the second type of DL-PRS, and the UE includes: means for determining, as a higher-quality measurement, which of the first measurement or the second measurement has a higher measurement quality; means for determining, as a lower-quality measurement, which of the first measurement or the second measurement has a lower measurement quality; and means for transmitting, to a network entity, the higher-quality measurement before, if at all, transmitting the lower-quality measurement to the network entity. The UE includes means for descrambling the second type of DL-PRS based on an identity of the TRP and an identity of the RIS.

An example non-transitory, processor-readable storage medium includes processor-readable instructions to cause a processor of a UE to: transmit a capability report indicating that the UE is configured to measure a first type of DL-PRS and a second type of DL-PRS; and measure the first type of DL-PRS received directly from a TRP or the second type of DL-PRS received from the TRP via a RIS, or a combination thereof.

Implementations of such a storage medium may include one or more of the following features. The storage medium includes processor-readable instructions to cause the processor to disable measurement of the second type of DL-PRS in response to a measurement of the first type of DL-PRS by the UE having at least a threshold quality. The storage medium includes processor-readable instructions to cause the processor to transmit, to a network entity, an indication that a measurement report from the UE will lack a measurement of the second type of DL-PRS. The processor-readable instructions to cause the processor to measure the second type of DL-PRS include processor-readable instructions to cause the processor to cause the processor to measure the second type of DL-PRS in response to an inability of the UE to obtain a measurement of the first type of DL-PRS with at least a threshold quality. The processor-readable instructions to cause the processor to measure the first type of DL-PRS and the second type of DL-PRS include processor-readable instructions to cause the processor to obtain a first measurement of the first type of DL-PRS and a second measurement of the second type of DL-PRS, and the storage medium includes processor-readable instructions to cause the processor to: determine, as a higher-quality measurement, which of the first measurement or the second measurement has a higher measurement quality; determine, as a lower-quality measurement, which of the first measurement or the second measurement has a lower measurement quality; and transmit, to a network entity, the higher-quality measurement before, if at all, transmitting the lower-quality measurement to the network entity. The storage medium includes processor-readable instructions to cause the processor to descramble the second type of DL-PRS based on an identity of the TRP and an identity of the RIS.

An example network entity includes: a transceiver configured to transmit and receive wireless signals; a memory; and a processor communicatively coupled to the transceiver and the memory and configured to: transmit, via the transceiver, a first DL-PRS of a first type of DL-PRS; and transmit, via the transceiver to a RIS, a second DL-PRS of a second type of DL-PRS.

Implementations of such a network entity may include one or more of the following features. The processor is configured to scramble the second DL-PRS using an identity of the network entity and an identity of the RIS. The processor is configured to transmit the second DL-PRS with a higher number of repetitions per instance than the first DL-PRS. The processor is configured to transmit the second DL-PRS with a different carrier frequency than the first DL-PRS, or a different bandwidth than the first DL-PRS, or one or more different timing characteristics than the first DL-PRS, or a different codeword than the first DL-PRS, or any combination thereof.

Also or alternatively, implementations of such a UE may include one or more of the following features. The processor is configured to: transmit, via the transceiver, a first source signal of a first type of source signal, and transmit, via the transceiver to the RIS, a second source signal of a second type of source signal. The processor is configured to: receive an indication from a UE via the transceiver indicating a first transmission beam corresponding to a received source signal; transmit a quasi co-location (QCL) indication to the UE indicating a QCL type of a second transmission beam relative to the first transmission beam; and transmit one of the first DL-PRS or the second DL-PRS to the UE using the second transmission beam that is quasi co-located with the first transmission beam. The processor is configured to: transmit, via the transceiver to the RIS, a third source signal of the second type of source signal, the second source signal being quasi co-located with the second DL-PRS with a first quasi co-location type, the third source signal being quasi co-located with the second DL-PRS with a second quasi co-location type; and transmit the second source signal and the third source signal with a same index number. The processor is configured to transmit, to a UE (user equipment) via the transceiver, timing and frequency of the second type of source signal.

An example method of providing positioning reference signals includes: transmitting, from a network entity, a first DL-PRS of a first type of DL-PRS; and transmitting, from the network entity to a RIS, a second DL-PRS of a second type of DL-PRS.

Implementations of such a method may include one or more of the following features. The method includes scrambling the second DL-PRS using an identity of the network entity and an identity of the RIS. Transmitting the second DL-PRS includes transmitting the second DL-PRS with a higher number of repetitions per instance than the first DL-PRS. Transmitting the second DL-PRS includes transmitting the second DL-PRS with a different carrier frequency than the first DL-PRS, or a different bandwidth than the first DL-PRS, or one or more different timing characteristics than the first DL-PRS, or a different codeword than the first DL-PRS, or any combination thereof.

Also or alternatively, implementations of such a method may include one or more of the following features. The method includes: transmitting a first source signal of a first type of source signal; and transmitting, to the RIS, a second source signal of a second type of source signal. The method includes: receiving an indication, at the network entity from a UE, indicating a first transmission beam corresponding to a received source signal; and transmitting a QCL indication to the UE indicating a QCL type of a second transmission beam relative to the first transmission beam; where one of the first DL-PRS or the second DL-PRS is transmitted to the UE using the second transmission beam that is quasi co-located with the first transmission beam. The method includes: transmitting, from the network entity to the RIS, a third source signal of the second type of source signal, the second source signal being quasi co-located with the second DL-PRS with a first quasi co-location type, the third source signal being quasi co-located with the second DL-PRS with a second quasi co-location type; and transmitting the second source signal and the third source signal with a same index number. The method includes transmitting, from the network entity to a UE, timing and frequency of the second type of source signal.

Another example network entity includes: means for transmitting a first DL-PRS of a first type of DL-PRS; and means for transmitting, to a RIS, a second DL-PRS of a second type of DL-PRS.

Implementations of such a network entity may include one or more of the following features. The network entity includes means for scrambling the second DL-PRS using an identity of the network entity and an identity of the RIS. The means for transmitting the second DL-PRS include means for transmitting the second DL-PRS with a higher number of repetitions per instance than the first DL-PRS. The means for transmitting the second DL-PRS include means for transmitting the second DL-PRS with a different carrier frequency than the first DL-PRS, or a different bandwidth than the first DL-PRS, or one or more different timing characteristics than the first DL-PRS, or a different codeword than the first DL-PRS, or any combination thereof.

Also or alternatively, implementations of such a network entity may include one or more of the following features. The network entity includes: means for transmitting a first source signal of a first type of source signal; and means for transmitting, to the RIS, a second source signal of a second type of source signal. The network entity includes: means for receiving an indication of a first transmission beam corresponding to a received source signal; and means for transmitting a QCL indication to the UE indicating a QCL type of a second transmission beam relative to the first transmission beam; where one of the first DL-PRS or the second DL-PRS is transmitted to the UE using the second transmission beam that is quasi co-located with the first transmission beam. The network entity includes: means for transmitting, to the RIS, a third source signal of the second type of source signal, the second source signal being quasi co-located with the second DL-PRS with a first quasi co-location type, the third source signal being quasi co-located with the second DL-PRS with a second quasi co-location type; and means for transmitting the second source signal and the third source signal with a same index number. The network entity includes means for transmitting, from the network entity to a UE, timing and frequency of the second type of source signal.

Another example non-transitory, processor-readable storage medium includes processor-readable instructions to cause a processor of a network entity to: transmit a first DL-PRS of a first type of DL-PRS; and transmit, to a RIS, a second DL-PRS of a second type of DL-PRS.

Implementations of such a storage medium may include one or more of the following features. The storage medium includes processor-readable instructions to cause the processor to scramble the second DL-PRS using an identity of the network entity and an identity of the RIS. The processor-readable instructions to cause the processor to transmit the second DL-PRS include processor-readable instructions to cause the processor to transmit the second DL-PRS with a higher number of repetitions per instance than the first DL-PRS. The processor-readable instructions to cause the processor to transmit the second DL-PRS include processor-readable instructions to cause the processor to transmit the second DL-PRS with a different carrier frequency than the first DL-PRS, or a different bandwidth than the first DL-PRS, or one or more different timing characteristics than the first DL-PRS, or a different codeword than the first DL-PRS, or any combination thereof.

Also or alternatively, implementations of such a storage medium may include one or more of the following features. The storage medium includes processor-readable instructions to cause the processor to: transmit a first source signal of a first type of source signal; and transmit, to the RIS, a second source signal of a second type of source signal. The storage medium includes processor-readable instructions to cause the processor to: receive an indication, from a UE, indicating a first transmission beam corresponding to a received source signal; and transmit a QCL indication to the UE indicating a QCL type of a second transmission beam relative to the first transmission beam; where one of the first DL-PRS or the second DL-PRS is transmitted to the UE using the second transmission beam that is quasi co-located with the first transmission beam. The storage medium includes processor-readable instructions to cause the processor to: transmit, to the RIS, a third source signal of the second type of source signal, the second source signal being quasi co-located with the second DL-PRS with a first quasi co-location type, the third source signal being quasi co-located with the second DL-PRS with a second quasi co-location type; and transmit the second source signal and the third source signal with a same index number. The storage medium includes processor-readable instructions to cause the processor to transmit, to a UE, timing and frequency of the second type of source signal.

Another example UE includes: a transceiver configured to transmit and receive wireless signals; a memory; and a processor communicatively coupled to the transceiver and the memory and configured to: transmit a first UL-PRS (uplink positioning reference signal) of a first type of UL-PRS via the transceiver directly to a telecommunication device other than a repeater; and transmit, via the transceiver to a RIS, a second UL-PRS of a second type of UL-PRS.

Implementations of such a UE may include one or more of the following features. The processor is configured to transmit the second UL-PRS with a different carrier frequency than the first UL-PRS, or a different bandwidth than the first UL-PRS, or one or more different timing characteristics than the first UL-PRS, or a different codeword than the first UL-PRS, or any combination thereof. The processor is configured to: measure a type-2 path loss reference signal received from the RIS; and transmit the second UL-PRS using a transmission power based on a path loss of the type-2 path loss reference signal. The path loss of the type-2 path loss reference signal is a second path loss and the transmission power is a second transmission power, and the processor is configured to: measure a type-1 path loss reference signal received from the RIS; and transmit, concurrently with the second UL-PRS, the first UL-PRS using a first transmission power based on a first path loss of the type-1 path loss reference signal. The path loss is a primary path loss and the transmission power is a primary transmission power, and the processor is configured to: measure an SSB (synchronization signal block) received by the transceiver; and transmit the second UL-PRS using a secondary transmission power based on an SSB path loss of the SSB in response to failure to determine the primary path loss.

Also or alternatively, implementations of such a UE may include one or more of the following features. The processor is configured to: attempt to measure a DL-PRS for an uplink/downlink positioning technique; and transmit, via the transceiver in response to failing to measure the DL-PRS with at least a threshold quality, an indication that the UE is skipping transmission of a corresponding UL-PRS. To determine a direction of the RIS the processor is configured to: attempt to measure at least one downlink reference signal reflected by the RIS using a plurality of UE receive beams; determine a selected receive beam of the plurality of UE receive beams that corresponds to a strongest signal measurement of the at least one downlink reference signal; and determine a UE transmit beam of the UE corresponding to the selected receive beam.

A positioning reference signal provision method includes: transmitting, from a UE directly to a telecommunication device other than a repeater, a first UL-PRS of a first type of UL-PRS; and transmitting, from the UE to a RIS, a second UL-PRS of a second type of UL-PRS.

Implementations of such a method may include one or more of the following features. The second UL-PRS has a different carrier frequency than the first UL-PRS, or a different bandwidth than the first UL-PRS, or one or more different timing characteristics than the first UL-PRS, or a different codeword than the first UL-PRS, or any combination thereof. The method includes measuring a type-2 path loss reference signal received from the RIS, and the second UL-PRS is transmitted using a transmission power based on a path loss of the type-2 path loss reference signal. The path loss of the type-2 path loss reference signal is a second path loss and the transmission power is a second transmission power, the method includes measuring a type-1 path loss reference signal received from the RIS, and the first UL-PRS is transmitted using a first transmission power based on a first path loss of the type-1 path loss reference signal.

Also or alternatively, implementations of such a method may include one or more of the following features. The method includes: attempting to measure a type-2 path loss reference signal; and measuring an SSB received by the UE; where the second UL-PRS is transmitted using a secondary transmission power based on an SSB path loss of the SSB in response to failure to determine a reference signal path loss based on the type-2 path loss reference signal. The method includes: attempting to measure, at the UE, a DL-PRS for an uplink/downlink positioning technique; and transmitting, in response to failing to measure the DL-PRS with at least a threshold quality, an indication that the UE is skipping transmission of a corresponding UL-PRS. The method includes determining a direction of the RIS by: attempting to measure at least one downlink reference signal reflected by the RIS using a plurality of UE receive beams; determining a selected receive beam of the plurality of UE receive beams that corresponds to a strongest signal measurement of the at least one downlink reference signal; and determining a UE transmit beam of the UE corresponding to the selected receive beam.

Another example UE includes: means for transmitting a first UL-PRS of a first type of UL-PRS directly to a telecommunication device other than a repeater; and means for transmitting, to a RIS, a second UL-PRS of a second type of UL-PRS.

Implementations of such a UE may include one or more of the following features. The second UL-PRS has a different carrier frequency than the first UL-PRS, or a different bandwidth than the first UL-PRS, or one or more different timing characteristics than the first UL-PRS, or a different codeword than the first UL-PRS, or any combination thereof. The UE includes means for measuring a type-2 path loss reference signal received from the RIS, and the second UL-PRS is transmitted using a transmission power based on a path loss of the type-2 path loss reference signal. The path loss of the type-2 path loss reference signal is a second path loss and the transmission power is a second transmission power, the UE includes means for measuring a type-1 path loss reference signal received from the RIS, and the means for transmitting the first UL-PRS include means for transmitting the first UL-PRS using a first transmission power based on a first path loss of the type-1 path loss reference signal.

Also or alternatively, implementations of such a UE may include one or more of the following features. The UE includes: means for attempting to measure a type-2 path loss reference signal; and means for measuring an SSB received by the UE; where the means for transmitting the second UL-PRS include means for transmitting the second UL-PRS using a secondary transmission power based on an SSB path loss of the SSB in response to failure to determine a reference signal path loss based on the type-2 path loss reference signal. The UE includes: means for attempting to measure, at the UE, a DL-PRS for an uplink/downlink positioning technique; and means for transmitting, in response to failing to measure the DL-PRS with at least a threshold quality, an indication that the UE is skipping transmission of a corresponding UL-PRS. The UE includes means for determining a direction of the RIS including: means for attempting to measure at least one downlink reference signal reflected by the RIS using a plurality of UE receive beams; means for determining a selected receive beam of the plurality of UE receive beams that corresponds to a strongest signal measurement of the at least one downlink reference signal; and means for determining a UE transmit beam of the UE corresponding to the selected receive beam.

Another example non-transitory, processor-readable storage medium includes processor-readable instructions to cause a processor of a UE entity to: transmit a first UL-PRS of a first type of UL-PRS directly to a telecommunication device other than a repeater; and transmit, to a RIS, a second UL-PRS of a second type of UL-PRS.

Implementations of such a storage medium may include one or more of the following features. The second UL-PRS has a different carrier frequency than the first UL-PRS, or a different bandwidth than the first UL-PRS, or one or more different timing characteristics than the first UL-PRS, or a different codeword than the first UL-PRS, or any combination thereof. The storage medium includes processor-readable instructions to cause the processor to measure a type-2 path loss reference signal received from the RIS, and the processor-readable instructions to cause the processor to transmit the second UL-PRS include processor-readable instructions to cause the processor to transmit the second UL-PRS using a transmission power based on a path loss of the type-2 path loss reference signal. The path loss of the type-2 path loss reference signal is a second path loss and the transmission power is a second transmission power, the storage medium includes processor-readable instructions to cause the processor to measure a type-1 path loss reference signal received from the RIS, and the processor-readable instructions to cause the processor to transmit the first UL-PRS include processor-readable instructions to cause the processor to transmit the first UL-PRS using a first transmission power based on a first path loss of the type-1 path loss reference signal.

Also or alternatively, implementations of such a storage medium may include one or more of the following features. The storage medium includes processor-readable instructions to cause the processor to: attempt to measure a type-2 path loss reference signal; and measure an SSB received by the UE; where the processor-readable instructions to cause the processor to transmit the second UL-PRS include processor-readable instructions to cause the processor to transmit the second UL-PRS using a secondary transmission power based on an SSB path loss of the SSB in response to failure to determine a reference signal path loss based on the type-2 path loss reference signal. The storage medium includes processor-readable instructions to cause the processor to: attempt to measure, at the UE, a DL-PRS for an uplink/downlink positioning technique; and transmit, in response to failing to measure the DL-PRS with at least a threshold quality, an indication that the UE is skipping transmission of a corresponding UL-PRS. The storage medium includes, to cause the processor to determine a direction of the RIS, processor-readable instructions configured to cause the processor to: attempt to measure at least one downlink reference signal reflected by the RIS using a plurality of UE receive beams; determine a selected receive beam of the plurality of UE receive beams that corresponds to a strongest signal measurement of the at least one downlink reference signal; and determine a UE transmit beam of the UE corresponding to the selected receive beam.

Another example network entity includes: a transceiver configured to transmit and receive wireless signals; a memory; and a processor communicatively coupled to the transceiver and the memory and configured to: schedule first uplink positioning signal resources for a UE to transmit a first UL-PRS of a first type directly to a telecommunication device other than a repeater; and schedule second uplink positioning signal resources for the UE to transmit a second UL-PRS of a second type to a RIS.

Implementations of such a network entity may include one or more of the following features. The processor is configured to: transmit, via the transceiver in response to receipt of the second UL-PRS and failure to receive the first UL-PRS, a first termination indication indicating for the UE to stop scheduled transmission of the first UL-PRS; or transmit, via the transceiver in response to receipt of the first UL-PRS and failure to receive the second UL-PRS, a second termination indication indicating for the UE to stop scheduled transmission of the second UL-PRS; or a combination thereof. The processor is configured to: transmit, via the transceiver to the UE, a first downlink path loss reference signal of the first type; and transmit, via the transceiver to the RIS, a second downlink path loss reference signal of the second type. The first downlink path loss reference signal is a first synchronization signal block or a first positioning reference signal, and the second downlink path loss reference signal is a second synchronization signal block or a second positioning reference signal. The second downlink path loss reference signal is the second positioning reference signal, and the processor is further configured to transmit, via the transceiver to the RIS, an indication of a transmit power of the second positioning reference signal. The processor is configured to: schedule the second UL-PRS with a different carrier frequency than the first UL-PRS, or a different bandwidth than the first UL-PRS, or one or more different timing characteristics than the first UL-PRS, or a different codeword than the first UL-PRS, or any combination thereof; allocate both the first downlink path loss reference signal and the first UL-PRS with a first carrier frequency, a first bandwidth, and first timing characteristics; and allocate both the second downlink path loss reference signal and the second UL-PRS with a second carrier frequency, a second bandwidth, and second timing characteristics.

Also or alternatively, implementations of such a network entity may include one or more of the following features. The processor is configured to: control selection of one or more of a plurality of antenna beams of the RIS; and transmit a beam indication to the UE indicating a selected one of the plurality of antenna beams of the RIS.

An example method of scheduling uplink positioning reference signals includes: transmitting, from a network entity to a UE, a first schedule of first uplink positioning signal resources for the UE to transmit a first UL-PRS of a first type directly to a telecommunication device other than a repeater; and transmitting, from the network entity to the UE, a second schedule of second uplink positioning signal resources for the UE to transmit a second UL-PRS of a second type to a RIS.

Implementations of such a method may include one or more of the following features. The method includes: transmitting, from the network entity to the UE in response to receipt of the second UL-PRS and failure to receive the first UL-PRS, a first termination indication indicating for the UE to stop scheduled transmission of the first UL-PRS; or transmitting, from the network entity to the UE in response to receipt of the first UL-PRS and failure to receive the second UL-PRS, a second termination indication indicating for the UE to stop scheduled transmission of the second UL-PRS; or a combination thereof. The method includes: transmitting, from the network entity to the UE, a first downlink path loss reference signal of the first type; and transmitting, from the network entity to the RIS, a second downlink path loss reference signal of the second type. The first downlink path loss reference signal is a first synchronization signal block or a first positioning reference signal, and the second downlink path loss reference signal is a second synchronization signal block or a second positioning reference signal. The second downlink path loss reference signal is the second positioning reference signal, and the method includes transmitting, from the network entity to the RIS, an indication of a transmit power of the second positioning reference signal. In accordance with the first schedule and the second schedule the second UL-PRS has a different carrier frequency than the first UL-PRS, or a different bandwidth than the first UL-PRS, or one or more different timing characteristics than the first UL-PRS, or a different codeword than the first UL-PRS, or any combination thereof, and the method includes: allocating both the first downlink path loss reference signal and the first UL-PRS with a first carrier frequency, a first bandwidth, and first timing characteristics; and allocating both the second downlink path loss reference signal and the second UL-PRS with a second carrier frequency, a second bandwidth, and second timing characteristics.

Also or alternatively, implementations of such a method may include one or more of the following features. The method includes: controlling selection of one or more of a plurality of antenna beams of the RIS; and transmitting a beam indication from the network entity to the UE indicating a selected one of the plurality of antenna beams of the RIS.

Another example network entity includes: means for transmitting, to a UE, a first schedule of first uplink positioning signal resources for the UE to transmit a first UL-PRS of a first type directly to a telecommunication device other than a repeater; and means for transmitting, to the UE, a second schedule of second uplink positioning signal resources for the UE to transmit a second UL-PRS of a second type to a RIS.

Implementations of such a network entity may include one or more of the following features. The network entity includes: means for transmitting, entity to the UE in response to receipt of the second UL-PRS and failure to receive the first UL-PRS, a first termination indication indicating for the UE to stop scheduled transmission of the first UL-PRS; or means for transmitting, to the UE in response to receipt of the first UL-PRS and failure to receive the second UL-PRS, a second termination indication indicating for the UE to stop scheduled transmission of the second UL-PRS; or a combination thereof. The network entity includes: means for transmitting, to the UE, a first downlink path loss reference signal of the first type; and means for transmitting, to the RIS, a second downlink path loss reference signal of the second type. The first downlink path loss reference signal is a first synchronization signal block or a first positioning reference signal, and the second downlink path loss reference signal is a second synchronization signal block or a second positioning reference signal. The second downlink path loss reference signal is the second positioning reference signal, and the network entity includes means for transmitting, to the RIS, an indication of a transmit power of the second positioning reference signal. In accordance with the first schedule and the second schedule the second UL-PRS has a different carrier frequency than the first UL-PRS, or a different bandwidth than the first UL-PRS, or one or more different timing characteristics than the first UL-PRS, or a different codeword than the first UL-PRS, or any combination thereof, and the network entity includes: means for allocating both the first downlink path loss reference signal and the first UL-PRS with a first carrier frequency, a first bandwidth, and first timing characteristics; and means for allocating both the second downlink path loss reference signal and the second UL-PRS with a second carrier frequency, a second bandwidth, and second timing characteristics.

Also or alternatively, implementations of such a network entity may include one or more of the following features. The network entity includes: means for controlling selection of one or more of a plurality of antenna beams of the RIS; and means for transmitting a beam indication to the UE indicating a selected one of the plurality of antenna beams of the RIS.

Another example non-transitory, processor-readable storage medium includes processor-readable instructions to cause a processor of a network entity to: transmit, to a UE (user equipment), a first schedule of first uplink positioning signal resources for the UE to transmit a first UL-PRS (uplink positioning reference signal) of a first type directly to a telecommunication device other than a repeater; and transmit, to the UE, a second schedule of second uplink positioning signal resources for the UE to transmit a second UL-PRS of a second type to a RIS (reconfigurable intelligent surface).

Implementations of such a storage medium may include one or more of the following features. The storage medium includes processor-readable instructions to cause the processor to: transmit, entity to the UE in response to receipt of the second UL-PRS and failure to receive the first UL-PRS, a first termination indication indicating for the UE to stop scheduled transmission of the first UL-PRS; or transmit, to the UE in response to receipt of the first UL-PRS and failure to receive the second UL-PRS, a second termination indication indicating for the UE to stop scheduled transmission of the second UL-PRS; or a combination thereof. The storage medium includes processor-readable instructions to cause the processor to: transmit, to the UE, a first downlink path loss reference signal of the first type; and transmit, to the RIS, a second downlink path loss reference signal of the second type. The first downlink path loss reference signal is a first synchronization signal block or a first positioning reference signal, and the second downlink path loss reference signal is a second synchronization signal block or a second positioning reference signal. The second downlink path loss reference signal is the second positioning reference signal, and the storage medium includes processor-readable instructions to cause the processor to transmit, to the RIS, an indication of a transmit power of the second positioning reference signal. In accordance with the first schedule and the second schedule the second UL-PRS has a different carrier frequency than the first UL-PRS, or a different bandwidth than the first UL-PRS, or one or more different timing characteristics than the first UL-PRS, or a different codeword than the first UL-PRS, or any combination thereof, and the storage medium includes processor-readable instructions to cause the processor to: allocate both the first downlink path loss reference signal and the first UL-PRS with a first carrier frequency, a first bandwidth, and first timing characteristics; and allocate both the second downlink path loss reference signal and the second UL-PRS with a second carrier frequency, a second bandwidth, and second timing characteristics.

Also or alternatively, implementations of such a storage medium may include one or more of the following features. The storage medium includes processor-readable instructions to cause the processor to: control selection of one or more of a plurality of antenna beams of the RIS; and transmit a beam indication to the UE indicating a selected one of the plurality of antenna beams of the RIS.

Another example UE includes: a transceiver configured to transmit and receive wireless signals; a memory; and a processor communicatively coupled to the transceiver and the memory and configured to: transmit, via the transceiver to a network entity, a first on-demand request for first PRS resources of a first signal type based on reception by the UE of a first DL-RS (downlink reference signal) of the first signal type from the network entity with at least a first threshold quality and lack of reception of a second DL-RS of a second signal type from the network entity with at least a second threshold quality, one of the first signal type and the second signal type being for non-RIS-reflected (non-reconfigurable-intelligent-surface-reflected) signal transfer between the network entity and the UE and another of the first signal type and the second signal type being for RIS-reflected signal transfer between the network entity and the UE; or transmit, via the transceiver to the network entity, a second on-demand request for second PRS resources for RIS-reflected signal transfer between the network entity and the UE, the second on-demand request specifying a first RIS of a plurality of RISes associated with a common base station; or transmit, via the transceiver to the network entity, a capability message indicating that the UE supports different PRS symbol durations for RIS-reflected PRS and non-RIS-reflected PRS; or any combination thereof.

Implementations of such a UE may include one or more of the following features. The processor is configured to: transmit the first on-demand request, where the first PRS resources are first downlink PRS resource or first uplink PRS resources; or transmit the second on-demand request, where the second PRS resources are second downlink PRS resource or second uplink PRS resources; or a combination thereof. The processor is configured to transmit the first on-demand request, and the first DL-RS is a path loss reference signal. The processor is configured to transmit the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS. The processor is configured to transmit the capability message via the transceiver to the network entity, and the processor is configured to transmit the capability message including a first PRS symbol duration supported by the UE for receiving the non-RIS-reflected PRS and a second PRS symbol duration supported by the UE for receiving the RIS-reflected PRS. The processor is configured to determine the second PRS symbol duration based on a separation of at least two RISes associated with the network entity.

An example method of facilitating position determination of a UE includes: transmitting, from the UE to a network entity, a first on-demand request for first PRS resources of a first signal type based on reception by the UE of a first DL-RS of the first signal type from the network entity with at least a first threshold quality and lack of reception of a second DL-RS of a second signal type from the network entity with at least a second threshold quality, one of the first signal type and the second signal type being for non-RIS-reflected signal transfer between the network entity and the UE and another of the first signal type and the second signal type being for RIS-reflected signal transfer between the network entity and the UE; or transmitting, from the UE to the network entity, a second on-demand request for second PRS resources for RIS-reflected signal transfer between the network entity and the UE, the second on-demand request specifying a first RIS of a plurality of RISes associated with a common base station; or transmitting, from the UE to the network entity, a capability message indicating that the UE supports different PRS symbol durations for RIS-reflected PRS and non-RIS-reflected PRS; or any combination thereof.

Implementations of such a method may include one or more of the following features. The method includes: transmitting the first on-demand request, where the first PRS resources are first downlink PRS resource or first uplink PRS resources; or transmitting the second on-demand request, where the second PRS resources are second downlink PRS resource or second uplink PRS resources; or a combination thereof. The method includes transmitting the first on-demand request, and the first DL-RS is a path loss reference signal. The method includes transmitting the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS. The method includes transmitting the capability message to the network entity, with the capability message including a first PRS symbol duration supported by the UE for receiving the non-RIS-reflected PRS and a second PRS symbol duration supported by the UE for receiving the RIS-reflected PRS. The method includes determining the second PRS symbol duration based on a separation of at least two RISes associated with the network entity.

Another example UE includes: a transceiver; and means, for facilitating position determination of the UE, including: means for transmitting, via the transceiver to a network entity, a first on-demand request for first PRS resources of a first signal type based on reception by the UE of a first DL-RS of the first signal type from the network entity with at least a first threshold quality and lack of reception of a second DL-RS of a second signal type from the network entity with at least a second threshold quality, one of the first signal type and the second signal type being for non-RIS-reflected signal transfer between the network entity and the UE and another of the first signal type and the second signal type being for RIS-reflected signal transfer between the network entity and the UE; or means for transmitting, via the transceiver to the network entity, a second on-demand request for second PRS resources for RIS-reflected signal transfer between the network entity and the UE, the second on-demand request specifying a first RIS of a plurality of RISes associated with a common base station; or means for transmitting, via the transceiver to the network entity, a capability message indicating that the UE supports different PRS symbol durations for RIS-reflected PRS and non-RIS-reflected PRS; or any combination thereof.

Implementations of such a UE may include one or more of the following features. The UE includes: means for transmitting the first on-demand request, where the first PRS resources are first downlink PRS resource or first uplink PRS resources; or means for transmitting the second on-demand request, where the second PRS resources are second downlink PRS resource or second uplink PRS resources; or a combination thereof. The UE includes the means for transmitting the first on-demand request, and the first DL-RS is a path loss reference signal. The UE includes the means for transmitting the second on-demand request and the means for transmitting the second on-demand request include means for transmitting the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS. The UE includes the means for transmitting the capability message to the network entity, with the capability message including a first PRS symbol duration supported by the UE for receiving the non-RIS-reflected PRS and a second PRS symbol duration supported by the UE for receiving the RIS-reflected PRS. The UE includes means for determining the second PRS symbol duration based on a separation of at least two RISes associated with the network entity.

Another example non-transitory, processor-readable storage medium includes processor-readable instructions to cause a processor of a UE to: transmit, to a network entity, a first on-demand request for first PRS resources of a first signal type based on reception by the UE of a first DL-RS of the first signal type from the network entity with at least a first threshold quality and lack of reception of a second DL-RS of a second signal type from the network entity with at least a second threshold quality, one of the first signal type and the second signal type being for non-RIS-reflected signal transfer between the network entity and the UE and another of the first signal type and the second signal type being for RIS-reflected signal transfer between the network entity and the UE; or transmit, to the network entity, a second on-demand request for second PRS resources for RIS-reflected signal transfer between the network entity and the UE, the second on-demand request specifying a first RIS of a plurality of RISes associated with a common base station; or transmit, to the network entity, a capability message indicating that the UE supports different PRS symbol durations for RIS-reflected PRS and non-RIS-reflected PRS; or any combination thereof.

Implementations of such a storage medium may include one or more of the following features. The storage medium includes processor-readable instructions to cause the processor to: transmit the first on-demand request, where the first PRS resources are first downlink PRS resource or first uplink PRS resources; or transmit the second on-demand request, where the second PRS resources are second downlink PRS resource or second uplink PRS resources; or a combination thereof. The storage medium includes processor-readable instructions to cause the processor to transmit the first on-demand request, and the first DL-RS is a path loss reference signal. The storage medium includes processor-readable instructions to cause the processor to transmit the second on-demand request and the processor-readable instructions to cause the processor to transmit the second on-demand request include processor-readable instructions to cause the processor to transmit the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS. The storage medium includes the processor-readable instructions to cause the processor to transmit the capability message to the network entity, with the capability message including a first PRS symbol duration supported by the UE for receiving the non-RIS-reflected PRS and a second PRS symbol duration supported by the UE for receiving the RIS-reflected PRS. The storage medium includes processor-readable instructions to cause the processor to determine the second PRS symbol duration based on a separation of at least two RISes associated with the network entity.

Another example network entity includes: a transceiver configured to transmit and receive wireless signals; a memory; and a processor communicatively coupled to the transceiver and the memory and configured to: receive, via the transceiver from a UE, a capability message indicating a first PRS symbol duration of the UE for processing DL-PRS of a first signal type and a second PRS symbol duration of the UE for processing second DL-PRS of a second signal type, the first signal type being for non-RIS-reflected signal transfer between the network entity and the UE and the second signal type being for RIS-reflected signal transfer between the network entity and the UE; and schedule, based on the capability message, second resources of the second DL-PRS of the second signal type such that the second resources of the second DL-PRS span no more than the second PRS symbol duration.

Implementations of such a network entity may include one or more of the following features. The second PRS symbol duration is shorter in time than the first PRS symbol duration, and the processor is configured to schedule, based on the capability message, first resources of a first DL-PRS of the first signal type such that the first resources of the first DL-PRS span no more than the first PRS symbol duration. The first PRS symbol duration is a quantity of slots and the second PRS symbol duration is a sub-slot quantity of symbols.

A downlink positioning reference signal scheduling method includes: receiving, at a network entity from a UE, a capability message indicating a first PRS symbol duration of the UE for processing DL-PRS of a first signal type and a second PRS symbol duration of the UE for processing second DL-PRS of a second signal type, the first signal type being for non-RIS-reflected signal transfer between the network entity and the UE and the second signal type being for RIS-reflected signal transfer between the network entity and the UE; and scheduling, based on the capability message, second resources of the second DL-PRS of the second signal type such that the second resources of the second DL-PRS span no more than the second PRS symbol duration.

Implementations of such a method may include one or more of the following features. The second PRS symbol duration is shorter in time than the first PRS symbol duration, and the method includes scheduling, based on the capability message, first resources of a first DL-PRS of the first signal type such that the first resources of the first DL-PRS span no more than the first PRS symbol duration. The first PRS symbol duration is a quantity of slots and the second PRS symbol duration is a sub-slot quantity of symbols.

Another example network entity includes: means for receiving, from a UE, a capability message indicating a first PRS symbol duration of the UE for processing DL-PRS of a first signal type and a second PRS symbol duration of the UE for processing second DL-PRS of a second signal type, the first signal type being for non-RIS-reflected signal transfer between the network entity and the UE and the second signal type being for RIS-reflected signal transfer between the network entity and the UE; and means for scheduling, based on the capability message, second resources of the second DL-PRS of the second signal type such that the second resources of the second DL-PRS span no more than the second PRS symbol duration.

Implementations of such a network entity may include one or more of the following features. The second PRS symbol duration is shorter in time than the first PRS symbol duration, and the network entity includes means for scheduling, based on the capability message, first resources of a first DL-PRS of the first signal type such that the first resources of the first DL-PRS span no more than the first PRS symbol duration. The first PRS symbol duration is a quantity of slots and the second PRS symbol duration is a sub-slot quantity of symbols.

Another example non-transitory, processor-readable storage medium includes processor-readable instructions to cause a processor of a network entity to: receive, from a UE, a capability message indicating a first PRS symbol duration of the UE for processing DL-PRS of a first signal type and a second PRS symbol duration of the UE for processing second DL-PRS of a second signal type, the first signal type being for non-RIS-reflected signal transfer between the network entity and the UE and the second signal type being for RIS-reflected signal transfer between the network entity and the UE; and schedule, based on the capability message, second resources of the second DL-PRS of the second signal type such that the second resources of the second DL-PRS span no more than the second PRS symbol duration.

Implementations of such a storage medium may include one or more of the following features. The second PRS symbol duration is shorter in time than the first PRS symbol duration, and the storage medium includes processor-readable instructions to cause the processor to schedule, based on the capability message, first resources of a first DL-PRS of the first signal type such that the first resources of the first DL-PRS span no more than the first PRS symbol duration. The first PRS symbol duration is a quantity of slots and the second PRS symbol duration is a sub-slot quantity of symbols.

Another example network entity includes: a transceiver configured to transmit and receive wireless signals, a memory; and a processor communicatively coupled to the transceiver and the memory and configured to: receive, via the transceiver from a UE, at least one signal including at least one of: (1) a measurement indication indicating a first measurement of a first signal type, or a second measurement of a second signal type, or a combination thereof, the first signal type being for non-RIS-reflected signal transfer between the network entity and the UE and the second signal type being for RIS-reflected signal transfer between the network entity and the UE; or (2) a first UL-PRS of the first signal type, or a second UL-PRS of the second signal type, or a combination thereof; or (3) an indication of a power-saving mode of the UE; and transmit, to the UE via the transceiver, a message in response to the at least one signal, the message indicating for the UE to report measurement of DL-PRS (downlink PRS) of only one type of the first signal type or the second signal type, or indicating for the UE to transmit UL-PRS of only one type of the first signal type or the second signal type, or a combination thereof.

Implementations of such a network entity may include one or more of the following features. The indication of the power-saving mode of the UE includes a request for the UE to operate in the power-saving mode. The one type of the first signal type or the second signal type indicated by the message corresponds to better measurement quality of signal transfer between the network entity and the UE.

An example method of controlling signal exchange includes: receiving, from a UE, at least one signal including at least one of: (1) a measurement indication indicating a first measurement of a first signal type, or a second measurement of a second signal type, or a combination thereof, the first signal type being for non-RIS-reflected signal transfer between the network entity and the UE and the second signal type being for RIS-reflected signal transfer between the network entity and the UE; or (2) a first UL-PRS of the first signal type, or a second UL-PRS of the second signal type, or a combination thereof; or (3) an indication of a power-saving mode of the UE; and transmitting, to the UE, a message in response to the at least one signal, the message indicating for the UE to report measurement of DL-PRS (downlink PRS) of only one type of the first signal type or the second signal type, or indicating for the UE to transmit UL-PRS of only one type of the first signal type or the second signal type, or a combination thereof.

Implementations of such a method may include one or more of the following features. The indication of the power-saving mode of the UE includes a request for the UE to operate in the power-saving mode. The one type of the first signal type or the second signal type indicated by the message corresponds to better measurement quality of signal transfer between the network entity and the UE.

Another example network entity includes: means for receiving, from a UE, at least one signal including at least one of: (1) a measurement indication indicating a first measurement of a first signal type, or a second measurement of a second signal type, or a combination thereof, the first signal type being for non-RIS-reflected signal transfer between the network entity and the UE and the second signal type being for RIS-reflected signal transfer between the network entity and the UE; or (2) a first UL-PRS of the first signal type, or a second UL-PRS of the second signal type, or a combination thereof; or (3) an indication of a power-saving mode of the UE; and means for transmitting, to the UE, a message in response to the at least one signal, the message indicating for the UE to report measurement of DL-PRS (downlink PRS) of only one type of the first signal type or the second signal type, or indicating for the UE to transmit UL-PRS of only one type of the first signal type or the second signal type, or a combination thereof.

Implementations of such a network entity may include one or more of the following features. The indication of the power-saving mode of the UE includes a request for the UE to operate in the power-saving mode. The one type of the first signal type or the second signal type indicated by the message corresponds to better measurement quality of signal transfer between the network entity and the UE.

Another example non-transitory, processor-readable storage medium includes processor-readable instructions to cause a processor of a network entity to: receive, from a UE, at least one signal including at least one of: (1) a measurement indication indicating a first measurement of a first signal type, or a second measurement of a second signal type, or a combination thereof, the first signal type being for non-RIS-reflected signal transfer between the network entity and the UE and the second signal type being for RIS-reflected signal transfer between the network entity and the UE; or (2) a first UL-PRS of the first signal type, or a second UL-PRS of the second signal type, or a combination thereof; or (3) an indication of a power-saving mode of the UE; and transmit, to the UE, a message in response to the at least one signal, the message indicating for the UE to report measurement of DL-PRS (downlink PRS) of only one type of the first signal type or the second signal type, or indicating for the UE to transmit UL-PRS of only one type of the first signal type or the second signal type, or a combination thereof.

Implementations of such a storage medium may include one or more of the following features. The indication of the power-saving mode of the UE includes a request for the UE to operate in the power-saving mode. The one type of the first signal type or the second signal type indicated by the message corresponds to better measurement quality of signal transfer between the network entity and the UE.

DETAILED DESCRIPTION

Figure 1:
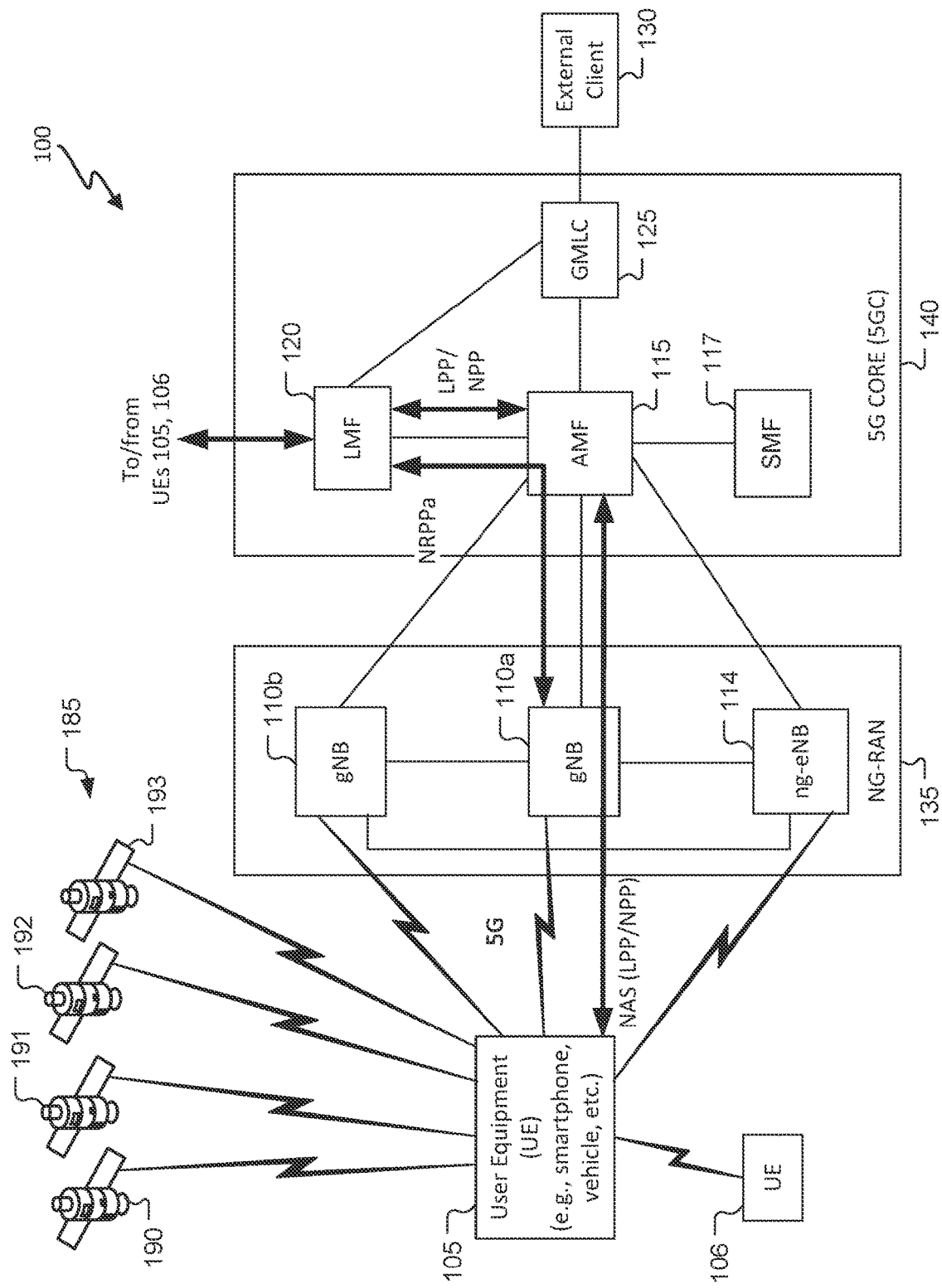
FIG. 1 is a simplified diagram of an example wireless communications system.

Techniques are discussed herein regarding defining and using different signal types for signals (e.g., reference signals such as path loss reference signals, synchronization signals, channel state information reference signals, positioning reference signals (PRS), etc.), with one type of signal travelling between a user equipment (UE) and a base station without being reflected by a reconfigurable intelligent surface (RIS) and another type of signal being reflected by a RIS between the UE and the base station. For example, the different types of signals may have one or more different transmission characteristic values (e.g., different repetition factor, different carrier frequency, different bandwidth, different beam, one or more different timing characteristic values, etc.), and/or different codewords. The different types of signals may include downlink signals and/or uplink signals, e.g., downlink reference signals (DL-RS) and/or uplink PRS, etc. As another example, various quasi co-location types may be supported for the signal types. As another example, the UE may provide a capability message to indicate the ability of the UE to support (e.g., measure) the different signal types. As another example, the UE may receive both signal types and give higher priority (e.g., for measuring and/or reporting) to the non-RIS-reflected signals over RIS-reflected signals (e.g., such that a RIS-reflected may not be measured while a non-RIS-reflected signal is measured and/or such that a measurement of a non-RIS-reflected signal is reported while a measurement of a RIS-reflected signal may not be reported). As another example, the UE may measure both signal types and provide a measurement report that includes only the measurement information for the signal measurement having higher quality. The UE may avoid measuring or attempting to measure (e.g., skip one or more scheduled measurements of) one type of signal from a base station if the UE does not expect to be able to measure that type of signal at all, or with at least a threshold quality, or expects to measure the other type of signal with significantly higher quality. For example, if the UE is unable to measure a reference signal of one type (e.g., RIS reflected or not RIS reflected), or measures the reference signal but with poor quality, then the UE may stop measuring (skip scheduled measurements of) that type of signal and skip the corresponding measurement report. As another example, if the UE measures a RIS-reflected reference signal and a non-RIS-reflected reference signal and one has significantly higher quality, then the UE may stop measuring the type of signal that was received with significantly lower quality. The UE may indicate to the base station and/or to a location server that the UE is skipping one or more measurements of a specified signal type and/or specified signal. These are examples, and other examples may be implemented.

Techniques are discussed herein in particular regarding RIS-reflected uplink signals and non-RIS-reflected uplink signals, e.g., uplink PRS (i.e., sounding reference signals (SRS) for positioning). For example, RIS-reflected downlink reference signals may be used to determine downlink path losses and the downlink path losses used to set uplink transmission powers for RIS-reflected uplink signals and non-RIS-reflected uplink signals, respectively. As another example, measurements of downlink signals may be used to determine one or more antenna beams to use for uplink signal transmission. As another example, a presently-used beam for uplink transmission may be defined relevant to a beam, e.g., to a previously-used beam which may be the same beam as the presently-used beam. As another example, a base station may provide information to a UE as to a receive beam that will be used (e.g., by a RIS) to receive uplink signals from the UE. As another example, a UE may determine that the UE is unable to measure a downlink signal (at all or at least not with at least a threshold quality) and, in response, not attempt to perform a scheduled measurement and indicate that the UE is not performing the scheduled measurement. The UE may indicate that a corresponding uplink signal (e.g., an uplink PRS) will not be sent by the UE, e.g., for implementations of operations involving corresponding downlink and uplink signal exchange (e.g., round-trip-time positioning).

Techniques are discussed herein regarding downlink PRS (DL-PRS) and/or uplink PRS (UL-PRS) signaling, e.g., on-demand requests for DL-PRS and/or UL-PRS, PRS symbol duration for processing received PRS, etc. For example, a UE may send on-demand requests for DL-PRS, which may request one or more specific PRS parameter values and/or may request PRS from a specific base station. As another example, a UE may request allocation of resources for a specific type of UL-PRS, e.g., a RIS-reflected UL-PRS in response to the UE being unable to measure a non-RIS-reflected DL-RS (at least with adequate quality). As another example, a UE may request a specific RIS to be used for DL-PRS and/or UL-PRS, e.g., based on measurement (or attempted measurement) of a RIS-reflected DL-RS. As another example, a UE may report a symbol duration to be used by the UE for processing PRS and a network entity (e.g., a base station and/or a server) may allocate DL-PRS resources that correspond to (e.g., fit within) the reported symbol duration.

Still other techniques are discussed herein.

Items and/or techniques described herein may provide one or more of the following capabilities, as well as other capabilities not mentioned. Measurement of RIS-reflected signals may be enhanced, e.g., by providing more repetitions for RIS-reflected signals. Positioning latency may be reduced, e.g., by reporting a stronger measurement before a weaker measurement and/or by indicating that a measurement of a particular signal will not be reported. Measurement accuracy when using RIS-reflected and non-RIS-reflected signals may be enhanced. Power control for transmitting RIS-reflected and non-RIS-reflected signals may be improved. Beam management when using RIS-reflected and non-RIS-reflected signals may be enhanced. Power consumption for positioning may be reduced, e.g., by avoiding PRS transmissions and/or measurements (e.g., that are unlikely to improve positioning accuracy), by using on-demand requests for PRS, and/or by allocating PRS to correspond to sub-slot processing capability of a UE. Energy may be saved by avoiding sounding reference signal (SRS) transmissions, e.g., SRS transmissions corresponding to positioning reference signals that were not received (at least with a threshold quality), and/or SRS transmissions that are not expected to be received with at least a threshold quality. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS (Synchronization Signal) or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
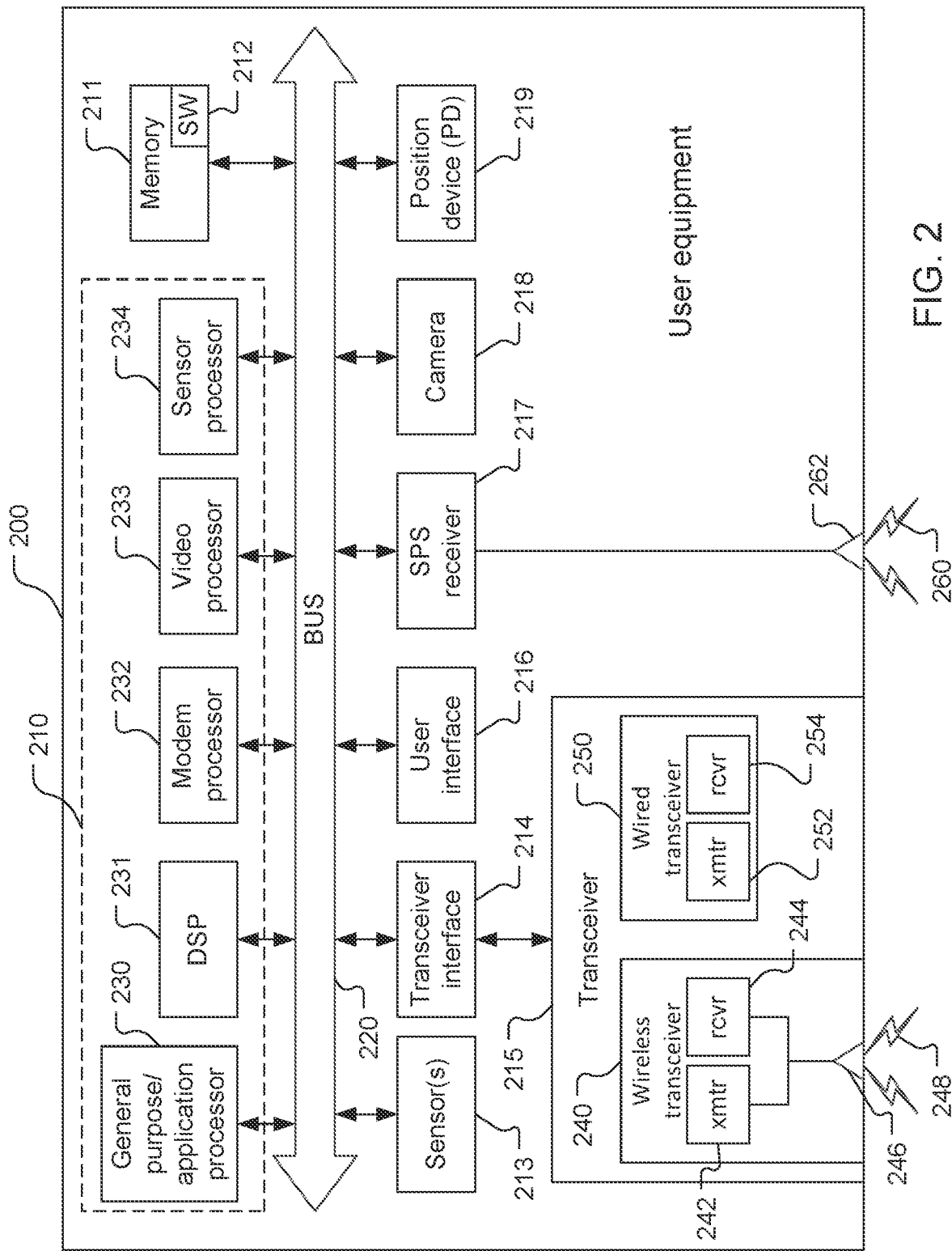
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more cellular wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
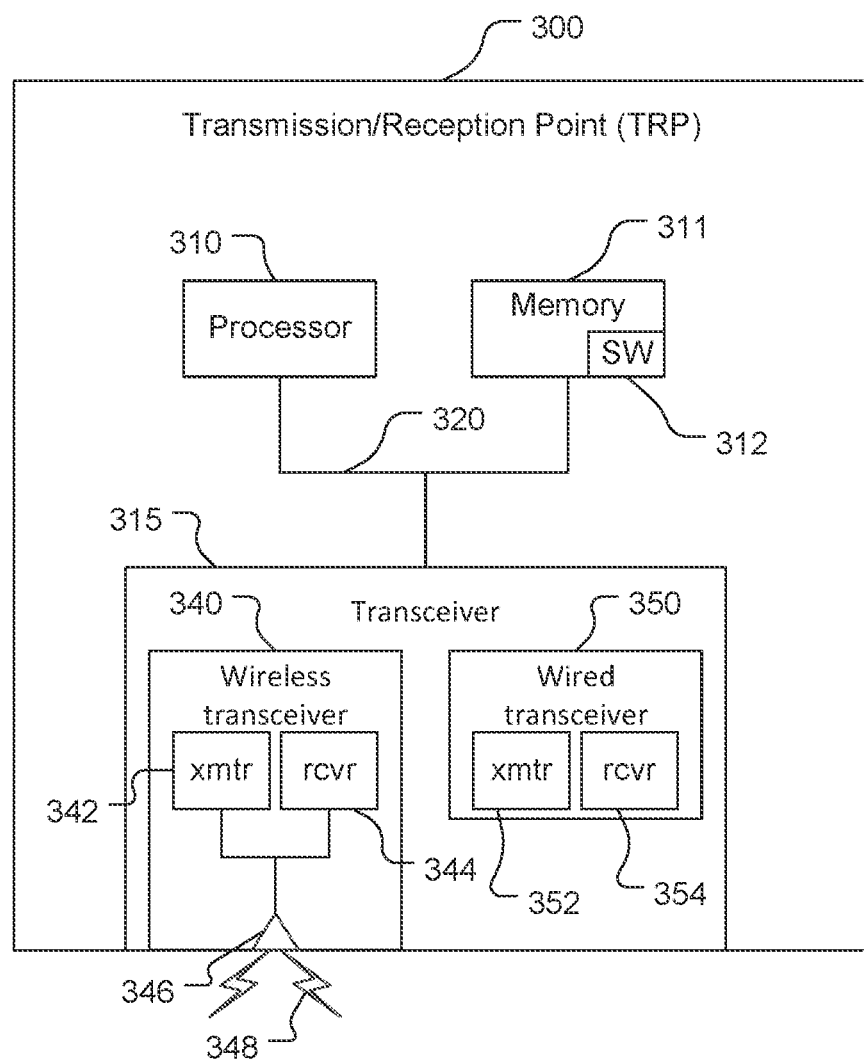
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
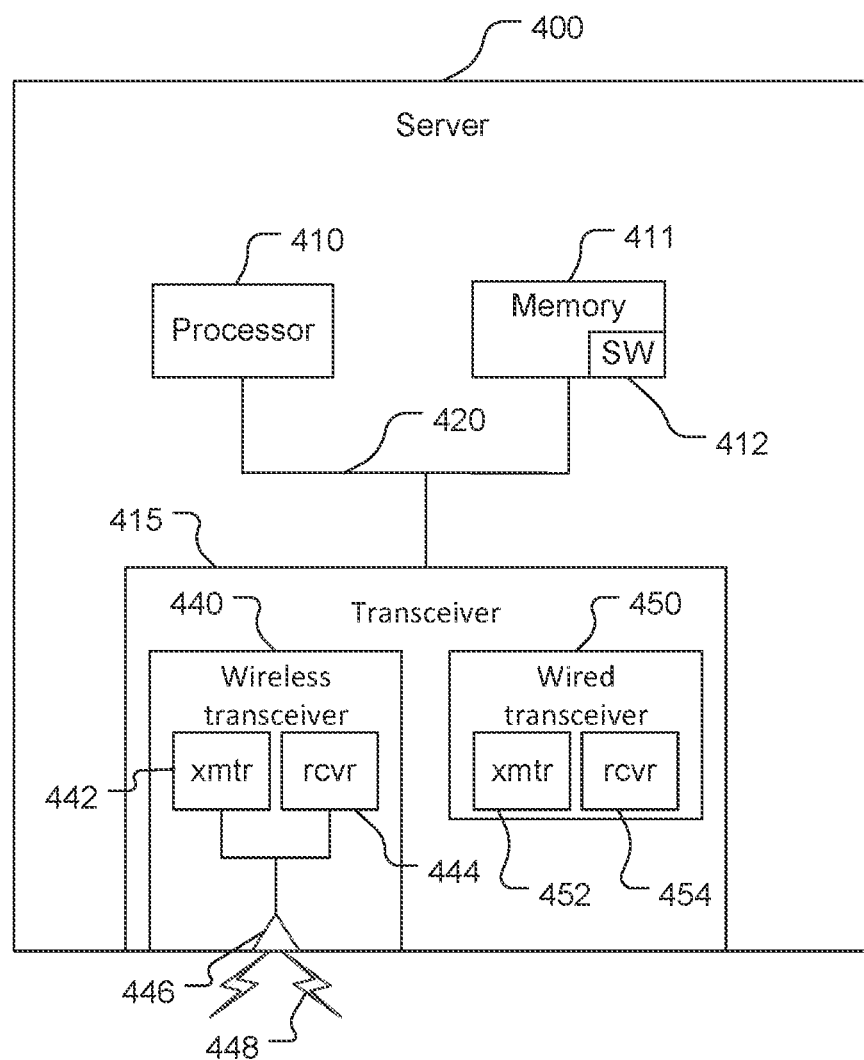
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx\text{-}Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRPS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest sub-carrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Environments Using RIS Reflections

Figure 5:
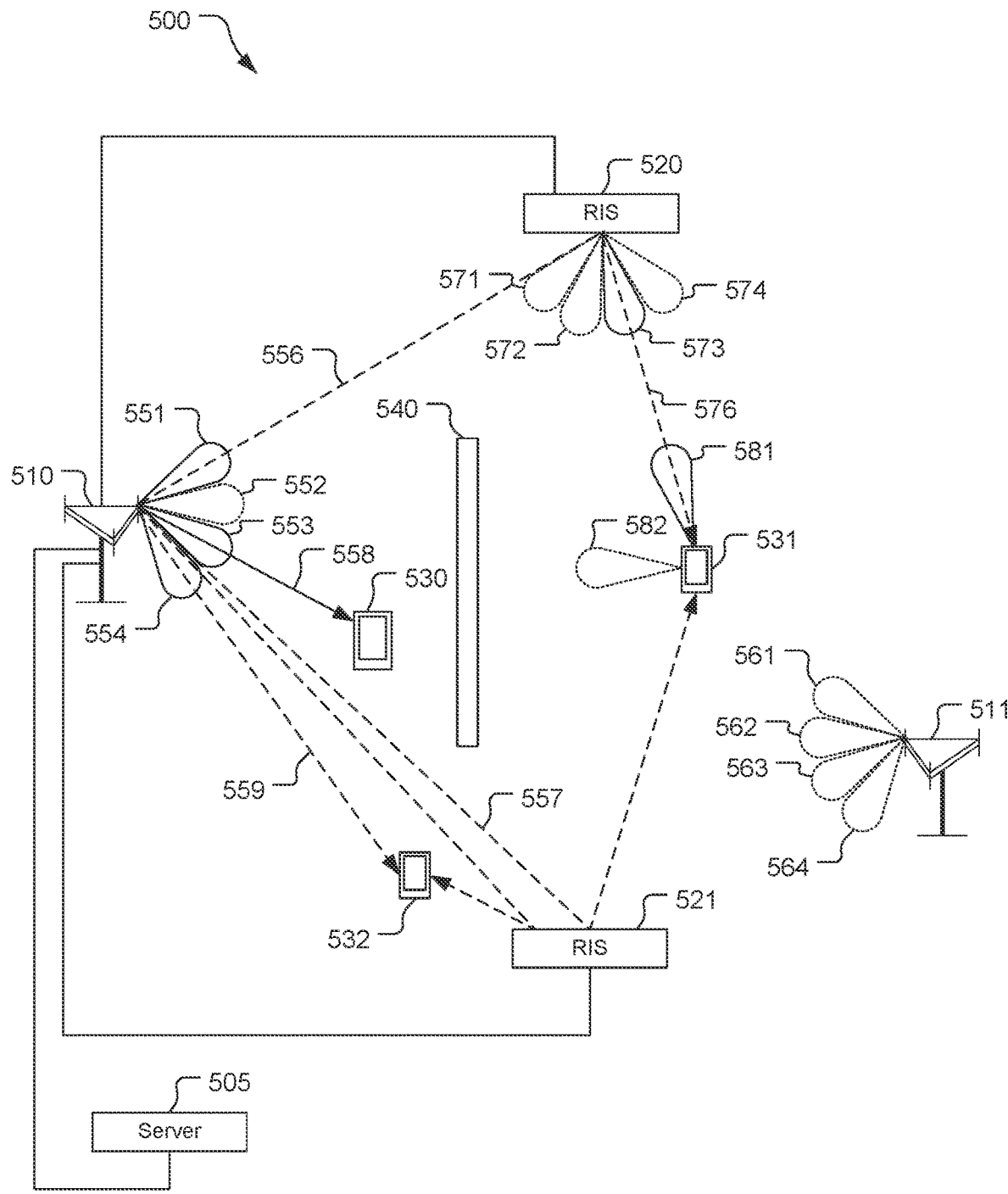
FIG. 5 is a simplified diagram of a wireless communication environment including RISes (reconfigurable intelligent surfaces).

Referring to FIG. 5, a wireless communication environment 500 includes a server 505, TRPs 510, 511, reconfigurable intelligent surfaces (RISes) 520, 521, UEs 530, 531, 532 and an obstacle 540 (e.g., a building or other object that inhibits/blocks RF signals). The server 505 may be an example of the server 400, the TRPs 510, 511 may be examples of the TRP 300, and the UEs 530, 531 may be examples of the UE 200 or examples of other UEs discussed herein (e.g., as discussed with respect to FIG. 6). The TRPs 510, 511 are configured to communicate (transmit and/or receive wireless signals) with at least antenna beams 551, 552, 553, 554, 561, 562, 563, 564, respectively. The RISes 520, 521 are artificial structures with engineered electromagnetic (EM) properties. The RISes 520, 521 are configured to receive wireless signals from a transmitter (e.g., a base station or UE) and passively beamform and retransmit (e.g., without power amplification) the received signals via one or more beams, with the retransmitted signals referred to as reflected signals, toward a receiver (e.g., a base station or UE). A RIS can be configured to reflect an impinging signal to a desired direction. For example, each of the RISes 520, 521 may be dynamically configured to transmit the respective reflected signals toward one or more receivers such as one or more of the UEs 530-532. The RIS 520 is configured, in this example, to use antenna beams 571, 572, 573, 574 to transmit and/or receive wireless signals.

In the example illustrated in FIG. 5, the TRP 510 is connected to, and configured to control, the RISes 520, 521 to control the direction(s) of the reflected signals from the RISes 520, 521. As shown, the TRP 510 is unable to communicate directly with the UE 531 due to the obstacle 540 being disposed along the line of sight (LOS) direction between the TRP 510 and the UE 531 (e.g., the beam 552 from the TRP 510 to the UE 531). The UE 531 is disposed behind the obstacle 540 relative to the TRP 510 and thus unable to receive an LOS beam (the beam 552) from the TRP 510. The TRP 510 may be aware that the obstacle 540 creates a coverage hole, i.e., a geographic area in which signals from the TRP 510 cannot directly reach or may reach but be attenuated enough to make detection of the signal difficult or impossible by a UE within the coverage hole. In this scenario, the TRP 510 may bounce a signal off of one or more RISes into the coverage hole to provide coverage to devices in the coverage hole, including devices about which the TRP 510 is not currently aware. For example, the TRP 510 may use the beam 551 to transmit a signal 556 to the RIS 520, and control the RIS 520 to reflect the incoming signal into the beam 573 to transmit a reflected signal 576 toward the UE 531, thereby communicating with the UE 531 around the obstacle 540. The TRP 510 may configure the RIS 520 to reflect UL signals from the UE 531 into the beam 571 to the TRP 510.

The environment may be used to help with signal exchange between one or more TRPs and one or more low-tier (e.g., low-power, low-bandwidth, low-antenna-count, low baseband processing capability) UEs, such as an "NR light" UE or a reduced-capability UE (i.e., an "NR RedCap" UE), which may not have the capability to hear or detect a PRS transmitted from a non-serving TRP, especially from a TRP that is far from the UE. Likewise, an SRS measurement by a non-serving TRP of an SRS from a low-tier UE may be of lower quality than an SRS measurement from a UE that is not a low-tier UE. The use of one or more of the RISes 520, 521 may enable the exchange of one or more additional signals between the TRP 510 and the UE 531. The use of the RISes 520, 521 from a single TRP, here the TRP 510, may reduce or eliminate synchronization errors that may occur with multiple signals from multiple TRPs, which may help improve, for example, positioning accuracy based on signal exchange between the TRP 510 and the UE 531.

One or more of the UEs 530-532 may be within a coverage area of a TRP, e.g., the TRP 510, only without RIS signal reflection (e.g., the UE 530), only with RIS signal reflection (e.g., the UE 531), with or without RIS signal reflection (e.g., the UE 532), or not within the coverage area of the TRP (although not shown in FIG. 5). Due to mobility of the UEs 530-532, any of the UEs 530-532 may be in one coverage situation (e.g., only without RIS reflection) at one time and another coverage situation (e.g., only with RIS reflection) at another time. Also, a UE may not be able to receive and measure signals from both the TRP 510 directly and from the RIS 520 at the same time/location due to the beam directions of the signals from the TRP 510 and the RIS 520, respectively. For example, the UE 531 may attempt to measure a synchronization signal (e.g., an SSB (Synchronization Signal Block)) transmitted by the TRP 510 in each of the beams 551-554 and be unable to measure the synchronization signal from any of the beams 551-554, but be able to measure the synchronization signal sent in the beam 551 and reflected in the beam 573 from the RIS 520 using a beam 581 of the UE 531. The UE 531 may not be able to measure a signal in the beam 573 adequately using a beam 582 directed in an LOS direction toward the TRP 510.

Figure 6:
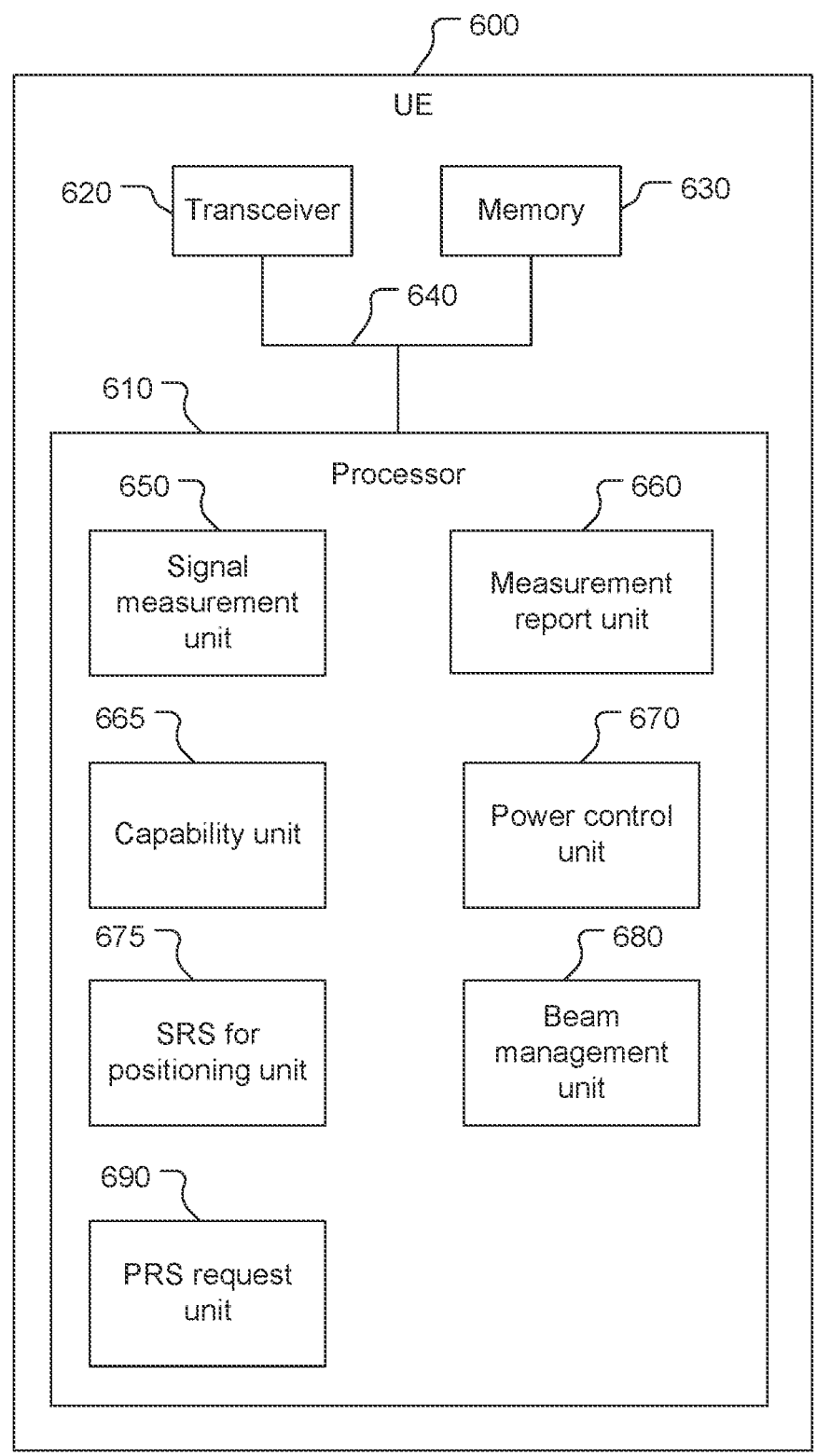
FIG. 6 is a simplified diagram of example user equipment (UE).

Referring to FIG. 6, with further reference to FIGS. 1-5, a UE 600 includes a processor 610, a transceiver 620, and a memory 630 communicatively coupled to each other by a bus 640. The UE 600 may include the components shown in FIG. 6, and may include one or more other components such as any of those shown in FIG. 2 such that the UE 200 may be an example of the UE 600. For example, the processor 610 may include one or more of the components of the processor 210. The transceiver 620 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 620 may include the wired transmitter 252 and/or the wired receiver 254. The memory 630 may be configured similarly to the memory 211, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the UE 600 performing a function as shorthand for one or more appropriate components (e.g., the processor 610 and the memory 630) of the UE 600 performing the function. The processor 610 (possibly in conjunction with the memory 630 and, as appropriate, the transceiver 620 and/or one or more other components of the UE 600) may include a signal measurement unit 650, a measurement report unit 660, a capability unit 665, a power control unit 670, an SRS for positioning unit 675, a beam management unit 680, and/or a PRS request unit 690. The signal measurement unit 650, the measurement report unit 660, the capability unit 665, the power control unit 670, the SRS for positioning unit 675, the beam management unit 680, and the PRS request unit 690 are discussed further below, and the description may refer to the processor 610 generally, or the UE 600 generally, as performing any of the functions of the signal measurement unit 650, the measurement report unit 660, the capability unit 665, the power control unit 670, the SRS for positioning unit 675, the beam management unit 680, and/or the PRS request unit 690.

Figure 7:
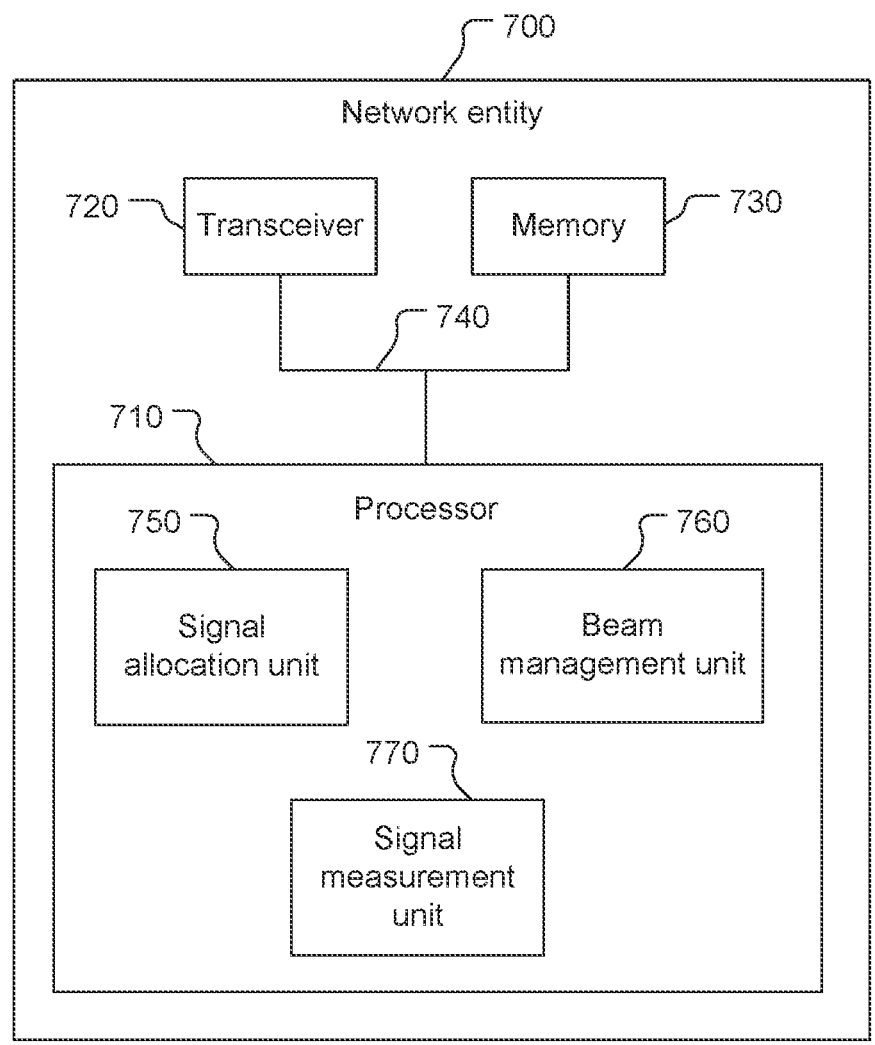
FIG. 7 is a block diagram of a network entity.

Referring also to FIG. 7, a network entity 700 includes a processor 710, a transceiver 720, and a memory 730 communicatively coupled to each other by a bus 740. The network entity 700 may include the components shown in FIG. 7, and may include one or more other components such as any of those shown in FIG. 3 and/or FIG. 4 such that the TRP 300 may be an example of the network entity 700 and/or the server 400 may be an example of the network entity 700 (e.g., the network entity 700 may comprise TRP and/or server components and be configured to perform TRP and/or server functionality). For example, the transceiver 720 may include one or more of the components of the transceiver 315 and/or the transceiver 415, e.g., the antenna 346 and the wireless transmitter 342 and/or the wireless receiver 344, and/or the antenna 446 and the wireless transmitter 442 and/or the wireless receiver 444. Also or alternatively, the transceiver 720 may include the wired transmitter 352, the wired receiver 354, the wired transmitter 452, and/or the wired receiver 454. The memory 730 may be configured similarly to the memory 311 and/or the memory 411, e.g., including software with processor-readable instructions configured to cause the processor 710 to perform functions. In the discussion herein, the network entity 700 is assumed to include both the TRP 510 and the server 505.

The description herein may refer to the processor 710 performing a function, but this includes other implementations such as where the processor 710 executes software (stored in the memory 730) and/or firmware. The description herein may refer to the network entity 700 performing a function as shorthand for one or more appropriate components (e.g., the processor 710 and the memory 730) of the network entity 700 performing the function. The processor 710 (possibly in conjunction with the memory 730 and, as appropriate, the transceiver 720 and one or more other components of the network entity 700) may include a signal allocation unit 750, a beam management unit 760, and a signal measurement unit 770. The signal allocation unit 750, the beam management unit 760, and the signal measurement unit 770 are discussed further below, and the description may refer to the processor 710 generally, or the network entity 700 generally, as performing any of the functions of the signal allocation unit 750, the beam management unit 760, and/or the signal measurement unit 770.

Non-RIS-Reflected Signals and RIS-Reflected Signals

To facilitate servicing of different coverage areas with non-RIS-reflected signals and RIS-reflected signals, different types of signals may be used for non-RIS-reflected signals and RIS-reflected signals corresponding to the different coverage areas. Thus, for example, the signal allocation unit 750 is configured to allocate resources for signals to be reflected by the RISes 520, 521 between the TRP 510 and the UE 531 and to allocate resources for signals to be exchanged between the TRP 510 and the UEs 530, 532 without reflection by a RIS. Non-RIS-reflected DL signals (LOS signals) may be referred to as type-1 DL signals and RIS-reflected signals may be referred to as type-2 DL signals. For example, the signal 556 and a signal 557 are type-2 DL signals, and signals 558, 559 are type-1 DL signals. Type-1 DL signals and/or type-2 DL signals may include a variety of signals such as reference signals (e.g., PRS, SSB, CSI-RS (Channel State Information Reference Signal(s)), etc.). Type-1 and type-2 DL signals may have one or more different transmission characteristic values (e.g., different carrier frequencies, different frequency layers, different repetition factors, different bandwidths, different beams, different timing (e.g., different slots, different symbol sets (e.g., durations), different time offsets, etc.), etc.), and/or different codewords (i.e., have different codewords applied to the different signal types). Type-2 DL signals, typically being of lower power than type-1 DL signals upon receipt, may be configured by the signal allocation unit 750 with larger repetition factors than type-1 signals to assist receivers (e.g., UEs) in receiving and measuring the type-2 signals. Thus, the type-2 repetitions may be repeated more and/or more often to facilitate integration of more repetitions to facilitate signal measurement. The repetition factors may depend on implementation, e.g., knowledge of locations of TRPs, RISes, and blockages. A location server (e.g., the server 505) may store locations of TRPs and RISes and where the TRPs and RISes can direct signals. While a RIS may be moved, the server may have the present location of the RIS stored (e.g., updated as appropriate such as in response to the RIS being moved, and possibly in response to a threshold time having passed while the RIS is stationary). Beams of the type-1 DL signals may cover larger areas than areas covered by beams of the type-2 DL signals, e.g., due to beams of the type-1 DL signals being transmitted over longer distances than the beams of the type-2 DL signals.

Type-1 DL signals are associated with their transmitting TRPs and type-2 DL signals are associated with their transmitting TRPs and with their reflecting RISes. For example, the signal allocation unit 750 may produce and transmit type-1 signals to include a TRP ID of the TRP 510 and may produce and transmit each type-2 signals to include the TRP ID of the TRP 510 and a RIS ID of the respective RIS to which the type-2 signal is sent and by which the type-2 signal is reflected. For example, the type-2 signal 556 may include the TRP ID of the TRP 510 and a RIS ID of the RIS 520, and the type-2 signal 557 may include the TRP ID of the TRP 510 and a RIS ID of the RIS 521. The signal allocation unit 750 may be configured to scramble type-2 signals, e.g., the signals 556, 557, using the TRP ID and the respective RIS ID (i.e., use the TRP ID and the RIS ID as a seed for producing a pseudorandom sequence of a signal such as a PRS). The signal measurement unit 650 of the UE 600 may be configured to descramble each pseudorandom type-2 signal (e.g., a type-2 PRS) using the respective TRP ID and RIS ID. As multiple RISes may be associated with a single TRP, e.g., the RISes 520, 521 associated with the TRP 510, one of the RISes may be selected as a serving RIS and each of the one or more other RISes will then be a neighboring RIS (and whether a RIS is a serving RIS or a neighboring RIS may change over time).

The beam management unit 760 can select a beam for transmitting a signal, and may provide beam information in the transmitted signal. For example, the beam management unit 760 may be configured to provide indications as to the QCL type of a transmitted signal. For example, the beam management unit 760 may have a transmitted source signal include QCL information indicating that the source signal is QCL-TypeC or QCL-TypeD with a DL-PRS. The network entity 700 may be configured to support, for a type-1 DL-PRS, QCL-TypeC for a type-1 SSB source signal from a serving or neighboring TRP or QCL-TypeD for a type-1 DL-PRS source signal, or a type-1 SSB source signal, from a serving or neighboring TRP. The network entity 700 may be configured to support, for a type-2 DL-PRS, QCL-TypeC for a type-2 SSB source signal from a serving or neighboring RIS or QCL-TypeD for a type-2 DL-PRS source signal, or a type-2 SSB source signal, from a serving or neighboring RIS. QCL-TypeD refers to transmission using different antenna ports having common downlink angle of arrival (e.g., dominant AoA and average AoA). QCL-TypeC refers to transmission using different antenna ports having common Doppler shift and average delay.

Figure 8:
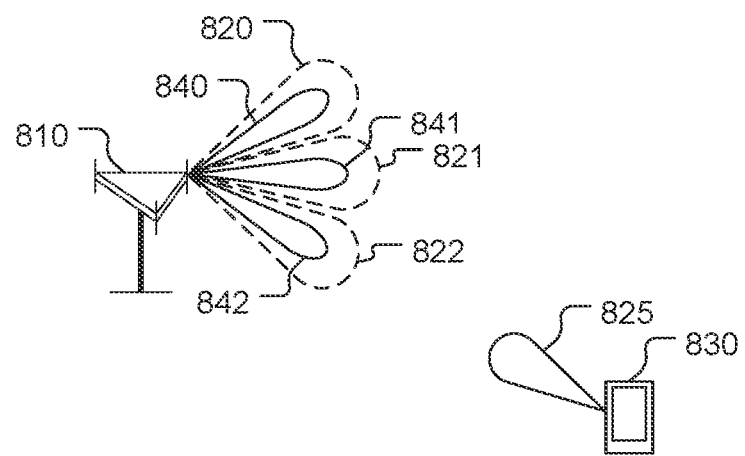
FIG. 8 is a simplified diagram of signaling between a base station and a UE.

Referring also to FIG. 8, the beam management unit 760 of the network entity 700 is configured to transmit multiple source signal beams 820, 821, 822 from a TRP 810 with a source signal to be measured. The source signal may be any of a variety of signals, e.g., an SSB, a PRS, a CSI-RS, etc. The processor 710 can provide, through LPP, a time-frequency location for SSB transmissions on neighbor TRPs. The beam management unit 760, possibly in combination with the signal allocation unit 750, is configured to transmit a synchronization signal (e.g., an SSB) to establish connections with UEs. The UE 830, e.g., the signal measurement unit 650, may measure the synchronization signal and establish communication with the TRP 810 based on receiving the synchronization signal. The capability unit 665 of the UE 600 may provide a capability report indicating a quantity of source signals that the UE 600 can measure. The TRP 810, e.g., the signal allocation unit 750 and the beam management unit 760, may transmit the UE 830 information indicating the source signal beams, e.g., the source signal beams 820-822 to be used to transmit a source signal (e.g., SSB, PRS), and respective resource allocations for the source signal to be sent in the source signal beams 820-822. The network entity 700 may transmit the source signal using a number of source signal beams equal to or less than the quantity of beams indicated in the capability report that the UE can measure. The signal measurement unit 650, e.g., of a UE 830, is configured to measure the source signal using one or more receive beams (e.g., a receive beam 825) and determine from which of the source signal beams 820-822 the source signal was measured with the best quality (e.g., the highest RSRP). The measurement report unit 660 is configured to transmit a report to the network entity 700 indicating the source signal beam 820-822 from which the highest quality measurement was determined. When the measurement report unit 660 reports RS RSRP measurement (e.g., SSB RSRP or PRS RSRP) on RS resources from the same set, the measurement report unit 660 may indicate which RS RSRP measurements were measured using the same receive beam.

The source signal beams 820-822 are QCLed with respective DL-PRS beams 840, 841, 842, and thus DL-PRS may be sent by the beam management unit 760 with the PRS beam 840-841 that is QCLed with the source signal beam 820-822 indicated by the UE as the source signal beam 820-822 from which the highest quality measurement was determined. The source signal beams 820-822 each have a source signal index number (e.g., an SSB index if the source signal is an SSB). If multiple source signals associated with different beams are QCLed with a single DL-PRS, then the same index is used for the multiple source signals (e.g., the same SSB index for a DL-PRS that is QCL-TypeC and QCL-TypeD with an SSB). A QCL relation between two type-1 PRS may be provided for PRS resources associated with the same TRP and a QCL relation between two type-2 PRS may be provided for PRS resources associated with the same RIS. As discussed above, the network entity 700 may support, for a type-1 DL-PRS, QCL-TypeC for a type-1 SSB source signal from a serving or neighboring TRP or QCL-TypeD for a type-1 DL-PRS source signal, or a type-1 SSB source signal, from a serving or neighboring TRP. Also as discussed above, the network entity 700 may support, for a type-2 DL-PRS, QCL-TypeC for a type-2 SSB source signal from a serving or neighboring RIS or QCL-TypeD for a type-2 DL-PRS source signal, or a type-2 SSB source signal, from a serving or neighboring RIS.

For QCL for type-2 (i.e., RIS-reflected) PRS, the network entity 700 and/or the UE 600 may follow various guidelines. For example, the network entity 700 may provide a QCL relation between two PRS resources only for PRS resources associated with the same RIS. For the QCL between one PRS and another PRS to be valid, both PRS go through the same RIS. As another example, the UE 600 may expect to be provided, through LPP from the network entity 700, time-frequency locations for SSB transmissions on RISes. The time-frequency information provided through LPP may help the UE 600 search for the SSB. As another example, if the type-2 PRS has a QCL-TypeC or QCL-TypeD source with an SSB, then the same SSB index is used. Thus, if multiple source signals associated with different beams are QCLed with a single DL-PRS, then the same index is used for the multiple source signals (e.g., the same SSB index for a DL-PRS that is QCL-TypeC and QCL-TypeD with an SSB).

The UE 600 may or may not use the QCL information provided with the source signal in processing the subsequent PRS. The network entity 700 provides the QCL information with the source signal (e.g., SSB, PRS, CSI-RS, etc.) that the UE 600 measures. The UE 600, e.g., the signal measurement unit 650 determines the source signal with the highest-quality measurement, e.g., highest measured RSRP, and the measurement report unit 660 transmits a message to the network entity 700 indicating the source beam corresponding to the highest-quality measurement. The network entity 700, e.g., the signal allocation unit 750 and the beam management unit 760, transmits a PRS with the beam corresponding to the source signal beam resulting in the highest-quality measurement, i.e., the PRS beam that is QCLed with this source signal beam. The UE 600, e.g., the signal measurement unit 650, may use the QCL type information to affect the processing of the PRS signal. For example, knowing that the PRS is QCL-TypeD with the measured source signal, the signal measurement unit 650 may use the AoD determined from the source signal without determining the AoD for the PRS (e.g., using the AoD of the source signal as the AoD for the PRS). As another example, knowing that the PRS is QCL-TypeC with the measured source signal, the signal measurement unit 650 may use the Doppler shift and/or average delay of the source signal as the Doppler shift and/or average delay, respectively, for the PRS. The UE 600, however, need not leverage the QCL information, and could determine the AoA, the Doppler shift, and/or the average delay independently of such measurements of the source signal.

The signal measurement unit 650 may be configured to measure non-RIS-reflected PRS and RIS-reflected PRS, and may prioritize measurement of one type of PRS over another. For example, the signal measurement unit 650 may search for type-1 PRS first, and search for type-2 PRS (only) in response to failing to measure a type-1 PRS. As another example, the signal measurement unit 650 may avoid measuring one or more type-2 PRS based on the UE 600 being disposed where type-2 PRS is unlikely or unable to be measured with acceptable quality, the UE 600 being disposed where the signal measurement unit 650 is able to measure type-1 PRS with at least a threshold quality, and/or measurement of type-2 PRS being unnecessary. The UE 600 may, for example, being disposed in LOS with a TRP, such as the UE 530 relative to the TRP 510 shown in FIG. 5 such that the UE 600 can measure type-1 PRS very well. As another example, the UE 600 may be disposed in a location that is blocked from a RIS, such as the UE 530 relative to the RIS 520 shown in FIG. 5 such that the UE 600 is unlikely to measure type-2 PRS from the RIS 520 with sufficient quality or unable to measure type-2 PRS from the RIS 520 at all. As another example, even if the UE 600 could measure type-1 PRS and type-2 PRS at the same location, e.g., at the location of the UE 532 shown in FIG. 5, the signal measurement unit 650 may avoid measuring type-2 PRS, e.g., if doing so is optional (e.g., sufficient measurement information exists for determining location with desired accuracy without the type-2 PRS measurement, or the type-1 measurement has already been performed successfully, e.g., with at least a threshold quality). Similarly, the signal measurement unit 650 may avoid measuring type-1 PRS based on the UE 600 being disposed where type-1 PRS is unlikely or unable to be measured with acceptable quality, the UE 600 being disposed where the signal measurement unit 650 is able to measure type-2 PRS with at least a threshold quality, and/or measurement of type-1 PRS being unnecessary. The UE 600 may, for example, being disposed in LOS with a RIS, such as the UE 531 relative to the RIS 520 shown in FIG. 5 such that the UE 600 can measure type-2 PRS very well. As another example, the UE 600 may be disposed in a location that is blocked from a TRP, such as the UE 531 relative to the TRP 510 shown in FIG. 5 such that the UE 600 is unlikely to measure type-1 PRS from the TRP 510 with sufficient quality or unable to measure type-1 PRS from the TRP 510 at all. As another example, even if the UE 600 could measure type-1 PRS and type-2 PRS at the same location, e.g., at the location of the UE 532 shown in FIG. 5, the signal measurement unit 650 may avoid measuring type-1 PRS, e.g., if doing so is optional (e.g., sufficient measurement information exists for determining location with desired accuracy without the type-1 PRS measurement, or the type-2 measurement has already been performed successfully, e.g., with at least a threshold quality). Avoiding one or more type-1 measurements and/or one or more type-2 PRS measurements may reduce power consumption by the UE 600, for measurement and possibly also for processing of the measurement(s).

The measurement report unit 660 may be configured to selectively report PRS measurements. For example, with multiple PRS measurements available, the measurement report unit 660 may report the PRS measurement with higher quality before reporting the PRS measurement of lower quality, or without reporting the PRS measurement of lower quality. This may help reduce power consumption both by the UE 600 to report the measurement and by the network entity to receive and process the report. Reporting the higher-quality measurement first may help reduce latency (of position determination) by facilitating determining position with a threshold quality faster than if the lower-quality measurement was reported before the higher-quality measurement. Also or alternatively, the measurement report unit 660 may report that a PRS measurement (e.g., a type-1 PRS measurement or a type-2 PRS measurement) will not be reported (e.g., because the measurement is being avoided as discussed above). Consequently, the UE 600 may save power by not reporting the PRS measurement and the latency may be improved by avoiding the network entity 700 waiting for a PRS measurement report that the measurement report unit 660 does not transmit.

Figure 9:
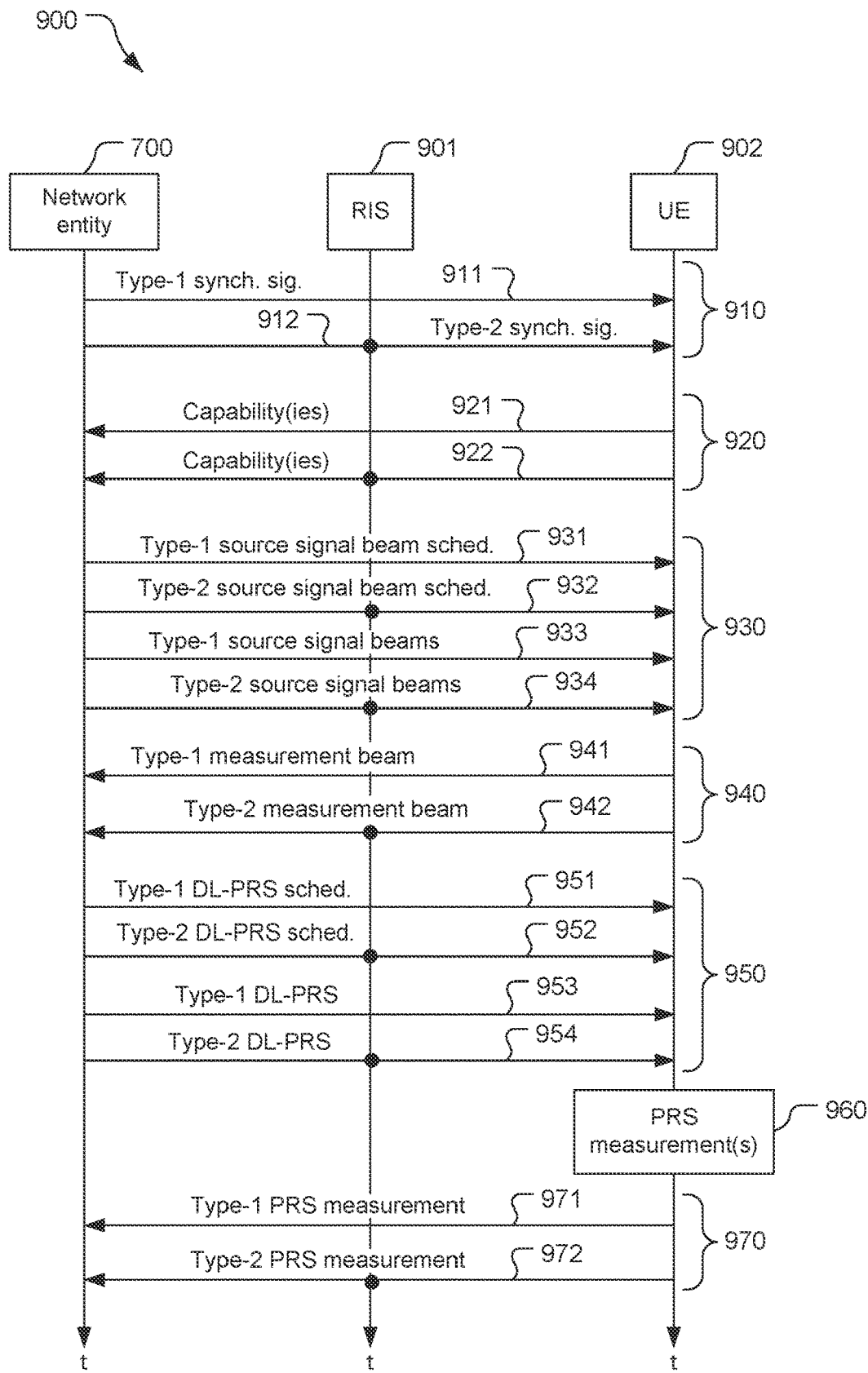
FIG. 9 is a signaling and process flow for determining positioning information using RIS-reflected and/or non-RIS reflected signals.

Referring to FIG. 9, with further reference to FIGS. 1-8, a signaling and process flow 900 for obtaining and reporting positioning signal measurements with and without use of a RIS includes the stages shown. The flow 900 is an example, as stages may be added, rearranged, and/or removed. The flow 900 shows signal exchange between the network entity 700, a RIS 901, and a UE 902 that may be in LOS cell coverage but not RIS coverage, may be in RIS coverage but not LOS cell coverage, or may be in LOS cell coverage and RIS coverage. The discussion may assume that signals are successfully exchanged between the network entity and the UE 902, but one or more signals may not be successfully exchanged, e.g., depending on a location of the UE 902 relative to the network entity 700 and/or one or more obstacles.

At stage 910, the network entity 700 attempts to transmit synchronization signals to the UE 902 to establish communication with the UE 902. The network entity 700, e.g., the TRP 510, may transmit a type-1 (non-RIS-reflected) synchronization signal 911 and/or may transmit a type-2 (RIS-reflected) synchronization signal 912 via the RIS 901 (e.g., the RIS 521) that the UE 902 may or may not be able to receive. The UE 902 may be in the location of the UE 530 and able to receive only the type-1 synchronization signal 911 or may be in the location of the UE 531 and only able to receive the type-2 synchronization signal 912, or may be in the location of the UE 532 and able to receive both synchronization signals 911, 912.

At stage 920, the UE 902 responds to the synchronization signal(s) 911, 912 that the UE 902 received by the capability unit 665 transmitting a capability(ies) report 921 and/or a capability(ies) report 922 to the network entity 700. The capability(ies) report 922, if sent, is sent via the RIS 901 to the network entity 700. The capability(ies) reports 921, 922 may indicate, among other things, the ability of the UE 902 to receive type-2 DL signals, e.g., type-2 source signals and type-2 DL-PRS. The capability(ies) reports 921, 922 may indicate that the UE 902 is configured to measure and report type-1 DL signals and type-2 DL signals. The capability(ies) reports 921, 922 may include an explicit indication that the UE is configured to measure type-2 DL signals with the configuration of the UE 902 to report measurement of type-2 DL signals and to measure and report type-1 DL signals being implicit.

At stage 930, the network entity 700 responds to receiving one or more of the capability(ies) reports 921, 922 by transmitting one or more source signal beam schedules and corresponding source signal beams. The signal allocation unit 750 may transmit a type-1 source signal beam schedule 931 in response to receiving the capability(ies) report 921 and may transmit a type-2 source signal beam schedule 932 in response to receiving the capability(ies) report 922. The schedules 931, 932 indicate the resources and beams of a source signal to be sent by the network entity 700. The beam management unit 760 of the network entity 700 transmits a source signal using type-1 source signal beams 933 if the schedule 931 was sent and/or using type-2 source signal beams 934 if the schedule 932 was sent. The beams 933 may be, for example, the antenna beams 551-554 and the beams 934 may be, for example, the beams 571-574 (with the network entity 700 transmitting the source signal in the beam 551 to the RIS 520 and the network entity 700 controlling the RIS 520 to transmit the source signal using the beams 571-574). The source signal in the beam 934 may include a TRP ID and a RIS ID of the TRP and the RIS 901 that will transmit and reflect, respectively, the PRS corresponding to the source signal.

At stage 940, the UE 902 transmits a type-1 measurement beam report 941 and/or a type-2 measurement beam report 942. The signal measurement unit 650 attempts to measure the source signal of the scheduled beams and the transmits the measurement beam report(s) 941, 942 corresponding to the source signal beam(s) that were received at stage 930. The measurement beam report 941, if sent, indicates the type-1 source signal beam 933 corresponding to the highest-quality (e.g., strongest RSRP) type-1 source signal measurement and the measurement beam report 942, if sent, indicates the type-2 source signal beam 934 corresponding to the highest-quality type-2 source signal measurement. The measurement beam reports 941, 942 provide indications to the network entity 700 as to which beam to use to transmit PRS (and/or other signals) to the UE 902.

At stage 950, the network entity 700 transmits DL-PRS to the UE 902. The beam management unit 760 determines the PRS beam(s) that correspond to (are QCLed with) the source signal beam(s) 933, 934 indicated by the measurement beam report(s) 941, 942. The signal allocation unit 750 and the beam management unit 760 allocate PRS resources based on the determined beam(s) and transmit a type-1 DL-PRS schedule 951 and/or a type-2 DL-PRS schedule 952 to the UE 902 followed by type-1 DL-PRS 953 and/or type-2 DL-PRS 954.

At stage 960, the UE 902 may measure the PRS 953, 954. If only one of the PRS 953, 954 is sent to the UE 902, then the signal measurement unit 650 measures (or at least attempts to measure) the received PRS 953, 954. If both of the DL-PRS 953, 954 are sent to the UE 902, then the UE 902 may selectively measure the DL-PRS 953, 954, e.g., avoiding measurement of one DL-PRS if another DL-PRS is already measured, or already measured with at least a threshold quality, etc. If both of the DL-PRS 953, 954 are sent to and measured by the UE 902, the UE 902 may give priority to the measurement of the type-1 DL-PRS 953, e.g., prioritize measuring the type-1 DL-PRS 953 over measuring the type-2 DL-PRS and/or prioritize reporting of the measurement of the type-1 DL-PRS 953 over reporting of the measurement of the type-2 DL-PRS 954.

At stage 970, the UE 902 may transmit a type-1 PRS measurement report 971 and/or a type-2 PRS measurement report 972. If only one of the DL-PRS 953, 954 was measured, then the measurement report unit 660 may transmit the appropriate one of the measurement reports 971, 972. If both DL-PRS 953, 954 were measured, then the measurement report unit 660 may transmit both measurement reports 971, 972 or may selectively transmit one of the measurement reports 971, 972 (e.g., the higher-quality measurement report, or transmitting the higher-quality measurement report first and awaiting a request for the other measurement report, or transmitting the type-1 measurement report 971 first and awaiting a request for the type-2 measurement report 972, etc.). The measurement report 971 or the measurement report 972 may indicate, respectively, that a type-2 PRS measurement or a type-1 PRS measurement will not be reported (e.g., because the measurement is being avoided). Either or both of the measurement reports 971, 972 may include position information such as one or more PRS measurement values, one or more processed measurement information such as one or more ranges, one or more pseudoranges, one or more location estimates, one or more speeds, one or more velocities, etc. The network entity 700 may process the measurement report(s) 971, 972 to determine position information (e.g., a location estimate, velocity, speed, etc.) regarding the UE 902.

Figure 10:
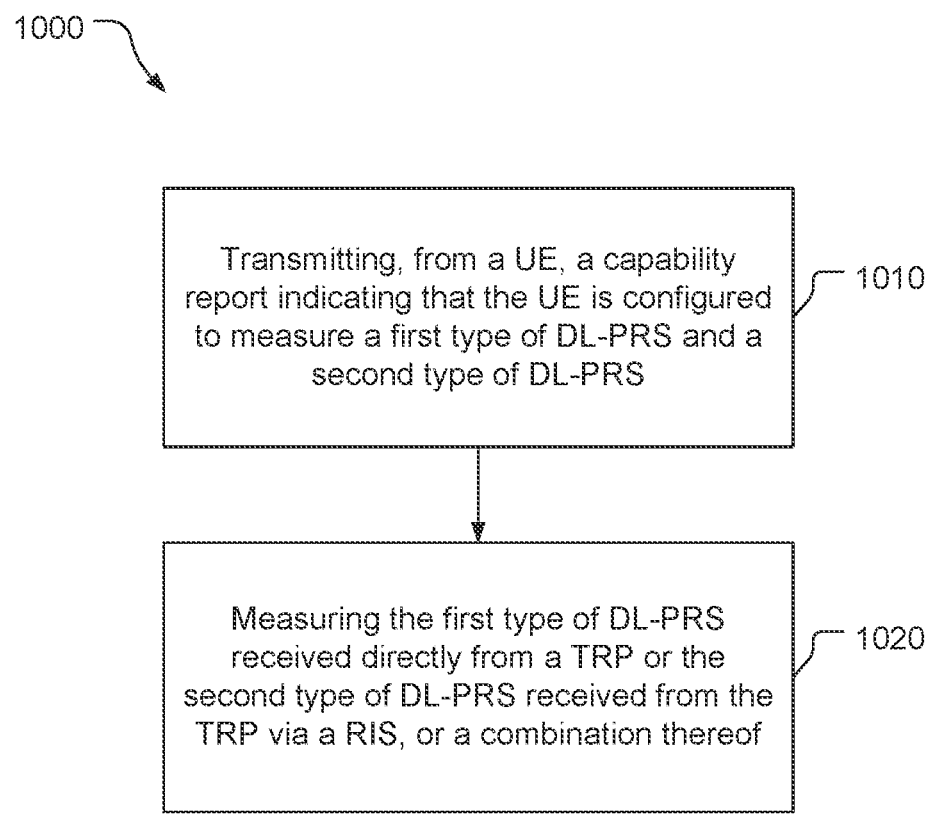
FIG. 10 is a block flow diagram of a positioning reference signal measuring method.

Referring to FIG. 10, with further reference to FIGS. 1-9, a PRS measuring method 1000 includes the stages shown. The method 1000 is, however, an example and not limiting. The method 1000 may be altered, e.g., by having stages added, removed, rearranged, combined, performed concurrently, and/or having single stages split into multiple stages.

At stage 1010, the method 1000 includes transmitting, from a UE, a capability report indicating that the UE is configured to measure a first type of DL-PRS and a second type of DL-PRS. For example, the capability unit 665 of the UE 902 may transmit one or both of the capability reports 921, 922 to the network entity 700 (and/or may transmit one or more other capability reports to one or more other network entities) indicating that the UE 902 is configured to measure type-1 signals and type-2 signals. The processor 610, possibly in combination with the memory 630, in combination with the transceiver 620 (e.g., the wireless transmitter 242 and the antenna 246) may comprise means for transmitting a capability report.

At stage 1020, the method 1000 includes measuring the first type of DL-PRS received directly from a TRP or the second type of DL-PRS received from the TRP via a RIS, or a combination thereof. For example, the UE 902 may measure the type-1 PRS 953 directly from the network entity 700 (e.g., the UE 530 measures type-1 PRS from the TRP 510 or the UE 532 measures type-1 PRS from the TRP 510) and/or measure the type-2 PRS from the network entity 700 via the RIS 901 (e.g., the UE 531 measures the type-2 PRS from the TRP 510 via the RIS 520 or the UE 532 measures type-2 PRS from the TRP 510 via the RIS 521). The processor 610, possibly in combination with the memory 630, in combination with the transceiver 620 (e.g., the antenna 246 and the wireless receiver 244) may comprise means for measuring the first type of DL-PRS or the second type of DL-PRS, or a combination thereof.

Implementations of the method 1000 may include one or more of the following features. In an example implementation, the method 1000 comprises disabling measurement of the second type of DL-PRS in response to a measurement of the first type of DL-PRS by the UE having at least a threshold quality. For example, the signal measurement unit 650 may give priority to measuring type-1 PRS over measuring type-2 PRS and may avoid measuring type-2 PRS based on measurement of a type-1 PRS having at least a threshold quality (e.g., at least a threshold RSRP). The processor 610, possibly in combination with the memory 630, may comprise means for disabling measurement of DL-PRS. In another example implementation, the method 1000 comprises transmitting, from the UE to a network entity, an indication that a measurement report from the UE will lack a measurement of the second type of DL-PRS. For example, the measurement report unit 660 may include in the type-1 measurement report 971 or the type-2 measurement report 972 an indication that no measurement of a type-2 PRS or a type-1 PRS, respectively, will be reported. The processor 610, possibly in combination with the memory 630, in combination with the transceiver 620 (e.g., the wireless transmitter 242 and the antenna 246) may comprise means for transmitting an indication that a DL-PRS measurement report will lack a measurement of a DL-PRS, e.g., the second type of DL-PRS.

Also or alternatively, implementations of the method 1000 may include one or more of the following features. In an example implementation, measuring the second type of DL-PRS is performed in response to an inability of the UE to obtain a measurement of the first type of DL-PRS with at least a threshold quality. For example, the signal measurement unit 650 may measure the type-2 PRS 954 if and only if the signal measurement unit 650 fails to measure the type-1 PRS with at least a threshold quality (e.g., at least a threshold RSRP). This may help save energy by avoiding a signal measurement where an adequate signal measurement has already been made. In another example implementation, measuring the first type of DL-PRS and the second type of DL-PRS comprises obtaining a first measurement of the first type of DL-PRS and a second measurement of the second type of DL-PRS, and the method 1000 comprises: determining, as a higher-quality measurement, which of the first measurement or the second measurement has a higher measurement quality; determining, as a lower-quality measurement, which of the first measurement or the second measurement has a lower measurement quality; and transmitting, from the UE to a network entity, the higher-quality measurement before, if at all, transmitting the lower-quality measurement to the network entity. For example, the signal measurement unit 650 may measure the type-1 PRS 953 to determine a first PRS measurement and measure the type-2 PRS to determine a second PRS measurement, and transmit the higher-quality measurement of the first and second PRS measurements before transmitting the other measurement if the other measurement is transmitted at all. The processor 610, possibly in combination with the memory 630, in combination with the transceiver 620 (e.g., the wireless receiver 244 and the antenna 246) may comprise means for obtaining a first measurement of the first type of DL-PRS and a second measurement of the second type of DL-PRS. The processor 610, possibly in combination with the memory 630, may comprise means for determining the higher-quality measurement and the lower-quality measurement, and the processor 610, possibly in combination with the memory 630, in combination with the transceiver 620 (e.g., the wireless transmitter 242 and the antenna 246) may comprise means for transmitting the higher-quality measurement before, if at all, the lower-quality measurement. In another example implementation, the method 1000 comprises descrambling the second type of DL-PRS based on an identity of the TRP and an identity of the RIS. For example, the signal measurement unit 650 may use the TRP ID and the RIS ID (e.g., from the source signal beam 934) as a seed for producing a pseudorandom sequence for measuring PRS. The processor 610, possibly in combination with the memory 630, may comprise means for descrambling the second type of DL-PRS.

Figure 11:
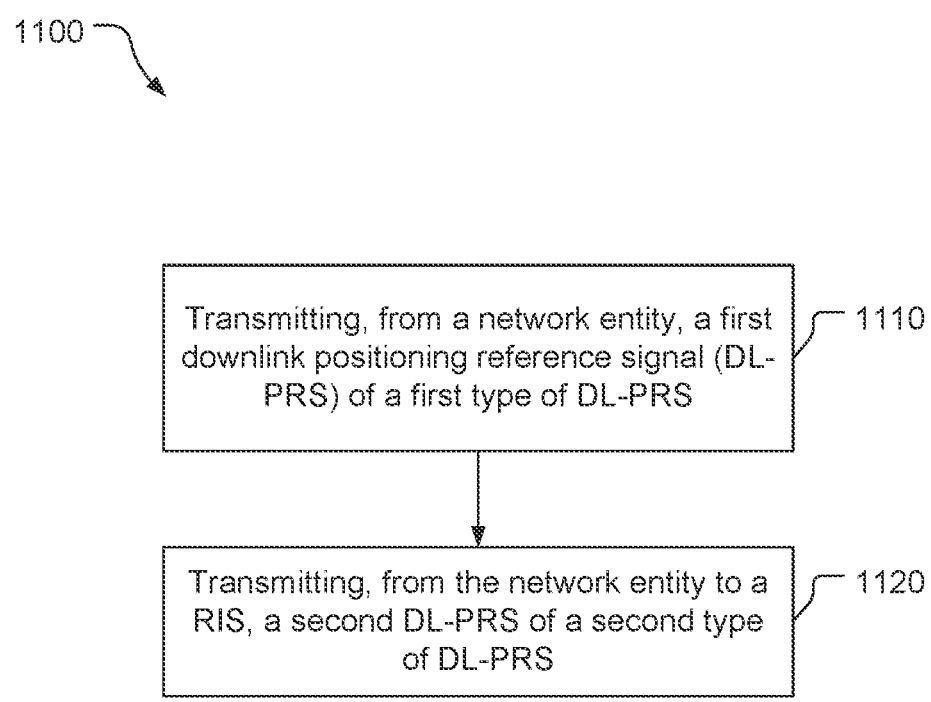
FIG. 11 is a block flow diagram of providing positioning reference signals.

Referring to FIG. 11, with further reference to FIGS. 1-9, a method 1100 of providing positioning reference signals includes the stages shown. The method 1100 is, however, an example and not limiting. The method 1100 may be altered, e.g., by having stages added, removed, rearranged, combined, performed concurrently, and/or having single stages split into multiple stages.

At stage 1110, the method 1100 includes transmitting, from a network entity, a first DL-PRS of a first type of DL-PRS. For example, the network entity 700 transmits the type-1 PRS 953 to the UE 902. The processor 710, possibly in combination with the memory 730, in combination with the transceiver 720 (e.g., the wireless transmitter 342 and the antenna 346) may comprise means for transmitting the first DL-PRS.

At stage 1120, the method 1100 includes transmitting, from the network entity to a RIS, a second DL-PRS of a second type of DL-PRS. For example, the network entity 700 transmits the type-2 PRS 954 to the UE 902. The processor 710 may access a location of the RIS 901 from the memory 730 (e.g., in response to the type-2 measurement beam report 942) to determine a direction of the RIS relative to the network entity. The processor 610, possibly in combination with the memory 630, may comprise means for determining a direction of a RIS. The processor 710, possibly in combination with the memory 730, in combination with the transceiver 720 (e.g., the wireless transmitter 342 and the antenna 346) may comprise means for transmitting the second DL-PRS.

Implementations of the method 1100 may include one or more of the following features. In an example implementation, the method 1100 may comprise scrambling the second DL-PRS using an identity of the network entity and an identity of the RIS. For example, the processor 710 may use a TRP ID and a RIS ID as a seed to generate a pseudorandom sequence of the DL-PRS. The processor 710, possibly in combination with the memory 730, may comprise means for scrambling the second DL-PRS. In another example implementation, transmitting the second DL-PRS comprises transmitting the second DL-PRS with a higher number of repetitions per instance than the first DL-PRS. The processor 710 may use a repetition factors for the first DL-PRS and the second DL-PRS such that the second DL-PRS is repeated more often, e.g., to facilitate measurement of lower-power (upon receipt) PRS. In another example implementation, transmitting the second DL-PRS comprises transmitting the second DL-PRS with a different carrier frequency than the first DL-PRS, or a different bandwidth than the first DL-PRS, or one or more different timing characteristics than the first DL-PRS, or a different codeword than the first DL-PRS, or any combination thereof.

Also or alternatively, implementations of the method 1100 may include one or more of the following features. In an example implementation, the method 1100 comprises: transmitting a first source signal of a first type of source signal; and transmitting, to the RIS, a second source signal of a second type of source signal. For example, the network entity 700 can transmit type-1 and type-2 source signals (e.g., SSB, PRS, CSI-RS, etc.). The processor 710, possibly in combination with the memory 730, in combination with the transceiver 720 (e.g., the wireless transmitter 342 and the antenna 346) may comprise means for transmitting the first source signal and the second source signal. In another example implementation, the method 1100 comprises: receiving an indication, at the network entity from a UE, indicating a first transmission beam corresponding to a received source signal; and transmitting a QCL indication to the UE indicating a QCL type of a second transmission beam relative to the first transmission beam; where one of the first DL-PRS or the second DL-PRS is transmitted to the UE using the second transmission beam that is QCLed with the first transmission beam. For example, the network entity 700 may receive one or both of the measurement beam reports 941, 942. The indication of the transmission beam may be explicit (e.g., a beam ID) or implicit (e.g., a signal ID with the network entity 700 having a mapping of signal IDs and beam IDs). The network entity 700 may transmit the QCL indication before the indication of the transmission beam is received, e.g., transmitting respective QCL information with the source signal in multiple transmission beams and the UE gleaning the QCL information from the source signal information. The network entity 700 transmits the type-1 PRS 953 and/or the type-2 PRS 954 using the respective beam(s) that is(are) QCLed with the indicated transmission beam. Multiple transmission beams may also be indicated and multiple PRS transmitted with corresponding transmission beams. The processor 710, possibly in combination with the memory 730, in combination with the transceiver 720 (e.g., the wireless receiver 344 and the antenna 346) may comprise means for receiving the indication of the first transmission beam. The processor 710, possibly in combination with the memory 730, in combination with the transceiver 720 (e.g., the wireless transmitter 342 and the antenna 346) may comprise means for transmitting the QCL indication. In another example implementation, the method 1100 comprises: transmitting, from the network entity to the RIS, a third source signal of the second type of source signal, the second source signal being quasi co-located with the second DL-PRS with a first quasi co-location type, the third source signal being quasi co-located with the second DL-PRS with a second quasi co-location type, and transmitting the second source signal and the third source signal with a same index number. For example, a type-2 PRS may have a QCL-TypeC relation with one source signal (e.g., an SSB) and a QCL-TypeD relation with another source signal (e.g., another SSB), and the same source index (e.g., SSB index) indicated for both source signals. The processor 710, possibly in combination with the memory 730, in combination with the transceiver 720 (e.g., the wireless transmitter 342 and the antenna 346) may comprise means for transmitting the second source signal and the third source signal. In another example implementation, the method 1100 comprises transmitting, from the network entity to a UE, timing and frequency of the second type of source signal. For example, the processor 710 may transmit timing and frequency information to the UE 902 via the transceiver 720 using LPP. The processor 710, possibly in combination with the memory 730, in combination with the transceiver 720 (e.g., the wireless transmitter 342 and the antenna 346) may comprise means for transmitting timing and frequency of the second type of source signal.

Uplink PRS for RIS-Aided Positioning

The UE 600 may be configured to transmit UL-PRS, also called SRS for positioning, as type-1 (non-RIS-reflected) or type-2 (RIS-reflected) signals. The UL-PRS may be configured differently for type-1 and type-2 signals, e.g., with different carrier frequencies, different bandwidths, different beams, different time characteristics, and/or different codewords. Type-1 and type-2 UL-PRS may be configured similarly to type-1 and type-2 DL-PRS, respectively.

Figure 12:
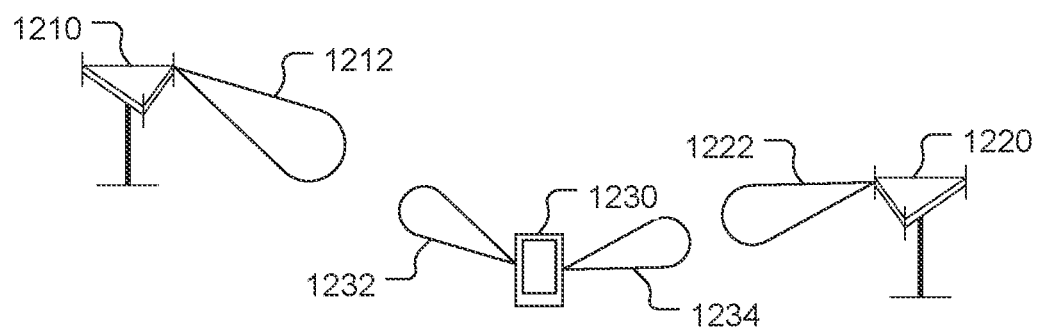
FIG. 12 is a simplified diagram of signaling between multiple base stations and a UE.

Referring to FIG. 12, with further reference to FIGS. 6 and 7, open-loop power control may be supported for setting (e.g., adjusting) a transmission power of a UE 1230 for transmitting SRS for positioning). For example, the signal allocation unit 750 may support configuring a DL-PRS or an SSB of a serving cell, e.g., a TRP 1210, or a neighboring cell, e.g., a TRP 1220, to be used as a DL path loss reference, e.g., as part of QCL and path loss reference signals 1212, 1222, respectively. The processor 610 measures the power of a received reference signal with a known transmission power to determine the path loss, and use the path loss to set the transmission power of the UE 600, e.g., of SRS for positioning. For a DL-PRS to be used as a DL path loss reference, the processor 710 may provide a PRS-Resource-Power parameter (i.e., the transmit power of the DL-PRS) in conjunction with the DL-PRS (e.g., in the same or a separate signal). The power control unit 670 is configured to determine a downlink path loss from the DL path loss reference signal. The power control unit 670 may be configured to use another signal to determine path loss if the power control unit 670 fails to determine downlink path loss from a DL path loss reference signal. For example, the power control unit 670 may, in response to failing to determine downlink path loss from a provided DL path loss reference signal, use a reference signal resource from the SSB that the UE 600 uses to obtain MIB (Master Information Block) as a path loss reference signal. The power control unit 670 uses the DL path loss from each of the TRPs 1210, 1220 to the UE 1230 to determine the transmit power for transmitting SRS 1232, 1234 to the TRPs 1210, 1220, respectively. The power control unit 670 may determine up to N distinct path loss estimates across SRS resource sets for positioning that are different from the up to four path loss estimates per serving cell that the UE 600 may maintain for PUSCH/PUCCH and other SRS transmissions, where, for example, N={0, 4, 8, 16}.

The UE 600 may support a spatial relationship between a beam for SRS for positioning and one or more other beams. For example, the beam management unit 680 may support a relationship between the beam for SRS positioning and a DL RS beam and/or another SRS for positioning beam (e.g., support a spatial relationship between multiple resources for SRS for positioning). The beam management unit 680 may use a determined AoA of the DL-RS and a spatial relationship between the AoA of the DL RS and the AoD of the SRS for positioning to determine the AoD to use for the SRS for positioning. For example, the beam management unit 680 may select a transmit beam, for transmitting SRS for positioning, according to a relationship of the transmit beam to a receive beam that received the DL-RS.

Figure 13:
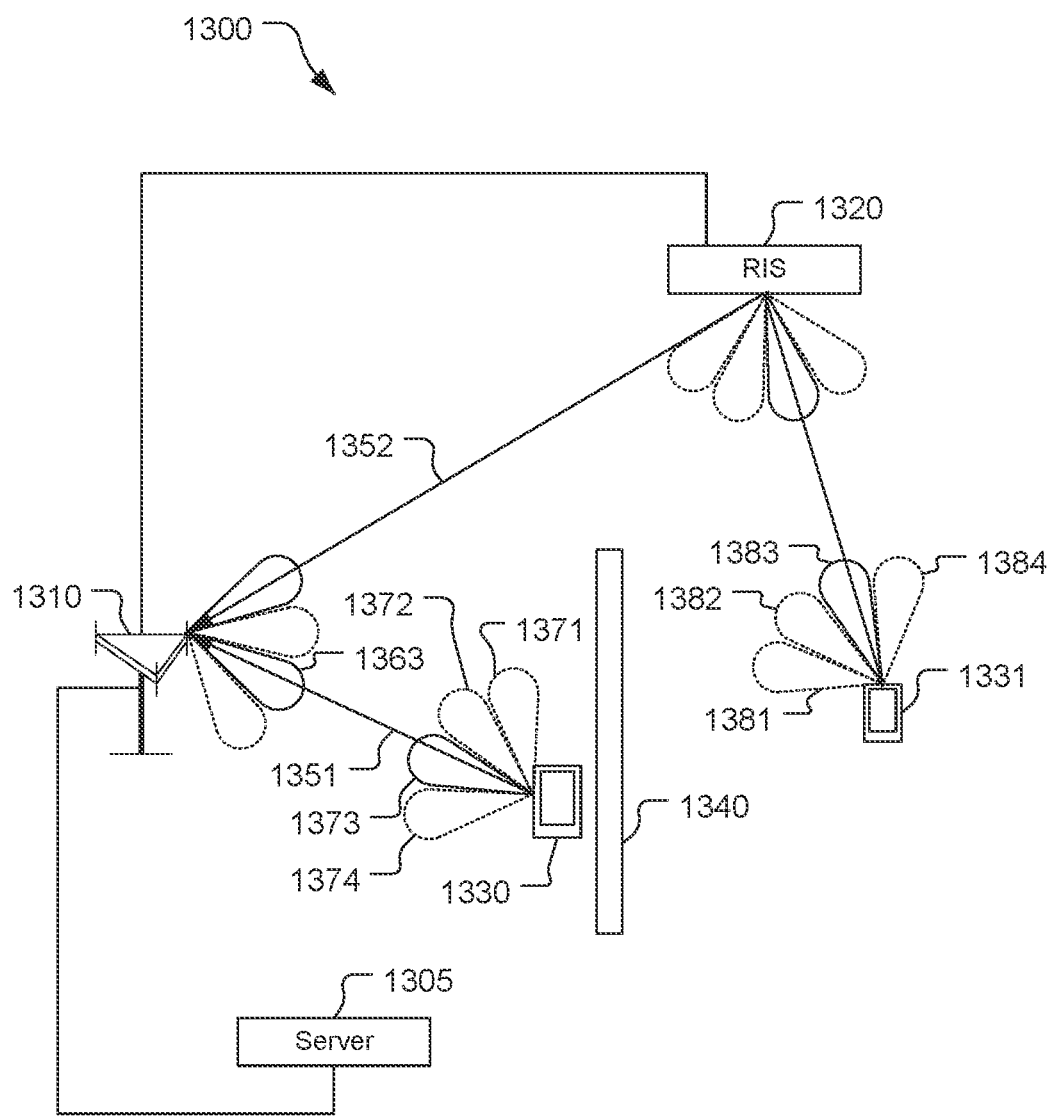
FIG. 13 is a simplified diagram of a wireless communication environment including a RIS.

Referring to FIG. 13, with further reference to FIGS. 1-7, a wireless communication environment 1300 is similar to the environment 500, but with fewer components, and includes a server 1305, a TRP 1310, a RIS 1320, UEs 1330, 1331, and an obstacle 1340. The server 1305 may be an example of the server 400, the TRP 1310 may be an example of the TRP 300, and the UEs 1330, 1331 may be examples of the UE 600. For a UE in cell coverage but not RIS coverage, e.g., the UE 1330, the signal measurement unit 650 may be unable to receive DL RS reflected by the RIS 1320 and/or unable to measure the DL-RS reflected by the RIS with at least a threshold quality. The power control unit 670 may thus be unable to use DL-RS transmitted by the TRP 1310 and reflected by the RIS 1320 to determine transmit power for SRS for positioning. The beam management unit 680 may be unable to use the RIS-reflected DL-RS to determine a beam to use to transmit the SRS for positioning. Similarly, a UE in a cellular coverage hole of the TRP 1310, e.g., the UE 1331, may be unable to use non-RIS-reflected DL-RS to determine the transmit power and/or the beam to use for SRS for positioning to be transmitted to the RIS 1320 for reflection to the TRP 1310.

To facilitate positioning of the UE 600 in different coverage areas, the UE 600 is configured to produce and transmit different types of SRS for positioning for non-RIS-reflected signals and RIS-reflected signals corresponding to the different coverage areas. Thus, for example, the SRS for positioning unit 675 is configured to produce and transmit (e.g., with the help of the power control unit 670 and the beam management unit 680) signals directly to a TRP and signals indirectly to a TRP via a RIS. The non-RIS-reflected SRS for positioning signals may be referred to as type-1 SRS for positioning (or type-1 UL-PRS) and RIS-reflected SRS for positioning signals may be referred to as type-2 SRS for positioning (or type-2 UL-PRS). For example, a signal 1351 is a type-1 SRS for positioning and a signal 1352 is a type-2 SRS for positioning. The SRS for positioning unit 675 may produce, in accordance with allocations by the signal allocation unit 750, the type-1 and type-2 SRS for positioning to have one or more different transmission characteristic values (e.g., different carrier frequencies, different frequency layers, different repetition factors, different bandwidths, different beams, different timing (e.g., different slots, different symbol sets (e.g., durations), different time offsets, etc.), etc.), and/or different codewords (a different codeword applied to the type-1 signal than applied to the type-2 signal). Using different characteristic values of the type-1 and type-2 SRS for positioning may help the network entity 700 (e.g., a TRP that is or is part of the network entity 700) receive the SRS for positioning. The type-1 and type-2 SRS for positioning may be defined similarly to type-1 and type-2 DL-RS (e.g., DL-PRS, SSB, CSI-RS, etc.). Non-RIS-reflected signals may not be able to reach a TRP with the UE 600 in a coverage hole (e.g., at the location of the UE 1331) and a TRP may not be able to receive RIS-reflected signals using a beam not directed to a RIS (e.g., a beam 1363 directed to the UE 1330).

The network entity 700 and the UE 600 may be configured such that the UE 600 may control transmit power of type-1 and type-2 SRS. For example, the signal allocation unit 750 can allocate and transmit a type-1 DL-RS and a type-2 DL-RS to the UE 600 and the SRS for positioning unit 675 can transmit SRS for positioning to the network entity 700, e.g., with the assistance of the power control unit 670 and/or the beam management unit 680. The type-1 DL-RS and the type-2 DL-RS may be path loss reference signals. Each of the path loss reference signals may be, for example, a DL-PRS or an SSB and may be from a serving cell or a neighboring cell. If the path loss reference signal is a DL-PRS, the network entity 700 may provide a PRS-Resource-Power value to the UE 600. The power control unit 670 may use the type-1 DL path loss RS to determine a corresponding path loss and to determine a corresponding transmit power for type-1 SRS for positioning. Likewise, the power control unit 670 may use the type-2 DL path loss RS to determine a corresponding path loss and to determine a corresponding transmit power for type-2 SRS for positioning. The power control unit 670 may provide both transmit power values to the SRS for positioning unit 675, and the SRS for positioning unit 675 may transmit the type-1 and type-2 SRS for positioning using the respective transmit powers, and may do so concurrently. A DL-PRS as a path loss reference may yield a more relevant path loss for SRS for positioning than other DL-RS. The power control unit 670 may be configured to respond to being unable to determine a path loss from a DL path loss reference signal by using another reference signal to determine the path loss. For example, the power control unit 670 may be configured to use, as the other path loss reference signal, a reference signal resource obtained from the SSB that the UE 600 uses to obtain MIB (e.g., because the UE 600 measures the SSB in order to enable further interaction between the UE 600 and the network entity 700). The power control unit 670 may be able to determine distinct path loss estimates for multiple SRS for positioning resource sets, e.g., for type-1 and type-2 SRS for positioning to be sent to the same TRP, for SRS for positioning to be sent to different TRPs, and/or for SRS for positioning to be sent to different RISes. Thus, multiple sets of multiple path loss estimates may be determined by the power control unit 670.

The beam management unit 680 is configured to select a beam to be used by the SRS for positioning unit 675 to transmit SRS for positioning. Downlink and uplink beams may have spatial relationships for type-1 signals and/or type-2 signals, and the beam management unit 680 may be configured to select the uplink beam for transmitting SRS for positioning based on a beam that best receives a DL-RS (e.g., DL-PRS, SSB, CSI-RS). The beam management unit 680 may select the transmit beam based on a spatial relationship (i.e., a mapping) between beams stored in the memory 630. Multiple beams for resources of type-1 SRS for positioning may have a spatial relationship and/or multiple beams for resources of type-2 SRS for positioning may have a spatial relationship and the beam management unit 680 may be configured to use the relationship(s) to determine the beam(s) to use for SRS for positioning transmission. For example, the beam management unit 680 may use a previously-used (e.g., the most-recently-used) beam as a reference and select the beam to use for transmission of SRS for positioning based on a relationship between beams that includes the previously-used beam. The beam management unit 680 may select a beam in order to continue to transmit SRS for positioning to network entity 700, e.g., based on movement (e.g., rotation) of the UE 600 and/or other information such as an indication from the network entity 700 of a receive beam to be used by the network entity 700 for receiving the SRS for positioning from the UE 600. The beam management unit 680 may select the transmission beam of the UE 600 that corresponds to the receive beam of the UE 600 that best received a DL-RS from the network entity 700. The measurement report unit 660 may transmit an indication of the network entity transmission beam used to transmit the best-received DL-RS so that the network entity 700 may use a corresponding receive beam for receiving the SRS for positioning. For example, the beam management unit 680 of the UE 1330 may select a beam 1373 from beams 1371, 1372, 1373, 1374 for transmitting the signal 1351 based on a corresponding beam best receiving a DL-RS from the TRP 1310, and the UE 1330 may indicate that the beam 1363 was used to transmit the best-received DL-RS. The beam management unit 680 may use one or more QCL relationships for SRS for positioning that are different than a TCI (transmission configuration indicator) state as the TCI state is for a QCL relationship for PDCCH or PDSCH, which is inapplicable to DL-PRS and UL-PRS.

The network entity 700 may selectively enable transmission of SRS for positioning and/or may cancel scheduled transmission of SRS for positioning. The network entity 700 may enable only SRS for positioning that is likely to be received with adequate quality and/or may cancel scheduled SRS for positioning that is unlikely to be received with adequate quality. For example, the signal allocation unit 750 may allocate (or reallocate) resources for type-1 SRS for positioning and not for type-2 SRS for positioning if (1) the network entity 700 receives an indication (e.g., a measurement report, a response message, etc.) that the UE 600 received a type-1 RS from the network entity and does not receive an indication that the UE 600 received a type-2 RS sent by the network entity, or (2) the network entity 700 does not receive a scheduled type-2 SRS for positioning from the UE 600 with adequate quality (e.g., at least a threshold power). Similarly, the signal allocation unit 750 may allocate resources for type-2 SRS for positioning and not for type-1 SRS for positioning if (1) the network entity 700 receives an indication (e.g., a measurement report, a response message, etc.) that the UE 600 received a type-2 RS from the network entity and does not receive an indication that the UE 600 received a type-1 RS sent by the network entity, or (2) the network entity 700 does not receive a scheduled type-1 SRS for positioning from the UE 600 with adequate quality (e.g., at least a threshold power). The signal allocation unit 750 may also or alternatively be configured to transmit an indication to the UE 600 not to use scheduled resources for a type of SRS for positioning and/or to stop transmission of a type of SRS for positioning based on not receiving an indication of receipt of the same type of DL-RS and/or lack of receipt of the same type of SRS for positioning. For example, UL-PRS may be scheduled to be transmitted every 160 ms, and the network entity 700 may transmit a message to the UE 600 indicating for the UE 600 not to transmit one or more future scheduled UL-PRS transmissions. Avoiding and/or canceling transmission of SRS for positioning saves energy of the UE 600 and may save energy of the network entity 700 that would be spent listening for the SRS for positioning.

The SRS for positioning unit 675 may be configured to selectively transmit type-1 or type-2 SRS for positioning, e.g., based on expected usefulness of the SRS for positioning. For example, the SRS for positioning unit 675 may determine whether to transmit SRS for positioning if the SRS for positioning is to be used in a joint DL/UL positioning technique (e.g., RTT) and the DL-PRS corresponding to the SRS for positioning is not received (at least not with sufficient quality to trigger a corresponding action such as provision of a measurement report with sufficient accuracy). The SRS for positioning unit 675 may transmit an indication to the network entity 700 of the omission of transmission of scheduled SRS for positioning, and may transmit an indication of the reason for the omission. For example, in an RTT positioning session, if the signal measurement unit 650 is unable to measure a type-1 DL-PRS, then the SRS for positioning unit 675 may skip transmission of scheduled type-1 SRS for positioning and may transmit a message to the network entity 700 (e.g., gNB and/or location server) indicating the transmission skip.

Figure 14:
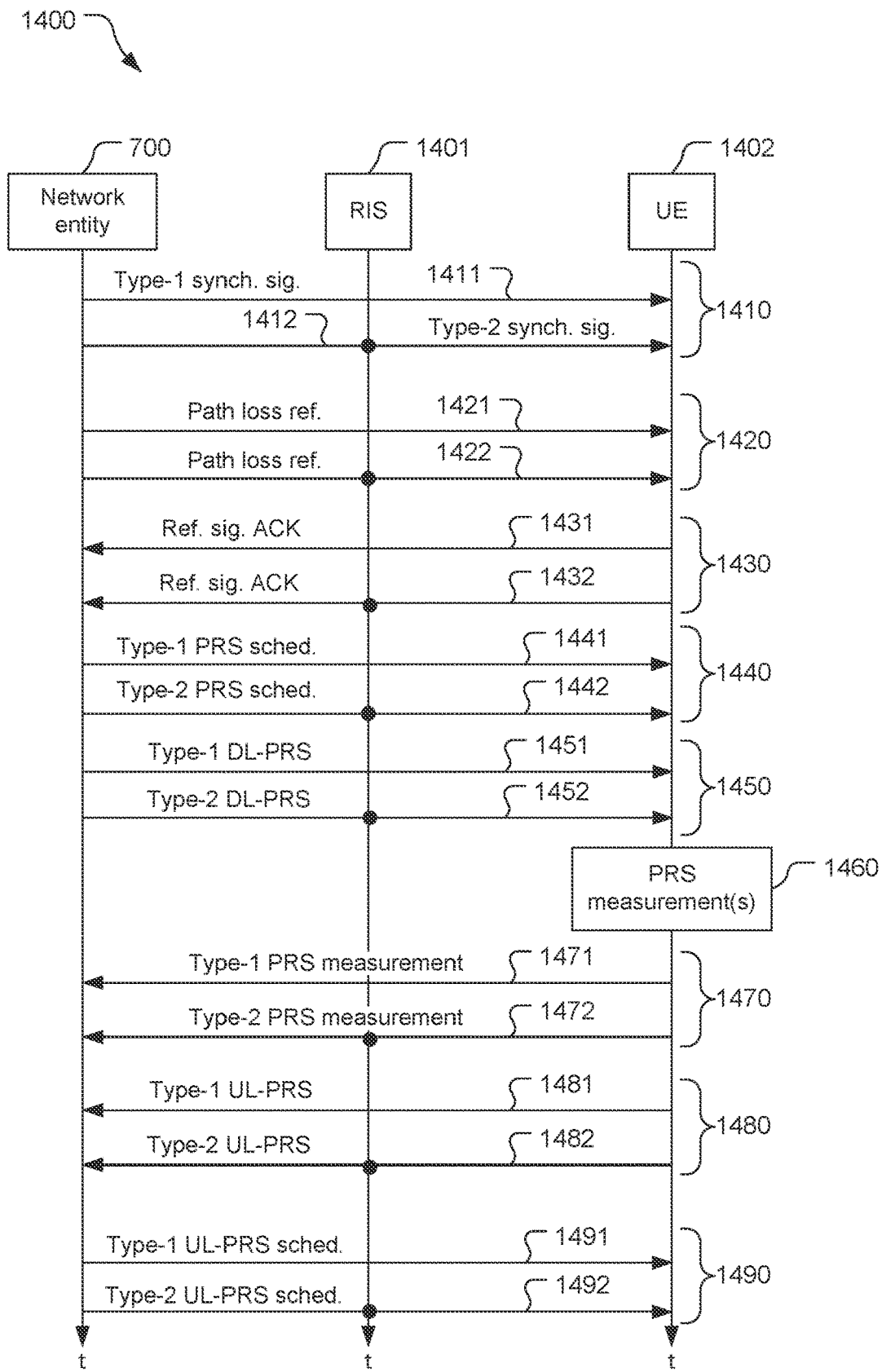
FIG. 14 is a signaling and process flow for providing uplink positioning reference signals with and without use of a RIS.

Referring to FIG. 14, with further reference to FIGS. 1-9 and 13, a signaling and process flow 1400 for providing UL-PRS (SRS for positioning) with and without use of a RIS includes the stages shown. The flow 1400 is an example, as stages may be added, rearranged, and/or removed. The flow 1400 shows signal exchange between the network entity 700, a RIS 1401, and a UE 1402 that may be in LOS cell coverage but not RIS coverage, may be in RIS coverage but not LOS cell coverage, or may be in LOS cell coverage and RIS coverage. The discussion may assume that signals are successfully exchanged between the network entity 700 and the UE 1402, but one or more signals may not be successfully exchanged, e.g., depending on a location of the UE 1402 relative to the network entity 700 and/or one or more obstacles. The flow 1400 may include stages shown in FIG. 9 but not shown here in order to simplify the figure.

At stage 1410, the network entity 700 attempts to transmit synchronization signals to the UE 1402 to establish communication with the UE 902. Similarly to stage 910 discussed above, the network entity 700, e.g., the TRP 1310, may transmit a type-1 synchronization signal 1411 and/or may transmit a type-2 synchronization signal 1412 via the RIS 1401 (e.g., the RIS 1320) that the UE 1402 may or may not be able to receive.

At stage 1420, the network entity 700 transmits one or more type-1 path loss reference signals 1421 and/or one or more type-2 path loss reference signals 1422 to the UE 1402. The path loss signal(s) 1421, 1422 may have known transmit power(s) and/or the network entity 700 may indicate the transmit power(s) (e.g., in a PRS-Resource-Power field for a DL-PRS used as a path loss reference signal).

At stage 1430, the UE 1402 may transmit one or more reference signal acknowledgement (ACK) signals 1431, 1432. The ACK signal 1431 may be an indication that the UE 1402 received the type-1 synch signal 1411 and/or that the UE 1402 received the path loss reference signal 1421 and/or that the UE 1402 received some other type-1 reference signal. The ACK signal 1432 may be an indication that the UE 1402 received the type-2 synch signal 1412 and/or that the UE 1402 received the path loss reference signal 1422 and/or that the UE 1402 received some other type-2 reference signal. The UE 1402 may not transmit either of the ACK signals 1431, 1432, e.g., if the UE 1402 is not configured to do so or if the UE 1402 does not receive a reference signal to be acknowledged.

At stage 1440, the network entity 700 transmits PRS schedules 1441, 1442. The signal allocation unit 750 and the beam management unit 760 allocate PRS resources and the appropriate beam(s) and transmit a type-1 PRS schedule 1441 that includes a schedule for type-1 DL-PRS to be transmitted to the UE 1402 and/or a schedule for type-1 UL-PRS to be transmitted by the UE 1402. Also or alternatively, the signal allocation unit 750 and the beam management unit 760 allocate PRS resources and the appropriate beam(s) and transmit a type-1 PRS schedule 1442 that includes a schedule for type-2 DL-PRS to be transmitted to the UE 1402 and/or a schedule for type-2 UL-PRS to be transmitted by the UE 1402. The signal allocation unit 750 may allocate resources to a single type of UL-PRS, for example, if the ACK signal 1431, 1432 of the other type of signal was not received.

At stage 1450, the network entity 700 transmits DL-PRS to the UE 1402. The signal allocation unit 750 and the beam management unit 760 transmit type-1 DL-PRS 1451 and/or type-2 DL-PRS 1452 (via the RIS 1401) to the UE 1402 in accordance with the DL-PRS schedule(s) provided in stage 1440.

At stage 1460, the UE 1402 may measure the DL-PRS 1451, 1452. If only one of the DL-PRS 1451, 1452 is transmitted to the UE 1402, then the signal measurement unit 650 may measure (or at least attempt to measure) the received DL-PRS 1451, 1452. If both of the DL-PRS 1451, 1452 are transmitted to the UE 1402, then the UE 1402 may selectively measure one, both, or neither of the DL-PRS 1451, 1452.

At stage 1470, the UE 1402 may transmit a type-1 PRS measurement report 1471 and/or a type-2 PRS measurement report 1472. If the corresponding DL-PRS 1411, 1452 was not received or measured, then the measurement report 1471, 1472 may indicate this, or the corresponding measurement report(s) 1471, 1472 may not be transmitted.

At stage 1480, the UE 1402 may transmit type-1 UL-PRS 1481 and/or may transmit type-2 UL-PRS 1482. The SRS for positioning unit 675 may transmit the UL-PRS 1481, 1482 with a respective transmit power determined by the power control unit 670 based on a path loss determined by the power control unit 670 from received power(s) of the path loss reference signal(s) 1421, 1422 measured by the signal measurement unit 650, or from another reference signal measurement (e.g., of the signal(s) 1411, 1412) if the signal measurement unit 650 is unable to measure the path loss reference signal(s) 1421, 1422. The SRS for positioning unit 675 may transmit the UL-PRS 1481, 1482 with a respective beam determined by the beam management unit 680. The UE 1402 may not transmit one or more of the UL-PRS 1481, 1482, for example if the UE 1402 is in a joint UL/DL positioning session and the corresponding DL-PRS 1451, 1452 is not received, or not received with at least a threshold quality.

At stage 1490, the network entity 700 may transmit a type-1 UL-PRS schedule signal 1491 and/or a type-2 UL-PRS schedule signal 1492 (although the network entity 700 may transmit neither of the UL-PRS schedule signals 1491, 1492). The UL-PRS schedule signal(s) 1491, 1492 may reallocate resources for UL-PRS and/or may indicate to stop UL-PRS transmission of UL-PRS based on the DL-PRS measurement(s) 1471, 1472 or lack thereof, and/or based on the measurement(s) of the UL-PRS 1481, 1482, or lack thereof. For example, if a type of PRS (DL and/or UL) is not measured (at least with a threshold quality), then that type of UL-PRS may not be allocated resources in a new schedule and/or measurement of that type of UL-PRS may be indicated to be stopped (e.g., indicated internally to the network entity 700 and/or from the network entity 700 to the UE 1402). Stage 1490 may occur after stage 1480 as shown, or before or during stage 1480, e.g., to cause the UE 1402 to stop transmitting UL-PRS and/or not to transmit scheduled UL-PRS.

Figure 15:
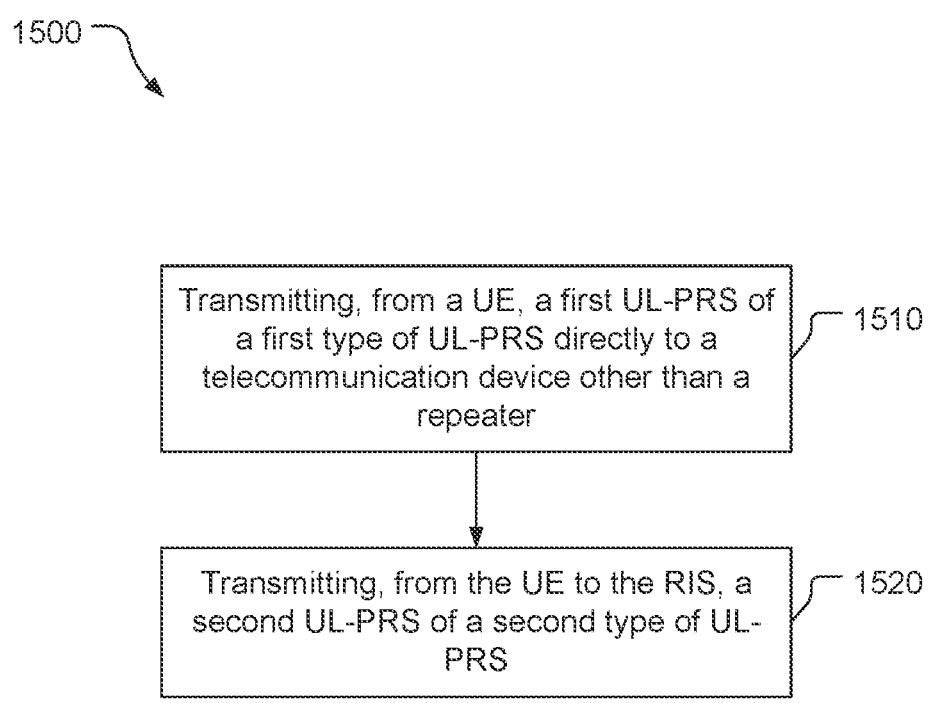
FIG. 15 is a block flow diagram of a positioning reference signal provision method.

Referring to FIG. 15, with further reference to FIGS. 1-14, a positioning reference signal provision method 1500 includes the stages shown. The method 1500 is, however, an example and not limiting. The method 1500 may be altered, e.g., by having stages added, removed, rearranged, combined, performed concurrently, and/or having single stages split into multiple stages.

At stage 1510, the method 1500 includes transmitting, from a UE, a first UL-PRS of a first type of UL-PRS directly to a telecommunication device other than a repeater. For example, the SRS for positioning unit 675 transmits the type-1 UL-PRS 1481 to the network entity 700 and/or another UE without passing through a RIS (or other repeater). The processor 610, possibly in combination with the memory 630, in combination with the transceiver 620 (e.g., the wireless transmitter 242 and the antenna 246) may comprise means for transmitting the first UL-PRS.

At stage 1520, the method 1500 includes transmitting, from the UE to a RIS, a second UL-PRS of a second type of UL-PRS. For example, the SRS for positioning unit 675 transmits the type-2 UL PRS 1482 to the network entity 700 using the beam determined at stage 1520 to be directed toward the RIS. The beam management unit 680 may determine a beam directed toward the RIS (to be used for transmitting the second UL-PRS) based on a receive beam that best received a DL-RS as indicated by the signal measurement unit 650, e.g., as discussed with respect to stage 940. The processor 610, possibly in combination with the memory 630 and/or the transceiver 620 (e.g., the wireless receiver 244 and the antenna 246), may comprise means for determining the direction of the RIS. The processor 610, possibly in combination with the memory 630, in combination with the transceiver 620 (e.g., the wireless transmitter 242 and the antenna 246) may comprise means for transmitting the second UL-PRS.

Implementations of the method 1500 may include one or more of the following features. In an example implementation, the second UL-PRS has a different carrier frequency than the first UL-PRS, or a different bandwidth than the first UL-PRS, or one or more different timing characteristics than the first UL-PRS, or a different codeword than the first UL-PRS, or any combination thereof. In another example implementation, the method 1500 comprises measuring a type-2 path loss reference signal received from the RIS, where the second UL-PRS is transmitted using a transmission power based on a path loss of the type-2 path loss reference signal. The processor 610, possibly in combination with the memory 630, in combination with the transceiver 620 (e.g., the wireless receiver 244 and the antenna 246) may comprise means for measuring the type-2 path loss reference signal. The power control unit 670 may determine a path loss of the path loss reference signal 1422 based on one or more measurements by the signal measurement unit 650, and set the transmission power for transmitting the type-2 UL-PRS 1482. The processor 610, possibly in combination with the memory 630, may comprise means for determining the path loss of the type-2 path loss reference signal. In another example implementation, the path loss of the type-2 path loss reference signal is a second path loss and the transmission power is a second transmission power, and the method 1500 comprises measuring a type-1 path loss reference signal received from the RIS, and where the first UL-PRS is transmitted using a first transmission power based on a first path loss of the type-1 path loss reference signal. For example, the power control unit 670 may determine a path loss of the path loss reference signal 1421 based on one or more measurements by the signal measurement unit 650, and set the transmission power for transmitting the type-1 UL-PRS 1481. The processor 610, possibly in combination with the memory 630, in combination with the transceiver 620 (e.g., the wireless receiver 244 and the antenna 246) may comprise means for measuring the type-1 path loss reference signal. The processor 610, possibly in combination with the memory 630, may comprise means for determining the path loss of the type-1 path loss reference signal.

Also or alternatively, implementations of the method 1500 may include one or more of the following features. In an example implementation, the method 1500 comprises: attempting to measure a type-2 path loss reference signal; and measuring an SSB received by the UE; where the second UL-PRS is transmitted using a secondary transmission power based on an SSB path loss of the SSB in response to failure to determine a reference signal path loss based on the type-2 path loss reference signal. For example, in response to the signal measurement unit 650 being unable to measure the path loss reference signal 1422 (e.g., due to lack of transmission of the signal 1422, due to poor quality (e.g., insufficient receive power) of the signal 1422, etc.), the power control unit 670 may use a measurement of an SSB (e.g., of the type-2 synch signal 1412) indicated by the signal measurement unit 650 to determine a path loss of the SSB and to set the transmission power of the type-2 UL-PRS 1482 based on the SSB path loss. The processor 610, possibly in combination with the memory 630, in combination with the transceiver 620 (e.g., the wireless receiver 244 and the antenna 246) may comprise means for attempting to measure the type-2 path loss reference signal and means for measuring the SSB. The processor 610, possibly in combination with the memory 630, may comprise means for determining the SSB path loss. In another example implementation, the method 1500 comprises: attempting to measure, at the UE, a DL-PRS for an uplink/downlink positioning technique; and transmitting, in response to failing to measure the DL-PRS with at least a threshold quality, an indication that the UE is skipping transmission of a corresponding UL-PRS. For example, the SRS for positioning unit 675 may skip one or more scheduled UL-PRS transmissions based on the UE 600 being in an UL/DL positioning session (e.g., an RTT session) and one or more DL-PRS not being received or measured with adequate quality, and may transmit a notice to the network entity 700 that the scheduled UL-PRS transmission(s) is(are) being skipped. Skipping the transmission(s) may conserve UE energy and notifying the network entity 700 may help the network entity 700 conserve energy by not listening for the skipped transmission(s). The processor 610, possibly in combination with the memory 630, in combination with the transceiver 620 (e.g., the wireless receiver 244 and the antenna 246) may comprise means for attempting to measure the DL-PRS. The processor 610, possibly in combination with the memory 630, in combination with the transceiver 620 (e.g., the wireless transmitter 242 and the antenna 246) may comprise means for transmitting the notice to the network entity. In another example implementation, the method 1500 comprising determining a direction of the RIS by: attempting to measure at least one downlink reference signal reflected by the RIS using a plurality of UE receive beams; determining a selected receive beam of the plurality of UE receive beams that corresponds to a strongest signal measurement of the at least one downlink reference signal; and determining a UE transmit beam of the UE corresponding to the selected receive beam. For example, the signal measurement unit 650 of the UE 1331 may attempt to measure a DL-RS from the RIS 1320 using each of several receive beams. The signal measurement unit 650 may determine which of the receive beams received the DL-RS best (e.g., with the most power) and the beam management unit 680 may determine (e.g., from a mapping of receive beams and transmit beams stored in the memory 630) the transmit beam that corresponds to the receive beam that received the DL-RS best. For example, the beam management unit 680 may determine that a transmit beam 1383 (from transmit beams 1381, 1382, 1383, 1384) corresponds to the receive beam that received the DL-RS best, and thus corresponds to a direction of the RIS 1320, and the SRS for positioning unit 675 in conjunction with the beam management unit 680 may transmit the signal 1352 using the beam 1383. The processor 610, possibly in combination with the memory 630, in combination with the transceiver 620 (e.g., the wireless receiver 244 and the antenna 246) may comprise means for attempting to measure at least one DL-PRS reflected by the RIS. The processor 610, possibly in combination with the memory 630, may comprise means for determining a selected receive beam and means for determining a UE transmit beam corresponding to the selected receive beam.

Figure 16:
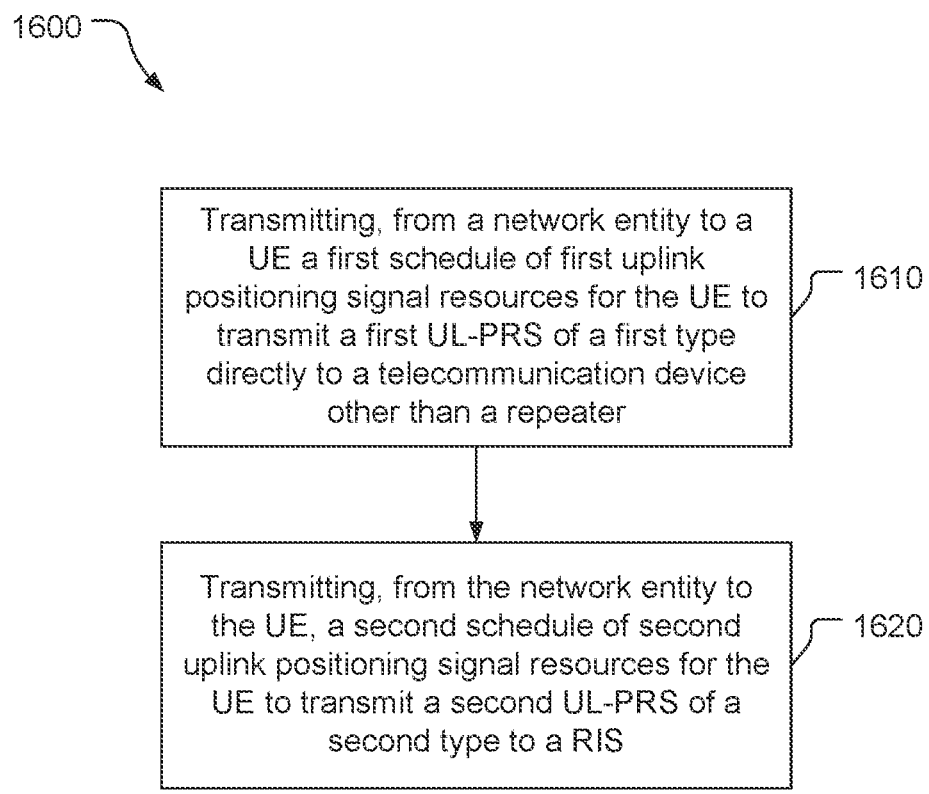
FIG. 16 is a block flow diagram of method of scheduling uplink positioning reference signals.

Referring to FIG. 16, with further reference to FIGS. 1-14, a method 1600 of scheduling uplink positioning reference signals includes the stages shown. The method 1600 is, however, an example and not limiting. The method 1600 may be altered, e.g., by having stages added, removed, rearranged, combined, performed concurrently, and/or having single stages split into multiple stages.

At stage 1610, the method 1600 includes transmitting, from a network entity to a UE, a first schedule of first uplink positioning signal resources for the UE to transmit a first UL-PRS of a first type directly to a telecommunication device other than a repeater. For example, the signal allocation unit 750 of the network entity 700 transmits the type-1 PRS schedule 1441 including a schedule for type-1 UL-PRS for transmission to the network entity 700 and/or another UE without passing through a RIS (or other repeater). The processor 710, possibly in combination with the memory 730, in combination with the transceiver 720 (e.g., the wireless transmitter 342 and the antenna 346) may comprise means for transmitting the first schedule.

At stage 1620, the method 1600 includes transmitting, from the network entity to the UE, a second schedule of second uplink positioning signal resources for the UE to transmit a second UL-PRS of a second type to a RIS (reconfigurable intelligent surface). For example, the signal allocation unit 750 of the network entity 700 transmits the type-2 PRS schedule 1442 including a schedule for type-2 UL-PRS. The processor 710, possibly in combination with the memory 730, in combination with the transceiver 720 (e.g., the wireless transmitter 342 and the antenna 346) may comprise means for transmitting the second schedule.

Implementations of the method 1600 may include one or more of the following features. In an example implementation, the method 1600 comprises: transmitting, from the network entity to the UE in response to receipt of the second UL-PRS and failure to receive the first UL-PRS, a first termination indication indicating for the UE to stop scheduled transmission of the first UL-PRS; or transmitting, from the network entity to the UE in response to receipt of the first UL-PRS and failure to receive the second UL-PRS, a second termination indication indicating for the UE to stop scheduled transmission of the second UL-PRS; or a combination thereof. For example, the processor 710 responds to receiving the type-2 UL-PRS 1482 and not receiving the type-1 UL-PRS 1481 by transmitting the UL-PRS schedule signal 1491 indicating to stop transmitting the type-1 UL-PRS 1481 (or not to transmit scheduled type-1 UL-PRS 1481). Also or alternatively, the processor 710 responds to receiving the type-1 UL-PRS 1481 and not receiving the type-2

UL-PRS 1482 by transmitting the UL-PRS schedule signal 1492 indicating to stop transmitting the type-2 UL-PRS 1482 (or not to transmit scheduled type-2 UL-PRS 1482). The processor 710, possibly in combination with the memory 730, in combination with the transceiver 720 (e.g., the wireless transmitter 342 and the antenna 346) may comprise means for transmitting the first termination indication and means for transmitting the second termination indication. In another example implementation, the method 1600 comprises: controlling selection of one or more of a plurality of antenna beams of the RIS; and transmitting a beam indication from the network entity to the UE indicating a selected one of the plurality of antenna beams of the RIS. For example, the processor 710 can transmit one or more instructions to the RIS, e.g., the RIS 1320, to cause the RIS to use a particular beam for reflecting signals (e.g., to emit signals), and may transmit an indication to the UE 600 as to the RIS beam used for emissions, which may help the UE 600 determine a receive beam and/or a transmit beam to use for signal exchange with the RIS. The processor 710, possibly in combination with the memory 730, may comprise means for controlling selection of one or more antenna beams of the RIS and the processor 710, possibly in combination with the memory 630, in combination with the transceiver 720 (e.g., the wireless transmitter 342 and the antenna 346) may comprise means for transmitting the beam indication to the UE.

Also or alternatively, implementations of the method 1600 may include one or more of the following features. In an example implementation, the method 1600 comprises: transmitting, from the network entity to the UE, a first downlink path loss reference signal of the first type; and transmitting, from the network entity to a RIS, a second downlink path loss reference signal of the second type. For example, the processor 710 may transmit the type-1 path loss reference signal 1421 to the UE 600 (e.g., the UE 1330) (using multiple beams or using a beam predetermined to be directed toward the UE), determine the direction of the RIS (e.g., from a table of RIS locations stored in the memory 730), and transmit the type-2 path loss reference signal 1422 to the RIS (e.g., the RIS 1320 for reflection to the UE 1331). The processor 710, possibly in combination with the memory 730, in combination with the transceiver 720 (e.g., the wireless transmitter 342 and the antenna 346) may comprise means for transmitting the first downlink path loss reference signal. The processor 710, possibly in combination with the memory 730, may comprise means for determining the direction of the RIS. The processor 710, possibly in combination with the memory 730, in combination with the transceiver 720 (e.g., the wireless transmitter 342 and the antenna 346) may comprise means for transmitting the second downlink path loss reference signal. In another example implementation, the first downlink path loss reference signal is a first synchronization signal block or a first positioning reference signal, and the second downlink path loss reference signal is a second synchronization signal block or a second positioning reference signal. In another example implementation, the second downlink path loss reference signal is the second positioning reference signal, and the method 1600 comprises transmitting, from the network entity to the RIS, an indication of a transmit power of the second positioning reference signal. For example, the indication of transmit power may be provided in a PRS-Resource-Power parameter. The processor 710, possibly in combination with the memory 730, in combination with the transceiver 720 (e.g., the wireless transmitter 342 and the antenna 346) may comprise means for transmitting the indication of transmit power. In another example implementation, in accordance with the first schedule and the second schedule the second UL-PRS has a different carrier frequency than the first UL-PRS, or a different bandwidth than the first UL-PRS, or one or more different timing characteristics than the first UL-PRS, or a different codeword than the first UL-PRS, or any combination thereof, and the method 1600 comprises: allocating both the first downlink path loss reference signal and the first UL-PRS with a first carrier frequency, a first bandwidth, and first timing characteristics; and allocating both the second downlink path loss reference signal and the second UL-PRS with a second carrier frequency, a second bandwidth, and second timing characteristics. For example, the signal allocation unit allocates similar resources for the type-1 path loss reference signal 1421 and the type-1 UL-PRS 1481 and allocates similar resources for the type-2 path loss reference signal 1422 and the type-2 UL-PRS 1482. The processor 710, possibly in combination with the memory 730, may comprise means for allocating the first downlink path loss reference signal and the first UL-PRS, and means for allocating the second downlink path loss reference signal and the second UL-PRS.

Flexible RIS-Aided Positioning Reference Signal Timing

Selectable timing of positioning reference signal transmission and/or reception may be used in environments with RIS-aided signaling. For example, RIS-reflected and non-RIS-reflected DL-PRS and/or UL-PRS may be provided on demand. Based on measurement of one or more DL-RS, for example, a UE may determine whether certain DL-PRS and/or UL-PRS may be measured well, and request on-demand allocation of PRS resources that are likely to be measured (by a UE or by a network entity) well and not request PRS resources that are unlikely to be measured well. As another example, timing of listening for RIS-reflected DL-PRS may be reduced compared to non-RIS-reflected PRS. Reception circuitry for receiving RIS-reflected DL-PRS may be actuated for a smaller time window than for receiving non-RIS-reflected DL-PRS. As another example, measurement reporting of DL-PRS may be requested on demand, measurement of DL-PRS may be requested on demand, and/or provision of UL-PRS may be requested on demand.

Referring again to FIG. 6, with further reference to FIGS. 1-5 and 7, the PRS request unit 690 is configured to transmit on-demand PRS requests to the network entity 700. The PRS request unit 690 may request appropriate PRS resources (e.g., specifying one or more TRPs 300, directions/beams, periodicity, PRS configuration (e.g., frequency layer, SCS, slot offset, repetition factor, etc.), etc.). The requested PRS resources may be determined based on a determined need by the UE 600.

Using on-demand PRS requesting may provide one or more of various advantages. For example, on-demand requesting of PRS may allow for an increase in resources to be assigned for DL-PRS transmissions (e.g., increased bandwidth, beam directions, and/or TRPs). Indications may be sent to terminate and/or de-schedule one or more DL-PRS transmissions. Increased DL-PRS transmission may be simplified by being restricted to certain PRS configurations that might be configured in gNBs and/or an LMF. For example, a set of PRS configuration parameters may be used for unenhanced PRS transmission in the absence of a request for increased PRS transmission. The unenhanced PRS transmission may include not transmitting PRS (e.g., to minimize resource usage). One or more levels of increased (enhanced) PRS transmission may each be associated with a different set of PRS configuration parameters (e.g., the same parameters with one or more different values). For example, PRS transmission may be turned on according to a default set of parameters and turned off otherwise (when not needed). On-demand PRS requesting may be aperiodic (performed without a schedule), periodic (with requests at regular intervals), or semi-persistent (with windows of periodic requests initiated at unscheduled times). Semi-persistent transmission may be MAC-CE (Media Access Control-Control Element) triggered whereas aperiodic PRS may be DCI (Downlink Control Information) triggered. PRS resources (DL and/or UL) may be dynamically allocated, with the resources being allocated upon request of the PRS and deallocated upon termination of the request (e.g., expiration of a periodic window, receipt of a termination request, etc.). On-demand PRS may provide one or more advantages such as improving device efficiency, reducing resource usage, saving energy (e.g., reducing energy consumption), etc.

On-demand PRS may be initiated by the UE and/or the server (e.g., a location server). The PRS request unit 690 can transmit an on-demand request for specific properties for UL-PRS (SRS for positioning) and/or DL-PRS. For example, the UE 600 may try to conserve power by requesting a larger periodicity for PRS (e.g., 160 ms instead of 20 ms). The UE 600 and/or the server 400 may request/suggest/recommend a specific (DL and/or UL) PRS pattern, (DL and/or UL) PRS transmission to be turned ON, (DL and/or UL) PRS transmission to be turned OFF, a periodicity, a bandwidth, etc.

The PRS request unit 690 may transmit one or more on-demand requests for type-1 DL-PRS, type-1 UL-PRS, type-2 DL-PRS, and/or type-2 UL-PRS. For example, the UE 600 may be unable to measure one type of DL-PRS (e.g., type-2 DL-PRS if the UE 600 is at the location of the UE 530 or type-1 DL-PRS if the UE 600 is at the location of the UE 531). A decision to request a specific type of DL-PRS from a specific TRP may be based on measurement of one or more DL-RS. The PRS request unit 690 may communicate with the signal measurement unit 650 to determine whether the signal measurement unit 650 is able to measure type-1 DL-RS and/or type-2 DL-RS, with the DL-RS being, e.g., PRS, SSB, or CSI-RS. The PRS request unit 690 may respond to the signal measurement unit 650 being able to measure one type of DL-RS and not the other (at least with a threshold quality) by requesting DL-PRS of only the type corresponding to the type of DL-RS that the UE 600 was able to measure (e.g., with at least a threshold quality). By not requesting, and thus avoiding measuring, the other type of DL-PRS when the UE 600 is unable to measure the other type of DL-PRS well, the UE 600 may save power. Similarly, a decision to request a specific type of UL-PRS may be based on measurement of one or more DL-RS. The PRS request unit 690 may communicate with the signal measurement unit 650 to determine whether the signal measurement unit 650 is able to measure type-1 DL-RS and/or type-2 DL-RS, with the DL-RS being, e.g., a path loss reference signal for SRS power control. The PRS request unit 690 may respond to the signal measurement unit 650 being able to measure one type of DL-RS and not the other (at least with a threshold quality) by requesting UL-PRS of only the type corresponding to the type of DL-RS that the UE 600 was able to measure (e.g., with at least a threshold quality). By not requesting, and thus avoiding transmitting, the other type of UL-PRS when the other type of UL-PRS will not likely be able to be measured well, the UE 600 may save power.

The PRS request unit 690 may transmit one or more on-demand requests for type-2 DL-PRS and/or type-2 UL-PRS for a specific RIS associated with a common TRP. For example, the UE 600 may be unable to measure a type-2 DL-PRS from a TRP via one RIS but able to measure a type-2 DL-PRS from the TRP via another RIS (e.g., the UE 532 may receive DL-PRS from the TRP 510 via the RIS 521 but not via the RIS 520). A decision to request a type-2 DL-PRS via a specific RIS may be based on measurement of one or more DL-RS. The PRS request unit 690 may communicate with the signal measurement unit 650 to determine via with RIS(es) the signal measurement unit 650 is able to measure a type-2 DL-RS from a TRP. The PRS request unit 690 may respond to the signal measurement unit 650 being able to measure a type-2 DL-RS from one RIS and not another RIS (at least with a threshold quality) by requesting type-2 DL-PRS corresponding to the RIS from which the UE 600 was able to measure the type-2 DL-RS (e.g., with at least a threshold quality). By not requesting, and thus avoiding measuring, type-2 DL-PRS from the other RIS when the UE 600 is unable to measure the type-2 DL-PRS well from the other RIS, the UE 600 may save power. Similarly, a decision to request a type-2 UL-PRS for transmission via a specific RIS may be based on measurement of one or more DL-RS, with the PRS request unit 690 responding to the signal measurement unit 650 being able to measure a type-2 DL-RS from one RIS and not another RIS (at least with a threshold quality) by requesting type-2 UL-PRS corresponding to the RIS from which the UE 600 was able to measure the type-2 DL-RS (e.g., with at least a threshold quality). By not requesting, and thus avoiding transmitting, type-2 UL-PRS to the other RIS when the type-2 UL-PRS sent from the UE 600 and reflected by the other RIS is unlikely to be measured well, the UE 600 may save power.

Figure 17:
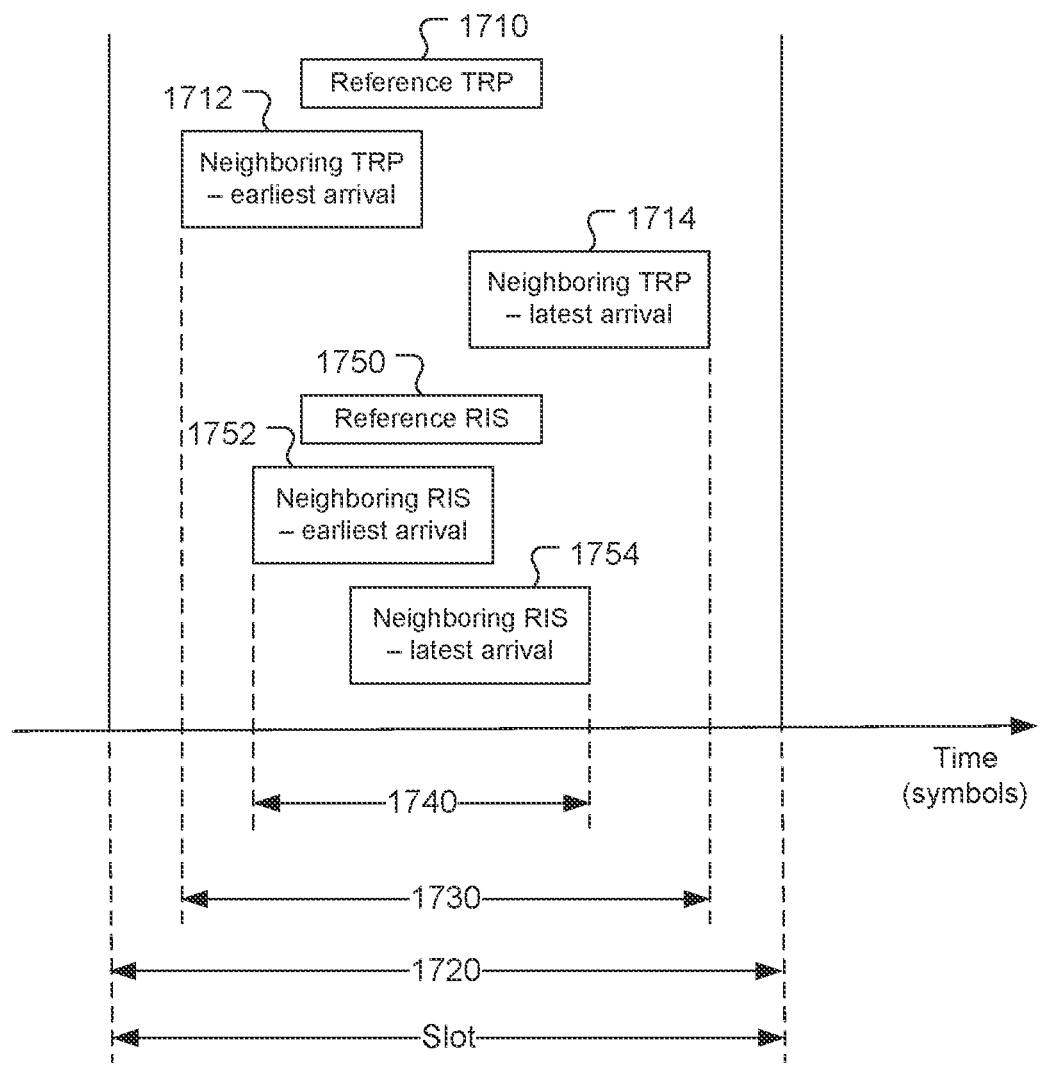
FIG. 17 is a simplified timing diagram of receipt of positioning reference signals from a reference base station, a neighbor base station, a reference RIS, and a neighbor RIS.

Referring also to FIG. 17, the UE 600 may be provided with an indication of expected time of arrival of each DL-PRS, for type-1 DL-PRS or type-2 DL-PRS. For example, the network entity 700 may transmit the UE 600 a DL-PRS-expectedRSTD parameter value that indicates the expected time of arrival as a difference in time relative to a DL reference signal. The network entity 700 may also transmit the UE 600 a DL-PRS-expectedRSTD-uncertainty parameter value that indicates an uncertainty in the DL-PRS-expectedRSTD parameter value. The uncertainty parameter may be used to determine the earliest and the latest that that a PRS may arrive (from a neighbor TRP) relative to a reference signal (from a reference TRP), and thus to define a search window around the DL-PRS-expectedRSTD parameter value. The search window may be defined at a slot level or at a sub-slot level. For slot-level buffering for FFT (Fast Fourier Transform) operations, a duration K is equal to $2^{-\mu}|S|$, where $\mu$ is the index of subcarrier space (SCS) (with 0, 1, 2 corresponding to SCS of 15 kHz, 30 kHz, 60 kHz) and S is the set of slots of a serving sell within a P ms window (a PRS symbol duration) that contains potential DL-PRS resources considering the DL-PRS-expectedRSTD and the DL-PRS-expectedRSTD-uncertainty parameter values for each pair of (target and reference) DL-PRS resource sets. The PRS symbol duration may correspond to a bound of a UE buffering window, extending from an earliest time of PRS arrival (e.g., the start of a symbol span 1712) to a latest time of PRS arrival (e.g., an end of a symbol span 1714). The PRS symbol duration may extend from DL-PRS-expectedRSTD minus the DL-PRS-expectedRSTD-uncertainty to DL-PRS-expectedRSTD plus the DL-PRS-expectedRSTD-uncertainty and does not refer to a time span of a single OFDM symbol (which corresponds to the inverse of the sub-carrier spacing). For sub-slot-level buffering for FFT operations, [$T_s^{start}$, $T_s^{end}$] defines a smallest interval in milliseconds within a slot s corresponding to an integer number of OFDM symbols of a serving cell that covers a union of potential PRS symbols and determines the PRS symbol occupancy within slot s considering the DL-PRS-expectedRSTD and the DL-PRS-expectedRSTD-uncertainty parameter values for each pair of DL-PRS resource sets (target and reference). For example, to cover earliest and latest symbol spans 1712, 1714 for DL-PRS from a neighbor TRP based on the expected RSTD uncertainty relative to a span 1710 of an expected RSTD of DL-PRS from a reference TRP, the signal measurement unit 650 may use a slot-level search window 1720 that spans an entire slot. To cover the symbol spans 1712, 1714, the signal measurement unit 650 may use a sub-slot-level search window 1730 that spans the symbols from a beginning of the earliest symbol span 1712 to an end of the latest symbol span 1714. Using a sub-slot-level search window may reduce operations (e.g., FFT (Fast Fourier Transform) operations) performed by the UE 600 and thus reduce power consumption by the UE 600 compared to using a slot-level search window.

For non-RIS-reflected signals, both the distance between the TRP 300 and the UE 600 and the uncertainty of this distance may be significant, resulting in a significant DL-PRS-expectedRSTD-uncertainty parameter value. For RIS-reflected signals, a PRS symbol duration depends on the DL-PRS-expectedRSTD and the DL-PRS-expectedRSTD-uncertainty that are dependent upon the RIS deployment. For RIS-reflected signals, a distance between the TRP 300 and a RIS is known, and the distance (e.g., 20 m) between the RIS and the UE 600 will (at least typically) be much smaller than the distance (e.g., 1+ km) between the TRP 300 and the UE 600 for non-RIS-reflected signals. Consequently, synchronization between RISes may be better controlled than synchronization between TRPs and the DL-PRS-expectedRSTD-uncertainty parameter value for RIS-reflected signals may be much smaller than the DL-PRS-expectedRSTD-uncertainty parameter value for RIS-reflected signals. For example, the symbols from earliest and latest symbol spans 1752, 1754 for DL-PRS from a neighbor RIS based on the expected RSTD uncertainty relative to a span 1750 of an expected RSTD of DL-PRS from a reference RIS may be fewer than in the window 1730 (as shown). The signal measurement unit 650 may thus use a search window 1740 (that is a quantity of symbols (e.g., OFDM symbols)) for RIS-reflected PRS that may be much smaller than a search window, e.g., the search window 1730, for non-RIS-reflected PRS. The signal measurement unit 650 may use different PRS symbol durations to measure non-RIS-reflected and RIS-reflected signals. The RIS-reflected PRS symbol duration may be, for example, a smallest interval (e.g., in milliseconds), within a slot, that corresponds to an integer number of (OFDM) symbols that covers a union of potential type-2 (RIS-reflected) DL-PRS and that determines the type-2 PRS symbol occupancy within the slot.

The capability unit 665 may report the capability of the UE 600 to support different PRS symbol durations (e.g., process different amounts of PRS symbols), e.g., different P-millisecond windows of potential PRS resources. A PRS symbol duration may correspond to a size of a buffer of the UE 600 for buffering DL-PRS symbols for processing, e.g., by FFT operations. The size of the buffer of the UE 600 may be larger than a PRS symbol duration reported, e.g., with the UE 600 configured to use a portion of the buffer corresponding to the indicated PRS symbol duration for processing the DL-PRS. The capability report provided by the capability unit 665 may indicate that the UE 600 is capable of slot-level buffering and/or sub-slot-level (symbol-level) buffering. The capability unit 665 may determine (calculate) the PRS symbol durations for RIS-reflected and non-RIS-reflected signals, e.g., based on the expected RSTD and the expected RSTD uncertainty values for RIS-reflected and non-RIS-reflected signals, respectively. The RIS-reflected PRS symbol duration is related to RIS deployment and may be calculated based on one or more separations of two or more RISes for a common (i.e., the same) TRP 300. The capability unit 665 may transmit one or more indications of PRS symbol duration(s) (P values) to the network entity 700 in the capability report indicating the supported PRS symbol duration(s) and the corresponding signal type (e.g., RIS-reflected or non-RIS-reflected, or RIS-reflected by a particular RIS, etc.). The UE 1802 may transmit multiple capability reports over time and one or more of the PRS symbol durations may change over time (e.g., the RIS-reflected PRS symbol duration may change), e.g., based on a desire of the UE 600 to conserve power, or based on the desire of the UE 600 to conserve power weighed against a desire for measurement accuracy. The capability report may explicitly and/or implicitly request that the network entity 700 allocate PRS resources to span no more than respective PRS symbol durations at the UE 600.

The signal measurement unit 650 may coordinate resources for signal measurement based on the supported PRS symbol duration(s). For example, the signal measurement unit 650 may buffer symbols in accordance with the respective PRS symbol durations. As another example, the signal measurement unit 650 may turn OFF one or more components of the UE 600 for processing DL-PRS, e.g., one or more RF-chain components, based on PRS duration. RF-chain components may include, for example, one or more filters, one or more amplifiers (e.g., low-noise amplifiers), one or more mixers, etc. The signal measurement unit 650 may turn the component(s) ON, for example, for less than a full slot based on the PRS symbol duration of PRS to be measured being less than a full slot. The signal measurement unit 650 may consequently perform fewer operations, e.g., fewer FFT operations, to process the PRS than if the RF component(s) is(are) turned ON for a longer time, e.g., for one or more full slots. For slot-level buffering, the signal measurement unit 650 buffers and turns on RF processing for one or more entire slots. For sub-slot-level (symbol-level) buffering, the signal measurement unit 650 buffers symbols at the symbol level, which may reduce UE operations and thus UE power consumption compared to slot-level buffering. Symbol-level buffering may buffer an integer number of (OFDM) symbols of a serving cell that includes a union of potential PRS symbols, corresponds to a PRS symbol occupancy within a slot, and is based on the expected RSTD and the expected RSTD uncertainty for each pair (target and reference) of DL-PRS resource sets. The use of the RIS-reflected PRS symbol duration to reduce buffering and UE operations may reduce power consumption by the UE 600. Power consumption reduction may be achieved by using a reduced PRS symbol duration (and thus search window) and/or by measuring only the types of PRS (e.g., type-1 or type-2) that the UE 600 is able to measure well. For example, for the UE 531, power may be conserved by not attempting to measure type-1 PRS and by using a PRS symbol duration specifically for type-2 PRS (and possibly specifically for type-2 PRS from the RIS 520).

Figure 18:
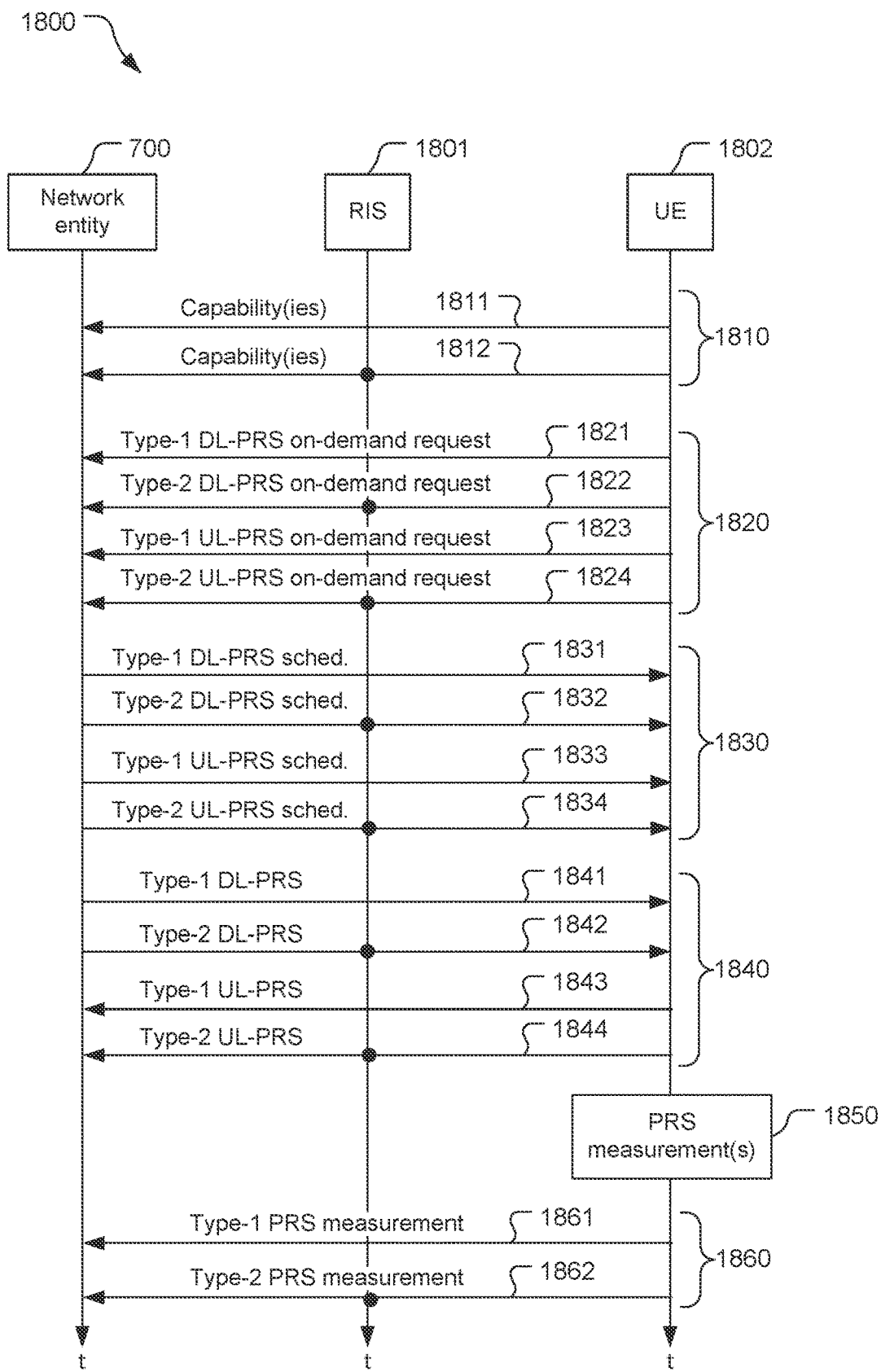
FIG. 18 is a signaling and process flow for providing DL-PRS and UL-PRS, and measuring DL-PRS, with and without use of a RIS.

Referring to FIG. 18, with further reference to FIGS. 1-7 and 17, a signaling and process flow 1800 for providing DL-PRS and UL-PRS, and measuring DL-PRS, with and without use of a RIS includes the stages shown. The flow 1800 is an example, as stages may be added, rearranged, and/or removed. The flow 1800 shows signal exchange between the network entity 700, a RIS 1801, and a UE 1802 that may be in LOS cell coverage but not RIS coverage, may be in RIS coverage but not LOS cell coverage, or may be in LOS cell coverage and RIS coverage. The discussion may assume that signals are successfully exchanged between the network entity 700 and the UE 1802, but one or more signals may not be successfully exchanged, e.g., depending on a location of the UE 1802 relative to the network entity 700 and/or one or more obstacles. The flow 1800 may include stages shown in FIG. 9 but not shown here in order to simplify the figure.

At stage 1810, the UE 1802 transmits a capability(ies) report 1811 and/or a capability(ies) report 1812 to the network entity 700. The capability(ies) report 1812, if transmitted, is transmitted via the RIS 1801 to the network entity 700. The capability(ies) reports 1811, 1812 may indicate, among other things, the ability of the UE 1802 to support a RIS-reflected PRS symbol duration and a non-RIS-reflected PRS symbol duration, and the reports may include respective values of the PRS symbol durations (e.g., calculated based on indications of DL-PRS-expectedRSTD and DL-PRS-expectedRSTD-uncertainty (not shown)), e.g., values of the windows 1720, 1730, 1740.

At stage 1820, the network entity 700 transmits a type-1 DL-PRS on-demand request 1821, a type-2 DL-PRS on-demand request 1822, a type-1 UL-PRS on-demand request 1823, and a type-2 UL-PRS on-demand request 1824 to the UE 1802. One or more, or even all, of the requests 1821-1824 may be omitted from the flow 1800 (e.g., if the UE 1802 does not support on-demand requests and/or the UE 1802 is not triggered to transmit one or more of the on-demand requests 1821-1824). The signal measurement unit 650 may transmit the request(s) 1821, 1822 and the SRS for positioning unit 675 may transmit the request(s) 1823, 1824. The request(s) 1821-1824 may request specific PRS resource parameters. The request 1822 may request the RIS 1801 be used to reflect the DL-PRS and the request 1824 may indicate that the RIS 1801 will be used to reflect the UL-PRS.

At stage 1830, the network entity 700 transmits a type-1 DL-PRS schedule 1831, a type-2 DL-PRS schedule 1832, a type-1 UL-PRS schedule 1833, and a type-2 UL-PRS schedule 1834 to the UE 1802. One or more, or even all, of the schedules 1831-1834 may be omitted from the flow 1800. One or more of the schedules 1831-1834 may be transmitted in response to one or more of the requests 1821-1824, respectively, or may be transmitted independent of one or more on-demand requests. The signal allocation unit 750 and the beam management unit 760 may allocate PRS resources and the appropriate beam(s) and transmit the schedules 1831-1834. The schedules 1831, 1832 may be based on, and configured to comply with, PRS symbol durations indicated in the capability(ies) reports 1811, 1812.

At stage 1840, the network entity 700 transmits type-1 DL-PRS 1841 and type-2 DL-PRS 1842 to the UE 1802 and the UE 1802 transmits type-1 UL-PRS 1843 and type-2 UL-PRS 1844 to the network entity 700 in accordance with the respective schedules 1831-1834. One or more, or even all, of the PRS 1841-1844 may be omitted from the flow 1800. The DL-PRS 1841, 1842 may satisfy (e.g., be configured to be received with within at the UE 1802) PRS symbol durations indicated in the capability(ies) reports 1811, 1812.

At stage 1850, the UE 1802 may measure the DL-PRS 1841, 1842, e.g., as discussed above with respect to stage 960 and/or stage 1460. The signal measurement unit 650 may buffer the DL-PRS 1841, 1842 in accordance with respective PRS symbol durations indicated in the capability(ies) reports 1811, 1812, e.g., turning RF components of the UE OFF absent receipt of PRS. For example, the signal measurement unit 650 may buffer the type-2 DL-PRS 1842 in accordance with the search window 1740 and buffer the type-1 DL-PRS 1841 in accordance with the search window 1720 or the search window 1730.

At stage 1860, the UE 1802 may transmit a type-1 PRS measurement report 1861 and/or a type-2 PRS measurement report 1862, similar to the discussion of stage 970 and/or the discussion of stage 1470 above. The network entity 700 may process the measurement report(s) 1861, 1862 to determine position information (e.g., a location estimate, velocity, speed, etc.) regarding the UE 1802.

Figure 19:
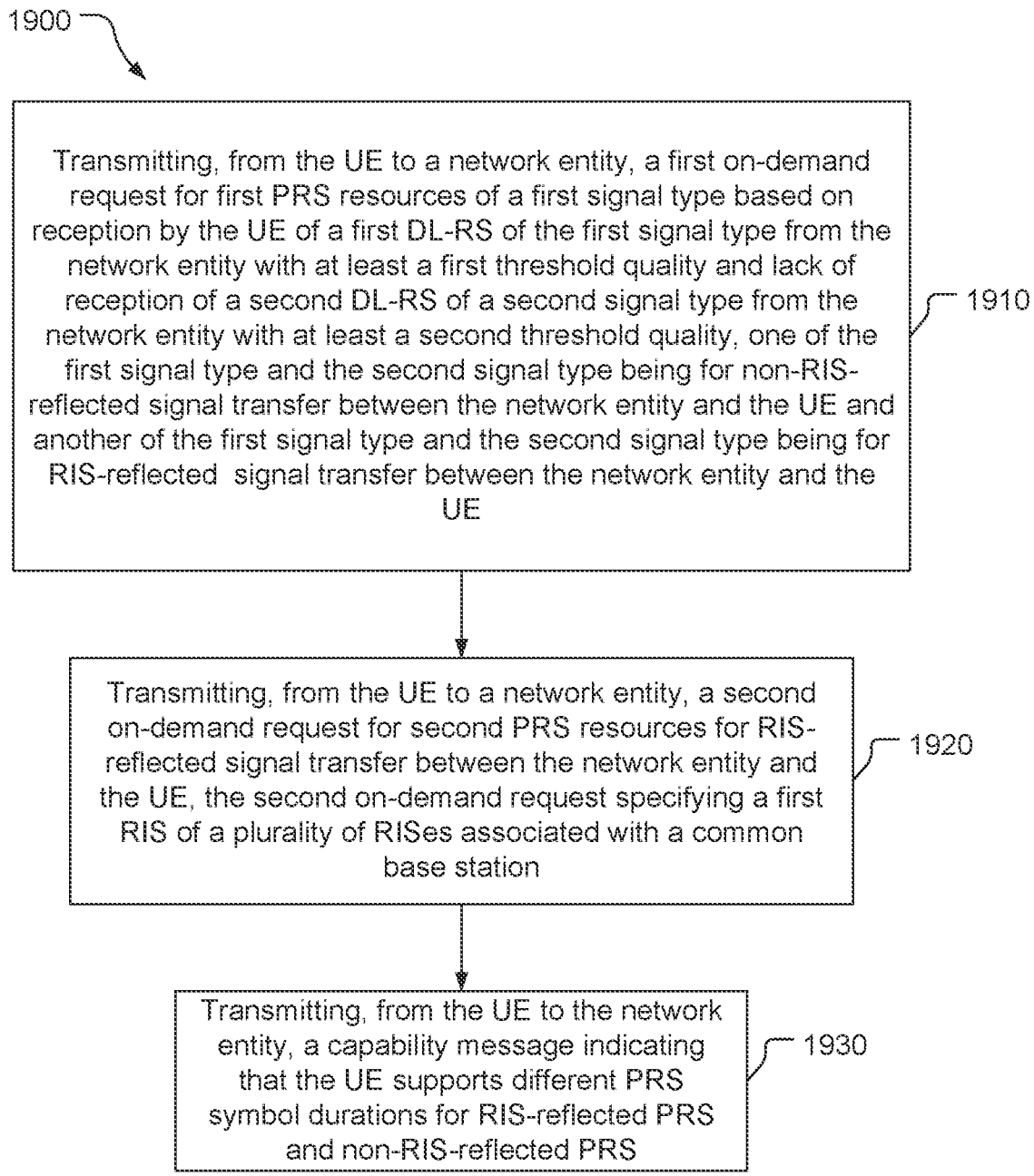
FIG. 19 is a block flow diagram of method of facilitating position determination of a UE.

Referring to FIG. 19, with further reference to FIGS. 1-7, 17, and 18, a method of facilitating position determination of a UE 1900 includes the stages shown. The method 1900 is, however, an example and not limiting. The method 1900 may be altered, e.g., by having stages added, removed, rearranged, combined, performed concurrently, and/or having single stages split into multiple stages. For example, the method 1900 may include stage 1910, or may include stage 1920, or may include stage 1930, or may include any combination thereof (stages 1910 and 1920, or stages 1920 and 1930, or stages 1910, 1920, and 1930). Accordingly, a UE may comprise means, for facilitating position determination information for the UE, comprising means for performing stage 1910, or means for performing stage 1920, or means for performing stage 1930, or any combination thereof.

At stage 1910, the method 1900 includes transmitting, from the UE to a network entity, a first on-demand request for first PRS resources of a first signal type based on reception by the UE of a first DL-RS of the first signal type from the network entity with at least a first threshold quality and lack of reception of a second DL-RS of a second signal type from the network entity with at least a second threshold quality, one of the first signal type and the second signal type being for non-RIS-reflected signal transfer between the network entity and the UE and another of the first signal type and the second signal type being for RIS-reflected signal transfer between the network entity and the UE. For example, the UE 1802 (e.g., the signal measurement unit 650) may transmit one or more of the on-demand requests 1821 or 1823 based on being able to measure a non-RIS-reflected DL-RS and being unable to measure a RIS-reflected DL-RS. As another example, the UE 1802 (e.g., the signal measurement unit 650) may transmit one or more of the on-demand requests 1822 or 1824 based on being able to measure a RIS-reflected DL-RS and being unable to measure a non-RIS-reflected DL-RS. The signal types may be for non-RIS-reflected signal transfer and RIS-reflected signal transfer, respectively, in that the signal types may be of configurations assigned to direct (non-RIS-reflected) signal transfer and indirect (RIS-reflected) signal transfer. The RIS-reflected signals may include a RIS ID. The processor 610, possibly in combination with the memory 630, in combination with the transceiver 620 (e.g., the wireless transmitter 242 and the antenna 246) may comprise means for transmitting the first on-demand request for first PRS resources.

At stage 1920, the method 1900 includes transmitting, from the UE to a network entity, a second on-demand request for second PRS resources for RIS-reflected signal transfer between the network entity and the UE, the second on-demand request specifying a first RIS of a plurality of RISes associated with a common base station. For example, the signal measurement unit 650 of the UE 1802 may transmit the type-2 DL-PRS on-demand request 1822 and/or the type-2 UL-PRS on-demand request 1824 to the network entity specifying the RIS 1801 (e.g., the RIS 520 of the RISes 520, 521 corresponding to the TRP 510). The processor 610, possibly in combination with the memory 630, in combination with the transceiver 620 (e.g., the wireless transmitter 242 and the antenna 246), may comprise means for transmitting the second on-demand request for second PRS resources.

At stage 1930, the method 1900 includes transmitting, from the UE to the network entity, a capability message indicating that the UE supports different PRS symbol durations for RIS-reflected PRS and non-RIS-reflected PRS. For example, the capability unit 665 of the UE 1802 may transmit one or both of the capability(ies) reports 1811, 1812 to the network entity 700 indicating that the UE 1802 supports different PRS symbol durations for RIS-reflected PRS and non-RIS-reflected PRS (that the UE 1802 is configured to process PRS with the different symbol durations). The processor 610, possibly in combination with the memory 630, in combination with the transceiver 620 (e.g., the wireless transmitter 242 and the antenna 246) may comprise means for transmitting the capability message.

Implementations of the method 1900 may include one or more of the following features. In an example implementation, the method 1900 comprises: transmitting the first on-demand request, where the first PRS resources are first downlink PRS resource or first uplink PRS resources; or transmitting the second on-demand request, where the second PRS resources are second downlink PRS resource or second uplink PRS resources; or a combination thereof. For example, the signal measurement unit may transmit one or more of the on-demand requests 1821-1824. In another example implementation, the method 1900 comprises transmitting the first on-demand request, and where the first DL-RS is a path loss reference signal. For example, the signal measurement unit 650 may determine whether, and which, on-demand PRS request(s) 1821-1824 to transmit based on measurement, or lack thereof, of one or more DL-RS (e.g., measurement of a type-1 DL-RS and lack of measurement of a type-2 DL-RS, or measurement of a type-2 DL-RS and lack of measurement of a type-1 DL-RS) with one or more respective measurement qualities. In another example implementation, the method 1900 comprises transmitting the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS. For example, the signal measurement unit 650 of the UE 532 may transmit an on-demand request for type-2 PRS (UL and/or DL) to be reflected by the RIS 521 based on measurement of a DL-RS reflected by the RIS 521 and lack of measurement (of adequate quality) of a DL-RS reflected by the RIS 520. The processor 610, possibly in combination with the memory 630, in combination with the transceiver 620 (e.g., the wireless transmitter 242, the wireless receiver 244, and the antenna 246), may comprise means for transmitting the second on-demand request for second PRS resources.

Also or alternatively, implementations of the method 1900 may include one or more of the following features. In an example implementation, the method 1900 comprises transmitting the capability message to the network entity, with the capability message including a first PRS symbol duration supported by the UE for the receiving non-RIS-reflected PRS and a second PRS symbol duration supported by the UE for receiving the RIS-reflected PRS. The symbol durations may be specified, for example, as a number of symbols and/or a time span (e.g., a quantity of milliseconds)). In another example implementation, the method 1900 comprises determining the second PRS symbol duration based on a separation of at least two RISes associated with the network entity.

Figure 20:
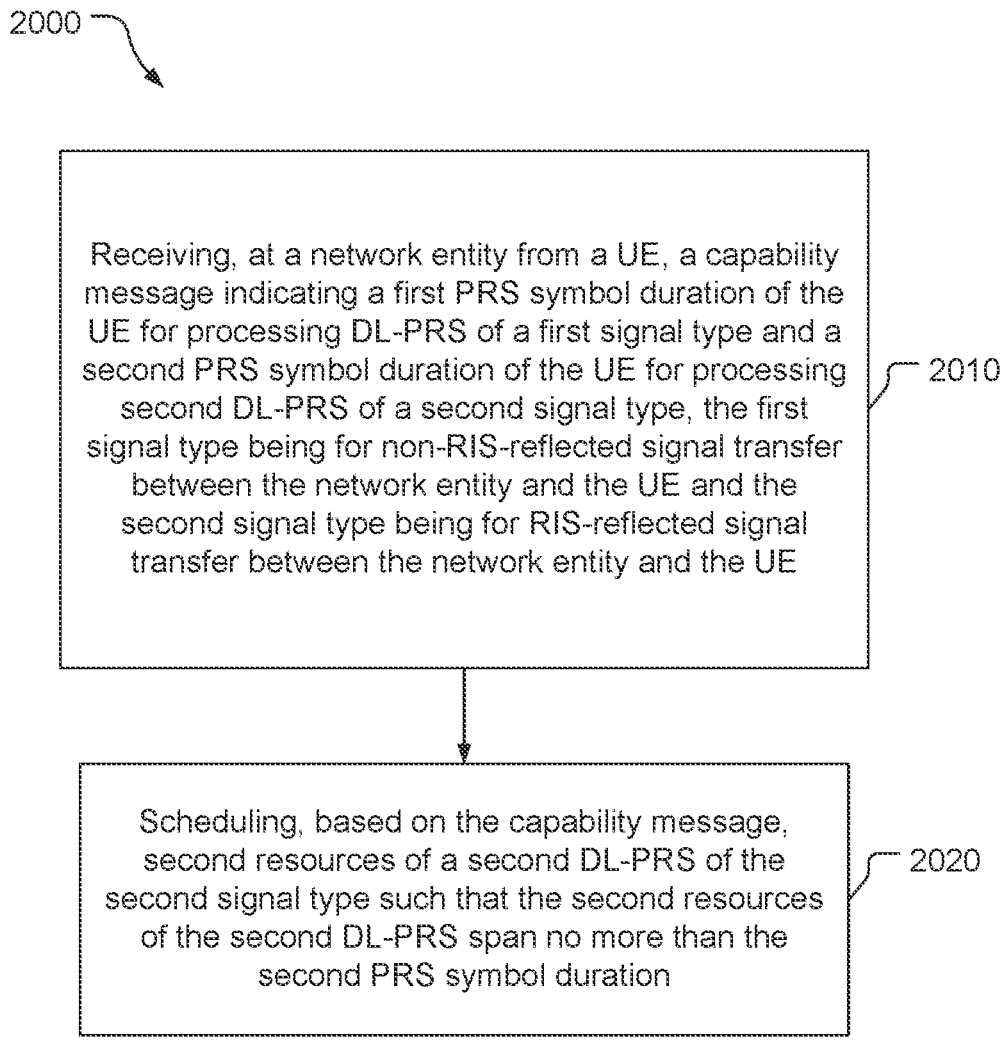
FIG. 20 is a block flow diagram of method of a downlink positioning reference signal scheduling method.

Referring to FIG. 20, with further reference to FIGS. 1-7, 17, and 18, a downlink positioning reference signal scheduling method 2000 includes the stages shown. The method 2000 is, however, an example and not limiting. The method 2000 may be altered, e.g., by having stages added, removed, rearranged, combined, performed concurrently, and/or having single stages split into multiple stages.

At stage 2010, the method 2000 includes receiving, at a network entity from a UE, a capability message indicating a first PRS symbol duration of the UE for processing DL-PRS of a first signal type and a second PRS symbol duration of the UE for processing second DL-PRS of a second signal type, the first signal type being for non-RIS-reflected signal transfer between the network entity and the UE and the second signal type being for RIS-reflected signal transfer between the network entity and the UE. For example, the network entity 700 may receive one or both of the capability(ies) reports 1811, 1812 with the report(s) 1811, 1812 including one or more PRS symbol durations (e.g., quantity of symbols, quantity of time) for each of RIS-reflected signals and/or non-RIS-reflected signals. The signal types may be for non-RIS-reflected signal transfer and RIS-reflected signal transfer, respectively, in that the signal types may be of configurations assigned to direct (non-RIS-reflected) signal transfer and indirect (RIS-reflected) signal transfer. The PRS symbol duration for RIS-reflected signals may specify a RIS, e.g., may include a RIS ID. The processor 710, possibly in combination with the memory 730, in combination with the transceiver 720 (e.g., the wireless receiver 344 and the antenna 346) may comprise means for receiving the capability message.

At stage 2020, the method 2000 includes scheduling, based on the capability message, second resources of the second DL-PRS of the second signal type such that the second resources of the second DL-PRS span no more than the second PRS symbol duration. For example, the signal allocation unit 750 may allocate PRS resources to help ensure that type-2 DL-PRS are received by the UE 600 within one or more specified PRS symbol durations, e.g., the window 1740. The processor 710, possibly in combination with the memory 730, (possibly in combination with the transceiver 720 (e.g., the wireless transmitter 342 and the antenna 346)) may comprise means for scheduling the second resources.

Implementations of the method 2000 may include one or more of the following features. In an example implementation, the second PRS symbol duration is shorter in time than the first PRS symbol duration, and the method 2000 comprises scheduling, based on the capability message, first resources of a first DL-PRS of the first signal type such that the first resources of the first DL-PRS span no more than the first PRS symbol duration. For example, the signal allocation unit 750 may allocate PRS resources to help ensure that type-1 DL-PRS are received by the UE 600 within one or more specified PRS symbol durations, e.g., the window 1720 or 1740. The processor 710, possibly in combination with the memory 730, (possibly in combination with the transceiver 720 (e.g., the wireless transmitter 342 and the antenna 346)) may comprise means for scheduling the first resources. In another example implementation, the first PRS symbol duration is a quantity of slots and the second PRS symbol duration is a sub-slot quantity of symbols.

Figure 21:
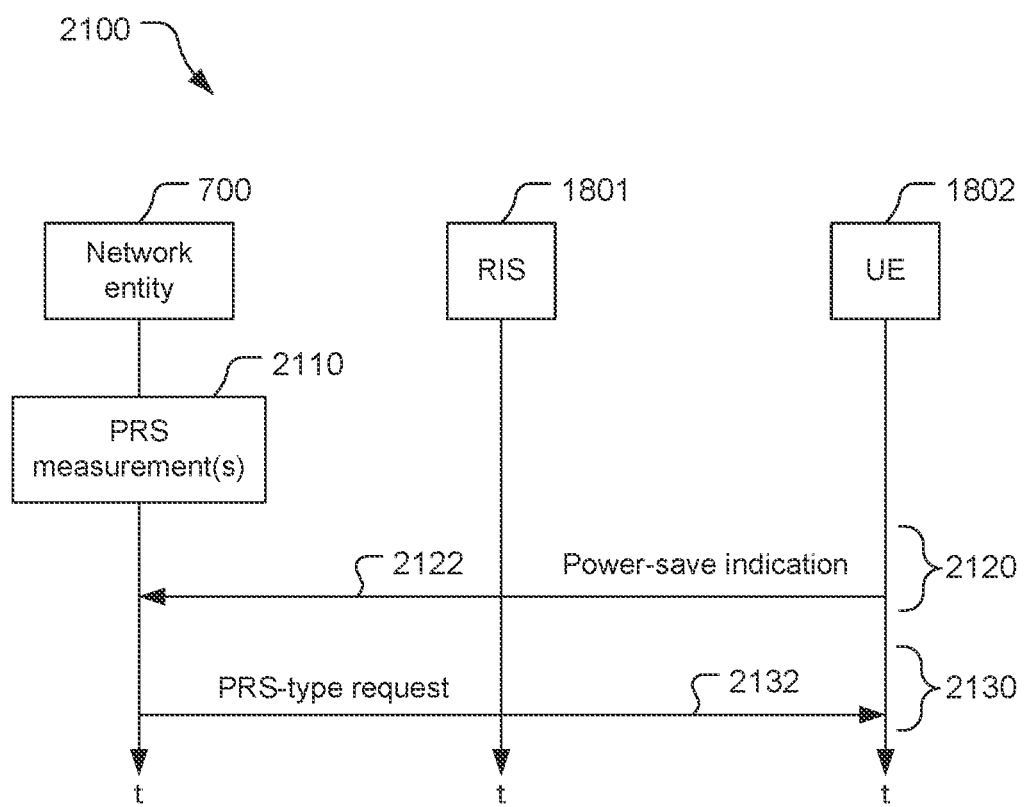
FIG. 21 is a simplified signaling and process flow for on-demand request of DL-PRS measurements and/or UL-PRS.

Referring to FIG. 21, with further reference to FIGS. 1-7, 17, and 18, a signaling and process flow 2100 for on-demand request of DL-PRS measurements and/or UL-PRS includes the stages shown. The flow 2100 is an example, as stages may be added, rearranged, and/or removed. The flow 2100 may be a supplement to, e.g., a continuation of, the flow 1800.

At stage 2110, the network entity 700 may measure one or more UL-PRS to obtain one or more UL-PRS measurements. For example, the signal measurement unit 770 attempts to measure the UL-PRS 1843 and/or the UL-PRS 1844. The signal measurement unit 770 may or may not be able to measure a scheduled UL-PRS, e.g., due to channel conditions which may vary. The signal measurement unit 770 may determine whether a UL-PRS was measured at all, measured but with insufficient quality, or measured with sufficient quality, e.g., for use in determine location of the UE 1802.

At stage 2120, the UE 1802 may transmit a power-save indication 2122 to the network entity 700. For example, the power control unit 670 may transmit the indication 2122 requesting for the UE 1802 to be allowed to enter a power-save mode of the UE 1802, or indicating that the UE 1802 is operating in, or entering into operating in, a power-save mode. In the power-save mode the UE 1802 may, for example, have limited capability to process PRS (e.g., measure (DL and/or SL) PRS, report (DL and/or SL) PRS measurements, and/or transmit (UL and/or SL) PRS). The indication 2122 may, for example, indicate one or more specific requested changes in operation, e.g., for the UE 1802 to measure only type-1 PRS or only type-2 PRS, for the UE 1802 to report only type-1 PRS measurements or only type-2 PRS measurements, and/or for the UE 1802 to transmit only type-1 PRS or only type-2 PRS. The indication 2122 may, as another example, request the power-save mode generally, e.g., without a specific request for a particular power-saving functionality (e.g., change in UE operation).

At stage 2130, the network entity may transmit a PRS-type request 2132 to the UE 1802. For example, the network entity 700 may be configured to respond to the indication 2122, and/or to respond to one or more measurements of, and/or attempts to measure, the UL-PRS 1843, 1844, and/or to one or more indications of measurement of the DL-PRS 1841, 1842 (or lack thereof) by attempting to cause the UE 1802 to use less power. For example, to help the UE 1802 save power, the signal allocation unit 750 may schedule only type-1 signals for reception by the UE 1802, or schedule only type-2 signals for reception by the UE 1802, or schedule only type-1 signals for transmission by the UE 1802, or schedule only type-2 signals for transmission by the UE 1802. As another example, the processor 710 may be configured to request that the UE 1802 report only measurements of type-1 PRS or report only measurements of type-2 PRS. As another example, the processor 710 may be configured to request that the UE 1802 report only measurements of type-1 PRS or report only measurements of type-2 PRS. A request to report only measurements of one type of PRS may be an implicit request for the UE 1802 to measure only the one type of PRS. The network entity 700 may thus request that the UE 1802 measure and/or report only one type of the type-1 and type-2 signals in response to the indication 2122 and/or in response to one or more DL-PRS measurements and/or one or more UL-PRS measurements. For example, if one type of PRS measurement was measured with sufficient quality and the other type of PRS was not measured with sufficient quality (e.g., with poor quality or not at all), then the UE 1802 may be requested to process (measure, report, and/or transmit) PRS of the type that was measured with sufficient quality.

Figure 22:
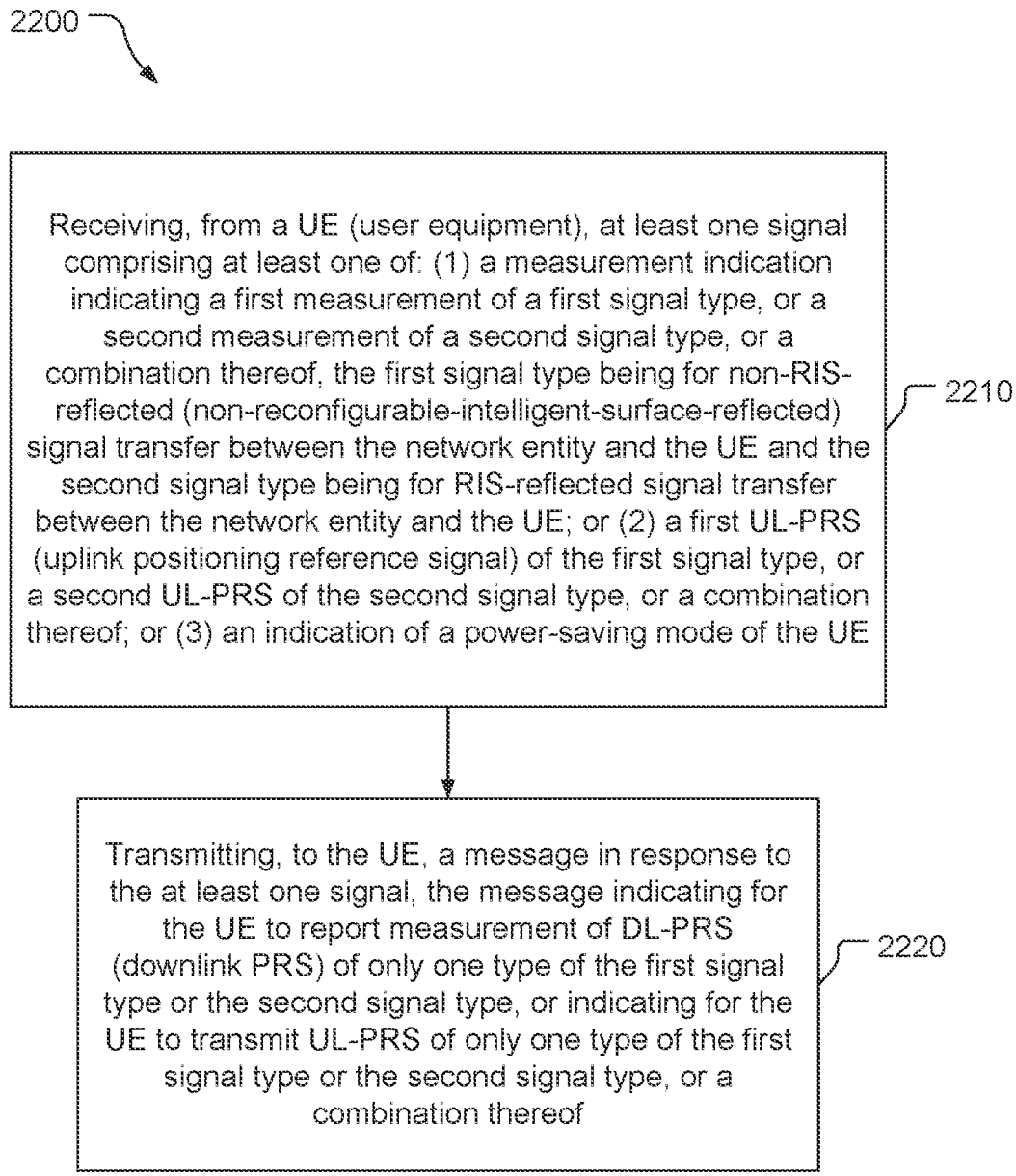
FIG. 22 is a block flow diagram of a method of controlling signal exchange.

Referring also to FIG. 22, a method 2200 of controlling signal exchange includes the stages shown. The method 2200 is, however, an example and not limiting. The method 2200 may be altered, e.g., by having stages added, removed, rearranged, combined, performed concurrently, and/or having single stages split into multiple stages.

At stage 2210, the method 2000 includes receiving, from a UE (user equipment), at least one signal comprising at least one of: (1) a measurement indication indicating a first measurement of a first signal type, or a second measurement of a second signal type, or a combination thereof, the first signal type being for non-RIS-reflected (non-reconfigurable-intelligent-surface-reflected) signal transfer between the network entity and the UE and the second signal type being for RIS-reflected signal transfer between the network entity and the UE; or (2) a first UL-PRS (uplink positioning reference signal) of the first signal type, or a second UL-PRS of the second signal type, or a combination thereof; or (3) an indication of a power-saving mode of the UE. For example, the network entity 700 may receive one or more measurements of the DL-PRS 1841, 1842, or one or more of the UL-PRS 1841, 1842, and/or the indication 2122. The processor 710, possibly in combination with the memory 730, in combination with the transceiver 720 (e.g., a wireless receiver and an antenna) may comprise means for receiving the at least one signal.

At stage 2220, the method 2200 includes transmitting, to the UE, a message in response to the at least one signal, the message indicating for the UE to report measurement of DL-PRS (downlink PRS) of only one type of the first signal type or the second signal type, or indicating for the UE to transmit UL-PRS of only one type of the first signal type or the second signal type, or a combination thereof. For example, the network entity 700 may transmit the PRS-type request 2132 to the UE 1802. The message may indicate for the UE to report measurement of only one type of signal, or to transmit only one type of signal, to the network entity (e.g., such that the UE could report measurement of the other type, or to transmit a signal of the other type, to another network entity). The indication to report measurement of only one type may be explicit or implicit (e.g., an indication to measure only one type of signal, thus implying to report measurement of only that type of signal). The processor 710, possibly in combination with the memory 730, in combination with the transceiver 720 (e.g., a wireless transmitter and an antenna) may comprise means for transmitting the message.

Implementations of the method 2200 may include one or more of the following features. In an example implementation, the indication of the power-saving mode of the UE comprises a request for the UE to operate in the power-saving mode. In another example implementation, the one type of the first signal type or the second signal type indicated by the message corresponds to better measurement quality of signal transfer between the network entity and the UE. For example, the network entity 700 may instruct the UE 1802 to measure, report, or transmit type-1 PRS based on type-1 PRS having been exchanged between the network entity 700 and measured with better quality than type-2 PRS (or vice versa).

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A UE (user equipment) comprising:
a transceiver configured to transmit and receive wireless signals;
a memory; and
a processor communicatively coupled to the transceiver and the memory and configured to:
transmit, via the transceiver to a network entity, a first on-demand request for first PRS (positioning reference signal) resources of a first signal type based on reception by the UE of a first DL-RS (downlink reference signal) of the first signal type from the network entity with at least a first threshold quality and lack of reception of a second DL-RS of a second signal type from the network entity with at least a second threshold quality, one of the first signal type and the second signal type being for non-RIS-reflected (non-reconfigurable-intelligent-surface-reflected) signal transfer between the network entity and the UE and another of the first signal type and the second signal type being for RIS-reflected signal transfer between the network entity and the UE; or
transmit, via the transceiver to a network entity, a second on-demand request for second PRS resources for RIS-reflected signal transfer between the network entity and the UE, the second on-demand request specifying a first RIS of a plurality of RISes associated with a common base station; or
transmit, via the transceiver to a network entity, a capability message indicating that the UE supports different PRS symbol durations for RIS-reflected PRS and non-RIS-reflected PRS; or
any combination thereof.

2. The UE of claim 1, wherein the processor is configured to:
transmit the first on-demand request, wherein the first PRS resources are first downlink PRS resources or first uplink PRS resources; or
transmit the second on-demand request, wherein the second PRS resources are second downlink PRS resources or second uplink PRS resources; or
a combination thereof.

3. The UE of claim 1, wherein the processor is configured to transmit the first on-demand request, and wherein the first DL-RS is a path loss reference signal.

4. The UE of claim 1, wherein the processor is configured to transmit the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS.

5. The UE of claim 1, wherein the processor is configured to transmit the capability message via the transceiver to the network entity, and wherein the processor is configured to transmit the capability message including a first PRS symbol duration supported by the UE for receiving the non-RIS-reflected PRS and a second PRS symbol duration supported by the UE for receiving the RIS-reflected PRS.

6. The UE of claim 5, wherein the processor is further configured to determine the second PRS symbol duration based on a separation of at least two RISes associated with the network entity.

7. A method of facilitating position determination of a UE (user equipment), the method comprising:
transmitting, from the UE to a network entity, a first on-demand request for first PRS (positioning reference signal) resources of a first signal type based on reception by the UE of a first DL-RS (downlink reference signal) of the first signal type from the network entity with at least a first threshold quality and lack of reception of a second DL-RS of a second signal type from the network entity with at least a second threshold quality, one of the first signal type and the second signal type being for non-RIS-reflected (non-reconfigurable-intelligent-surface-reflected) signal transfer between the network entity and the UE and another of the first signal type and the second signal type being for RIS-reflected signal transfer between the network entity and the UE; or
transmitting, from the UE to a network entity, a second on-demand request for second PRS resources for RIS-reflected signal transfer between the network entity and the UE, the second on-demand request specifying a first RIS of a plurality of RISes associated with a common base station; or
transmitting, from the UE to a network entity, a capability message indicating that the UE supports different PRS symbol durations for RIS-reflected PRS and non-RIS-reflected PRS; or
any combination thereof.

8. The method of claim 7, wherein the method comprises:
transmitting the first on-demand request, wherein the first PRS resources are first downlink PRS resources or first uplink PRS resources; or
transmitting the second on-demand request, wherein the second PRS resources are second downlink PRS resources or second uplink PRS resources; or
a combination thereof.

9. The method of claim 7, wherein the method comprises transmitting the first on-demand request, and wherein the first DL-RS is a path loss reference signal.

10. The method of claim 7, wherein the method comprises transmitting the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS.

11. The method of claim 7, wherein the method comprises transmitting the capability message to the network entity, with the capability message including a first PRS symbol duration supported by the UE for receiving the non-RIS-reflected PRS and a second PRS symbol duration supported by the UE for receiving the RIS-reflected PRS.

12. The method of claim 11, further comprising determining the second PRS symbol duration based on a separation of at least two RISes associated with the network entity.

13. A UE (user equipment) comprising:
a transceiver; and
means, for facilitating position determination of the UE, comprising:
means for transmitting, via the transceiver to a network entity, a first on-demand request for first PRS (positioning reference signal) resources of a first signal type based on reception by the UE of a first DL-RS (downlink reference signal) of the first signal type from the network entity with at least a first threshold quality and lack of reception of a second DL-RS of a second signal type from the network entity with at least a second threshold quality, one of the first signal type and the second signal type being for non-RIS-reflected (non-reconfigurable-intelligent-surface-reflected) signal transfer between the network entity and the UE and another of the first signal type and the second signal type being for RIS-reflected signal transfer between the network entity and the UE; or
means for transmitting, via the transceiver to a network entity, a second on-demand request for second PRS resources for RIS-reflected signal transfer between the network entity and the UE, the second on-demand request specifying a first RIS of a plurality of RISes associated with a common base station; or
means for transmitting, via the transceiver to a network entity, a capability message indicating that the UE supports different PRS symbol durations for RIS-reflected PRS and non-RIS-reflected PRS; or
any combination thereof.

14. The UE of claim 13, wherein the UE comprises:
means for transmitting the first on-demand request, wherein the first PRS resources are first downlink PRS resources or first uplink PRS resources; or
means for transmitting the second on-demand request, wherein the second PRS resources are second downlink PRS resources or second uplink PRS resources; or
a combination thereof.

15. The UE of claim 13, wherein the UE comprises the means for transmitting the first on-demand request, and wherein the first DL-RS is a path loss reference signal.

16. The UE of claim 13, wherein the UE comprises the means for transmitting the second on-demand request and wherein the means for transmitting the second on-demand request comprise means for transmitting the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS.

17. The UE of claim 13, wherein the UE comprises the means for transmitting the capability message to the network entity, with the capability message including a first PRS symbol duration supported by the UE for receiving the non-RIS-reflected PRS and a second PRS symbol duration supported by the UE for receiving the RIS-reflected PRS.

18. The UE of claim 17, further comprising means for determining the second PRS symbol duration based on a separation of at least two RISes associated with the network entity.

19. A non-transitory, processor-readable storage medium comprising processor-readable instructions to cause a processor of a UE (user equipment) to:
transmit, to a network entity, a first on-demand request for first PRS (positioning reference signal) resources of a first signal type based on reception by the UE of a first DL-RS (downlink reference signal) of the first signal type from the network entity with at least a first threshold quality and lack of reception of a second DL-RS of a second signal type from the network entity with at least a second threshold quality, one of the first signal type and the second signal type being for non-RIS-reflected (non-reconfigurable-intelligent-surface-reflected) signal transfer between the network entity and the UE and another of the first signal type and the second signal type being for RIS-reflected signal transfer between the network entity and the UE; or
transmit, to a network entity, a second on-demand request for second PRS resources for RIS-reflected signal transfer between the network entity and the UE, the second on-demand request specifying a first RIS of a plurality of RISes associated with a common base station; or
transmit, to a network entity, a capability message indicating that the UE supports different PRS symbol durations for RIS-reflected PRS and non-RIS-reflected PRS; or
any combination thereof.

20. The storage medium of claim 19, wherein the storage medium comprises processor-readable instructions to cause the processor to:
transmit the first on-demand request, wherein the first PRS resources are first downlink PRS resources or first uplink PRS resources; or
transmit the second on-demand request, wherein the second PRS resources are second downlink PRS resources or second uplink PRS resources; or
a combination thereof.

21. The storage medium of claim 19, wherein the storage medium comprises processor-readable instructions to cause the processor to transmit the first on-demand request, and wherein the first DL-RS is a path loss reference signal.

22. The storage medium of claim 19, wherein the storage medium comprises processor-readable instructions to cause the processor to transmit the second on-demand request and wherein the processor-readable instructions to cause the processor to transmit the second on-demand request comprise processor-readable instructions to cause the processor to transmit the second on-demand request based on reception by the UE of a third DL-RS with at least a third threshold quality from the network entity and reflected by the first RIS, and based on lack of reception of a fourth DL-RS with at least a fourth threshold quality from the network entity and reflected by a second RIS of the plurality of RISes that is separate from the first RIS.

23. The storage medium of claim 19, wherein the storage medium comprises the processor-readable instructions to cause the processor to transmit the capability message to the network entity, with the capability message including a first PRS symbol duration supported by the UE for receiving the non-RIS-reflected PRS and a second PRS symbol duration supported by the UE for receiving the RIS-reflected PRS.

24. The storage medium of claim 23, further comprising processor-readable instructions to cause the processor to determine the second PRS symbol duration based on a separation of at least two RISes associated with the network entity.

* * * * *